(12) United States Patent
Thompson et al.

(10) Patent No.: US 11,977,534 B2
(45) Date of Patent: *May 7, 2024

(54) AUTOMATED DOCUMENT PROCESSING FOR DETECTING, EXTRACTING, AND ANALYZING TABLES AND TABULAR DATA

(71) Applicant: Kofax, Inc., Irvine, CA (US)

(72) Inventors: Stephen M. Thompson, Bonsall, CA (US); Iurii Vymenets, St. Petersburg (RU); Donghan Lee, Anaheim, CA (US); Markus Georg Lust, Freiburg (DE)

(73) Assignee: KOFAX, INC., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/850,835

(22) Filed: Jun. 27, 2022

(65) Prior Publication Data

US 2022/0405265 A1 Dec. 22, 2022

Related U.S. Application Data

(63) Continuation of application No. 17/571,327, filed on Jan. 7, 2022.

(Continued)

(51) Int. Cl.
*G06F 16/22* (2019.01)
*G06V 10/70* (2022.01)
(Continued)

(52) U.S. Cl.
CPC .......... *G06F 16/2282* (2019.01); *G06V 10/70* (2022.01); *G06V 30/412* (2022.01); *G06V 30/413* (2022.01); *G06V 30/414* (2022.01)

(58) Field of Classification Search
CPC .. G06F 16/221; G06F 16/2282; G06F 3/0304; G06F 3/04845
(Continued)

(56) References Cited

U.S. PATENT DOCUMENTS 5,588,072 A 12/1996 Wang
5,854,853 A 12/1998 Wang
(Continued)

FOREIGN PATENT DOCUMENTS

AU 2019201016 A1 8/2019
CA 2734613 C 6/2020
(Continued)

OTHER PUBLICATIONS

Thompson et al., U.S. Appl. No. 17/571,327, filed Jan. 7, 2022.
(Continued)

*Primary Examiner* — Hung T Vy
(74) *Attorney, Agent, or Firm* — Zilka-Kotab, P.C.

(57) ABSTRACT

According to one embodiment, a computer-implemented method for classifying one or more tables and/or one or more tabular data arrangements depicted in image data includes: training a machine learning model, using a training dataset representing a plurality of different tables and/or tabular data arrangements, based at least in part on a plurality of recognized textual elements within the training dataset; and outputting a trained classification model based on the training, wherein the trained classification model is configured to classify one or more tables and/or one or more tabular data arrangements represented within a test dataset according to: one or more table classifications; one or more tabular data arrangement classifications; and/or one or more column classifications; and classifying the one or more tables and/or the one or more tabular data arrangements represented within the test dataset using the trained classification model. Methods for detecting, extracting, and classifying tables are also disclosed.

18 Claims, 36 Drawing Sheets

Related U.S. Application Data

(60) Provisional application No. 63/170,268, filed on Apr. 2, 2021.

(51) Int. Cl.
  *G06V 30/412* (2022.01)
  *G06V 30/413* (2022.01)
  *G06V 30/414* (2022.01)

(58) Field of Classification Search
  USPC .......................................................... 707/822
  See application file for complete search history.

(56) References Cited

U.S. PATENT DOCUMENTS

| | | | |
|---|---|---|---|
| 8,145,677 | B2 | 3/2012 | Al-Shameri |
| 8,345,981 | B2 | 1/2013 | Schmidtler et al. |
| 9,576,196 | B1 * | 2/2017 | Natarajan ............... G06V 20/63 |
| 10,360,703 | B2 | 7/2019 | Bekas et al. |
| 10,685,462 | B2 | 6/2020 | Bekas et al. |
| 10,726,252 | B2 | 7/2020 | Messina et al. |
| 10,970,535 | B2 | 4/2021 | Mallick et al. |
| 2006/0082595 | A1 * | 4/2006 | Liu ...................... G06V 30/422 |
| | | | 345/629 |
| 2010/0223276 | A1 | 9/2010 | Al-Shameri et al. |
| 2011/0249905 | A1 | 10/2011 | Singh et al. |
| 2013/0051610 | A1 | 2/2013 | Roach et al. |
| 2016/0034441 | A1 | 2/2016 | Nguyen et al. |
| 2018/0204360 | A1 | 7/2018 | Bekas et al. |
| 2018/0336405 | A1 | 11/2018 | Messina et al. |
| 2019/0130614 | A1 | 5/2019 | Bekas et al. |
| 2019/0164047 | A1 | 5/2019 | ter Haar Romenij et al. |
| 2020/0089946 | A1 | 3/2020 | Mallick et al. |
| 2020/0097713 | A1 * | 3/2020 | Cramer ................ G06V 30/413 |
| 2020/0151444 | A1 | 5/2020 | Price et al. |
| 2021/0056429 | A1 | 2/2021 | Gangeh et al. |
| 2021/0133556 | A1 | 5/2021 | Iwamori et al. |
| 2021/0158187 | A1 | 5/2021 | Chavan et al. |
| 2021/0201018 | A1 | 7/2021 | Patel et al. |
| 2021/0216761 | A1 | 7/2021 | Srinivas et al. |
| 2021/0256097 | A1 * | 8/2021 | Jayaraman ............. G06N 5/022 |
| 2021/0366099 | A1 | 11/2021 | Liao et al. |
| 2022/0067365 | A1 * | 3/2022 | Agrawal ............... G06F 40/289 |
| 2022/0318224 | A1 | 10/2022 | Thompson et al. |
| 2023/0237040 | A1 | 7/2023 | Thompson et al. |

FOREIGN PATENT DOCUMENTS

| | | |
|---|---|---|
| CN | 107862303 A | 4/2019 |
| CN | 111259873 B | 2/2021 |
| DE | 69432585 T2 | 4/2004 |
| EP | 0660256 A2 | 6/1995 |
| EP | 1061469 A1 | 12/2000 |
| EP | 3825909 A1 | 5/2021 |
| GB | 2574608 A | 12/2019 |
| JP | H07234918 A | 9/1995 |
| JP | 3754716 B2 | 3/2006 |
| TW | 258803 B | 10/1995 |
| WO | 2019104879 A1 | 6/2019 |
| WO | 2021034841 A1 | 2/2021 |

OTHER PUBLICATIONS

Thompson et al., U.S. Appl. No. 18/080,627, filed Dec. 13, 2022.

Gatterbauer et al., "Table Extraction Using Spatial Reasoning on the CSS2 Visual Box Model," American Association for Artificial Intelligence, 2006, pp. 1313-1318.

Kurama, V., "Table Detection, Information Extraction and Structuring using Deep Learning," Nanoets, 2021, 34 pages, retrieved from https://nanonets.com/blog/table-extraction-deep-learning/#table-detection.

Tengli et al., "Learning Table Extraction from Examples," Proceedings of the 20th international conference on Computational Linguistics (COLING'04), Aug. 2004, 7 pages.

Non-Final Office Action from U.S. Appl. No. 17/571,327, dated Apr. 13, 2023.

Final Office Action from U.S. Appl. No. 17/571,327, dated Sep. 28, 2023.

Non-Final Office Action from U.S. Appl. No. 18/080,627, dated Jan. 5, 2024.

Notice of Allowance from U.S. Appl. No. 17/571,327, dated Jan. 25, 2024.

Notice of Allowance from U.S. Appl. No. 17/571,327, dated Mar. 5, 2024.

\* cited by examiner

FIG. 1A

| Share Class | Beginning Account Value 1/1/18 | Actual (actual return after expenses) | | Hypothetical (5% annual return before expenses) | | Net Annualized Expense Ratio² |
|---|---|---|---|---|---|---|
| | | Ending Account Value 6/30/18 | Expenses Paid During Period 1/1/18–6/30/18¹,² | Ending Account Value 6/30/18 | Expenses Paid During Period 1/1/18–6/30/18¹,² | |
| Z | $1,000 | $991.60 | $3.85 | $1,020.93 | $3.91 | 0.78% |
| A | $1,000 | $990.50 | $5.08 | $1,019.69 | $5.16 | 1.03% |
| C | $1,000 | $986.80 | $8.77 | $1,015.97 | $8.90 | 1.78% |
| R | $1,000 | $989.40 | $6.31 | $1,018.45 | $6.41 | 1.28% |
| R6 | $1,000 | $992.00 | $3.41 | $1,021.37 | $3.46 | 0.69% |

FIG. 1B

|  | | Fair Value | Fair Value Measurements Using | | |
|---|---|---|---|---|---|
|  | | | Quoted Prices in Active Markets for Identical Assets (Level 1) | Significant Other Observable Inputs (Level 2) | Significant Unobservable Inputs (Level 3) |
| | December 31, 2017 | | | | |
| 122a | Assets: | | | | |
| | Available-for-sale securities | $ 3,126 | 3,126 | — | — |
| | Derivatives | 12,226 | — | 12,226 | — |
| | Total assets | $ 15,352 | 3,126 | 12,226 | — |
| 122b | Liabilities: | | | | |
| | Derivatives | $ 23,051 | — | 23,051 | — |
| | Option agreement | 23,980 | — | — | 23,980 |
| | Total liabilities | $ 47,031 | — | 23,051 | 23,980 |
| | December 25, 2016 | | | | |
| 122c | Assets: | | | | |
| | Available-for-sale securities | $ 3,736 | 3,736 | — | — |
| | Derivatives | 87,894 | — | 87,894 | — |
| | Total assets | $ 91,630 | 3,736 | 87,894 | — |
| 122d | Liabilities: | | | | |
| | Derivatives | $ 11,309 | — | 11,309 | — |
| | Option agreement | 28,770 | — | — | 28,770 |
| | Total liabilities | $ 40,079 | — | 11,309 | 28,770 |

| Lithology number | Depth meters | feet | Axial stress at failure MPa | Modulus of elasticity¹ X10³ MPa | Poisson's ratio (ν) | Bulk modulus² X10³ MPa | Shear modulus³ X10³ MPa | Lithology |
|---|---|---|---|---|---|---|---|---|
| 2,177 | 293.2 | 962 | 12.55 | 9.79 | 0.31 | 8.63 | 3.74 | Argillite |
| 2,184 | 398.4 | 1,307 | 9.10 | 4.34 | .15 | 2.08 | 1.88 | Do. |
| 2,185 | 425.2 | 1,395 | 37.50 | 46.40 | .22 | 27.17 | 19.10 | Altered argillite |
| 2,186 | 441.9 | 1,450 | 15.40 | 4.36 | .22 | 2.57 | 1.79 | Do. |
| 2,187 | 466.0 | 1,529 | 88.25 | 42.20 | .15 | 19.93 | 18.41 | Do. |
| 2,188 | 505.1 | 1,657 | 23.99 | 29.37 | .22 | 17.58 | 11.99 | Do. |
| 2,189 | 523.3 | 1,717 | 19.03 | 15.93 | .22 | 9.31 | 6.56 | Do. |
| 2,191 | 591.3 | 1,940 | 67.91 | 43.44 | .14 | 19.86 | 19.17 | Do. |
| 2,192 | 634.9 | 2,083 | 60.05 | 45.09 | .19 | 23.86 | 19.03 | Metasandstone |
| 2,193 | 675.1 | 2,215 | 23.51 | 16.48 | .13 | 7.38 | 7.31 | Altered argillite |
| 2,194 | 700.4 | 2,298 | 84.80 | 46.06 | .33 | 45.99 | 17.31 | Do. |

FIG. 1E

|  | 0-4 years | 5-7 years | 8-10 years | 11-15 years | > 15 years | TOTAL |
|---|---|---|---|---|---|---|
| Number of responses | 1.528 | 1.058 | 729 | 787 | 2.008 | 6.110 |
| Weights | 25,01% | 17,32% | 11,93% | 12,88% | 32,86% |  |

FIG. 1F

|  | 0-4 years | 5-7 years | 8-10 years | 11-15 years | > 15 years | TOTAL |
|---|---|---|---|---|---|---|
| Number of responses- Female | 695 | 400 | 260 | 260 | 451 | *2.066* |
| Weights | 33,64% | 19,36% | 12,58% | 12,58% | 21,83% |  |
| Number of responses- Male | 859 | 683 | 483 | 537 | 1562 | *4124* |
| Weights | 20,83% | 16,56% | 11,71% | 13,02% | 37,88% |  |

FIG. 1G

Statement of operations for the year ended September 30, 2018

(dollars in thousands)

Investment income:
  Income:
    Interest (net of non-U.S. taxes of $39; also includes $22,059 from affiliates) — $1,093,267
  Fees and expenses*:
    Investment advisory services — $ 47,037
    Distribution services — 38,996
    Transfer agent services — 19,610
    Administrative services — 3,875
    Reports to shareholders — 850
    Registration statement and prospectus — 532
    Trustees' compensation — 140
    Auditing and legal — 211
    Custodian — 75
    Other — 618     111,944
  Net investment income — 981,323

Net realized loss and unrealized depreciation:
  Net realized loss on:
    Investments:
      Unaffiliated issuers — (3,780)
      Affiliated issuers — (69,153)
    Futures contracts — (745)
    Swap contracts — (28,455)
    Currency transactions — (83)     (102,216)
  Net unrealized (depreciation) appreciation on:
    Investments:
      Unaffiliated issuers — (412,155)
      Affiliated issuers — 104,044
    Futures contracts — 977
    Swap contracts — 5,604
    Currency translations — (57)     (301,587)
      Net realized loss and unrealized depreciation — (403,803)
Net increase in net assets resulting from operations — $ 577,520

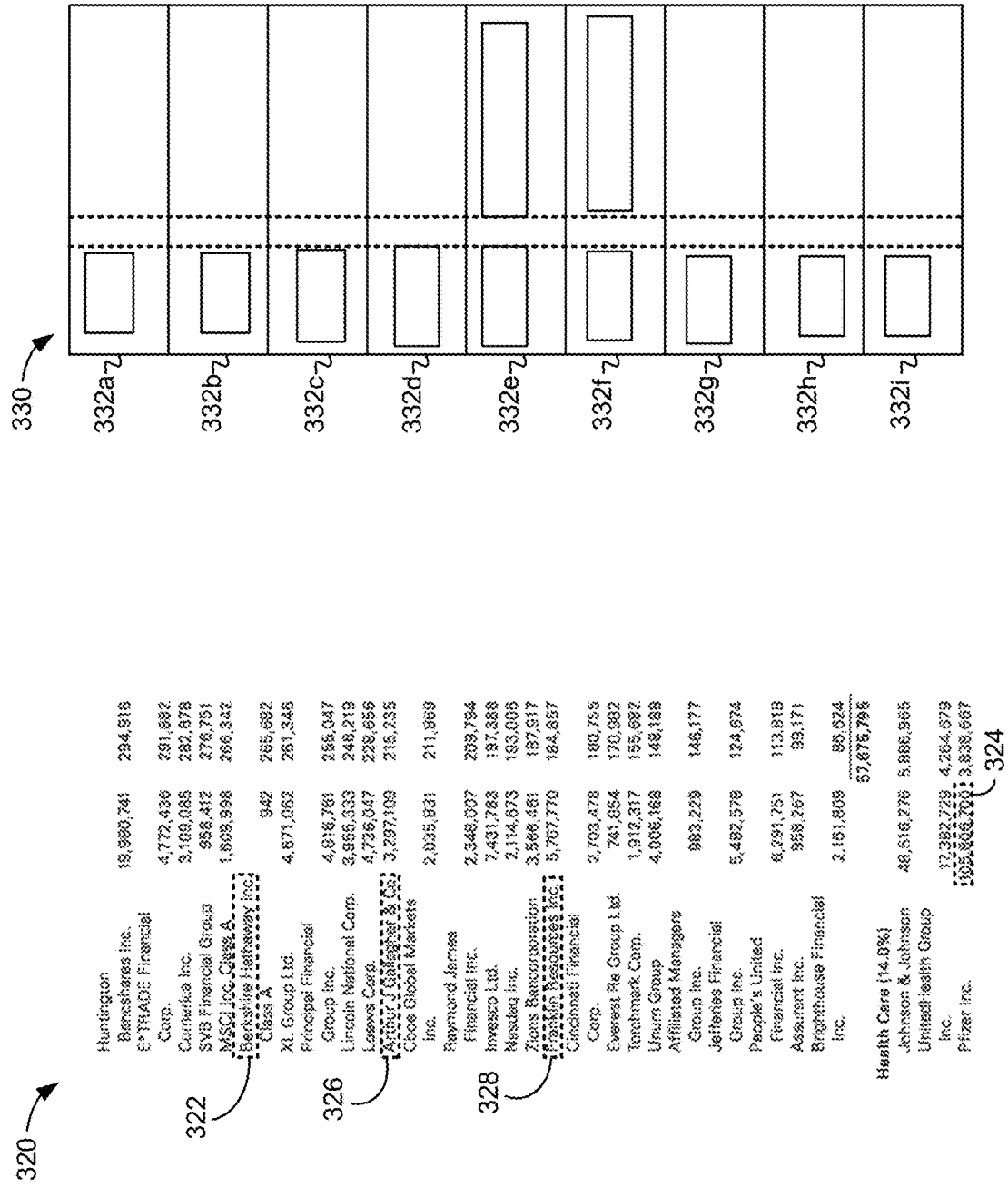

| Serial No. | Test No. | Location | Location (Structural Elements) | Depth (mm) | Sulphate Content as SO₃ % by Wt. of | | Chloride Content as Cl % by Wt. of | |
|---|---|---|---|---|---|---|---|---|
| | | | | | Concrete | Cement | Concrete | Cement |
| 1 | DS-1 | Compressor Foundation for Train 2 (SK-201) | Column | 0 – 25 | 0.40 | 2.37 | 0.03 | 0.18 |
| | | | | 25 – 50 | 0.37 | 2.19 | 0.03 | 0.18 |
| | | | | 50 -75 | 0.36 | 2.13 | 0.01 | 0.06 |
| 2 | DS-2 | | Foundation | 0 – 25 | 0.55 | 3.26 | 0.11 | 0.65 |
| | | | | 25 – 50 | 0.54 | 3.20 | 0.09 | 0.53 |
| | | | | 50 -75 | 0.51 | 3.02 | 0.01 | 0.06 |
| 3 | DS-3 | | Column | 0 – 25 | 0.47 | 2.78 | 0.02 | 0.12 |
| | | | | 25 – 50 | 0.45 | 2.66 | 0.01 | 0.06 |
| | | | | 50 -75 | 0.43 | 2.55 | 0.01 | 0.06 |
| 4 | DS-1 | Compressor Foundation for Train 1 (SK-101) | Column | 0 – 25 | 0.34 | 2.01 | 0.11 | 0.65 |
| | | | | 25 – 50 | 0.33 | 1.95 | 0.07 | 0.41 |
| | | | | 50 -75 | 0.21 | 1.24 | 0.04 | 0.24 |
| 5 | DS-2 | | Foundation | 0 – 25 | 0.36 | 2.13 | 0.05 | 0.30 |
| | | | | 25 – 50 | 0.33 | 1.95 | 0.05 | 0.30 |
| | | | | 50 -75 | 0.28 | 1.66 | 0.04 | 0.24 |
| 6 | DS-3 | | Column | 0 – 25 | 0.45 | 2.66 | 0.04 | 0.24 |
| | | | | 25 – 50 | 0.44 | 2.60 | 0.02 | 0.12 |
| | | | | 50 -75 | 0.41 | 2.43 | 0.01 | 0.06 |

FIG. 6A

| Share Class | Actual (actual return after expenses) | | | Hypothetical (5% annual return before expenses) | | Net Annualized Expense Ratio² |
|---|---|---|---|---|---|---|
| | Beginning Account Value 1/1/18 | Ending Account Value 6/30/18 | Expenses Paid During Period 1/1/18–6/30/18¹,³ | Ending Account Value 6/30/18 | Expenses Paid During Period 1/1/18–6/30/18¹,³ | |
| Z | $1,000 | $991.80 | $3.85 | $1,020.93 | $3.91 | 0.78% |
| A | $1,000 | $990.30 | $5.08 | $1,019.69 | $5.16 | 1.03% |
| C | $1,000 | $986.80 | $8.77 | $1,015.97 | $8.90 | 1.78% |
| R | $1,000 | $989.40 | $6.31 | $1,018.45 | $6.41 | 1.28% |
| R6 | $1,000 | $992.00 | $3.41 | $1,021.37 | $3.46 | 0.69% |

FIG. 6B

| | | | | | | | | |
|---|---|---|---|---|---|---|---|---|
| Resource Industries | 7,891 | 2,082 | 316 | (14) | 25 | 10,270 | 2,409 | 31% |
| Energy & Transportation | 19,382 | 2,637 | 163 | 88 | 535 | 22,795 | 3,403 | 18% |
| All Other Segments | 570 | (26) | (1) | 3 | (94) | 452 | (68) | (15%) |
| Corporate Items and Eliminations | (4,377) | (85) | 1 | (1) | (510) | (4,952) | (575) | |
| Machinery, Energy & Transportation | 42,876 | 8,291 | 801 | 254 | — | 51,822 | 9,146 | 21% |
| Financial Products Segment | 3,093 | — | — | — | 186 | 3,279 | 186 | 6% |
| Corporate Items and Eliminations | (307) | — | — | — | (72) | (379) | (72) | |

FIG. 7A

| | Units | Weighted-Average Grant-Date Fair Value |
|---|---|---|
| | (Restricted stock units in thousands) | |
| Nonvested at July 30, 2017 | 1,221 | $ 50.96 |
| Granted | 1,220 | $ 44.18 |
| Vested | (643) | $ 48.67 |
| Forfeited | (146) | $ 48.27 |
| Nonvested at July 29, 2018 | 1,652 | $ 47.01 |

FIG. 7B

| | | Quoted Prices in Active Markets for Identical Assets (Level 1) | Significant Other Observable Inputs (Level 2) | Significant Unobservable Inputs (Level 3) |
|---|---|---|---|---|
| 2017 | | | | |
| Assets: | | | | |
| Cash equivalents | $ 488,432 | $ 358,500 | $ 129,932 | $ — |
| Marketable securities | 48,006 | 48,006 | — | |
| Derivatives | 1,769 | | 1,769 | |
| Total | $ 538,207 | $ 406,506 | $ 131,701 | $ — |
| Liabilities: | | | | |
| Derivatives | $ 21,308 | $ — | $ 21,308 | $ — |
| 2016 | | | | |
| Assets: | | | | |
| Cash equivalents | $ 531,519 | $ 426,266 | $ 105,253 | $ — |
| Marketable securities | 43,638 | 38,119 | 5,519 | |
| Derivatives | 29,034 | — | 29,034 | |
| Total | $ 604,191 | $ 464,385 | $ 139,806 | $ — |
| Liabilities: | | | | |
| Derivatives | $ 142 | $ — | $ 142 | $ — |

Table of Contents

| | | Page |
|---|---|---|
| PART I | | |
| Item 1. | Business | 3 |
| Item 1A. | Risk Factors | 16 |
| Item 1B. | Unresolved Staff Comments | 34 |
| Item 2. | Properties | 34 |
| Item 3. | Legal Proceedings | 35 |
| Item 4. | Mine Safety Disclosures | 35 |
| PART II | | |
| Item 5. | Market for Registrant's Common Equity, Related Stockholder Matters and Issuer Purchases of Equity Securities | 36 |
| Item 6. | Selected Financial Data | 38 |
| Item 7. | Management's Discussion and Analysis of Financial Condition and Results of Operations | 39 |
| Item 7A. | Quantitative and Qualitative Disclosures about Market Risk | 72 |
| Item 8. | Financial Statements and Supplementary Data | 74 |
| Item 9. | Changes in and Disagreements with Accountants on Accounting and Financial Disclosure | 169 |
| Item 9A. | Controls and Procedures | 169 |
| Item 9B. | Other Information | 169 |
| PART III | | |
| Item 10. | Directors, Executive Officers and Corporate Governance | 170 |
| Item 11. | Executive Compensation | 170 |
| Item 12. | Security Ownership of Certain Beneficial Owners and Management and Related Stockholder Matters | 170 |
| Item 13. | Certain Relationships and Related Transactions, and Director Independence | 170 |
| Item 14. | Principal Accounting Fees and Services | 171 |
| PART IV | | |
| Item 15. | Exhibits and Financial Statement Schedules | 172 |

FIG. 8D

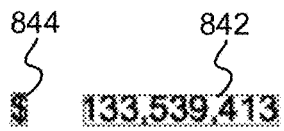

902 The following tables show the effect of our derivative instruments designated as cash-flow hedges for the years ended July 29, 2018, July 30, 2017, and July 31, 2016 in other comprehensive income (loss) (OCI) and the Consolidated Statements of Earnings:

| Derivatives Designated as Cash-Flow Hedges | | Total Cash-Flow Hedge OCI Activity | | |
|---|---|---|---|---|
| | | 2018 | 2017 | 2016 |
| OCI derivative gain (loss) at beginning of year | | $ (34) | $ (64) | $ (10) |
| Effective portion of changes in fair value recognized in OCI: | | | | |
| Foreign exchange forward contracts | | 8 | (8) | (8) |
| Forward starting interest rate swaps | | 15 | 23 | (36) |
| Amount of (gain) loss reclassified from OCI to earnings: | Location in Earnings | | | |
| Foreign exchange forward contracts | Cost of products sold | 1 | 6 | (11) |
| Foreign exchange forward contracts | Other expenses / (income) | — | 1 | (3) |
| Forward starting interest rate swaps | Interest expense | 2 | 4 | 4 |
| OCI derivative gain (loss) at end of year | | $ (8) | $ (34) | $ (64) |

Based on current valuations, the amount expected to be reclassified from OCI into earnings within the next 12 months is a gain of $1. The ineffective portion and amount excluded from effectiveness testing were not material.

904 The following table shows the effects of our derivative instruments not designated as hedges in the Consolidated Statements of Earnings:

| Derivatives not Designated as Hedges | Location of (Gain) Loss Recognized in Earnings | Amount of (Gain) Loss Recognized in Earnings on Derivatives | | |
|---|---|---|---|---|
| | | 2018 | 2017 | 2016 |
| Foreign exchange forward contracts | Cost of products sold | $ (1) | $ — | $ — |
| Foreign exchange forward contracts | Other expenses / (income) | (1) | 14 | (1) |
| Cross-currency swap contracts | Other expenses / (income) | — | — | 2 |
| Commodity derivative contracts | Cost of products sold | (2) | (11) | 6 |
| Deferred compensation derivative contracts | Administrative expenses | (2) | (3) | (6) |
| Treasury rate lock contracts | Interest expense | (18) | — | — |
| Total | | $ (24) | $ — | $ 1 |

14. Variable Interest Entity

In February 2016, we agreed to make a capital commitment subject to certain qualifications of up to $125 to Acre, a limited partnership formed to make venture capital investments in innovative new companies in food and food-related industries. Acre is managed by its general partner, Acre Ventures GP, LLC, which is independent of us. We are the sole limited partner of Acre and own a 99.8% interest. Our share of earnings (loss) is calculated according to the terms of the partnership agreement. Acre is a VIE. We have determined that we are the primary beneficiary. Therefore, we consolidate Acre and account for the third party ownership as a noncontrolling interest. Through July 29, 2018, we funded $81 of the capital commitment. On August 29, 2018, we provided notice of termination of the investment period and have no obligation to make any further capital contributions to Acre for new investments, but are required to pay obligations made prior to the notice of termination, the management fee and permitted partnership expenses.

| (Millions) | Expected Fiscal Year of Maturity | | | | | | | Fair Value of Liabilities |
|---|---|---|---|---|---|---|---|---|
| | 2019 | 2020 | 2021 | 2022 | 2023 | Thereafter | Total | |
| Debt[1] | | | | | | | | |
| Fixed rate[2] | $ 649 | $ — | $1,351 | $ 1 | $1,651 | $3,254 | $6,906 | $6,658 |
| Weighted-average interest rate | 5.16% | —% | 4.48% | 9.82% | 3.34% | 4.12% | 4.10% | |
| Variable rate[3] | $1,252 | $ 500 | $1,300 | $ — | $ — | $ — | $3,052 | $3,052 |
| Weighted-average interest rate | 2.59% | 2.83% | 3.13% | —% | —% | —% | 2.86% | |

FIG. 14A

| (Millions) | Expected Fiscal Year of Maturity | | | | | | | Fair Value of Liabilities |
|---|---|---|---|---|---|---|---|---|
| | 2019 | 2020 | 2021 | 2022 | 2023 | Thereafter | Total | |
| Debt[1] | | | | | | | | |
| Fixed rate[2] | $ 649 | $ — | $1,351 | $ 1 | $1,651 | $3,254 | $6,906 | $6,658 |
| Weighted-average interest rate | 5.16% | —% | 4.48% | 9.82% | 3.34% | 4.12% | 4.10% | |
| Variable rate[3] | $1,252 | $ 500 | $1,300 | $ — | $ — | $ — | $3,052 | $3,052 |
| Weighted-average interest rate | 2.59% | 2.83% | 3.13% | —% | —% | —% | 2.86% | |

FIG. 14B

| (Millions) | Expected Fiscal Year of Maturity | | | | | | Total | Fair Value of Liabilities |
|---|---|---|---|---|---|---|---|---|
| | 2019 | 2020 | 2021 | 2022 | 2023 | Thereafter | | |
| Debt[1] | | | | | | | | |
| Fixed rate[2] .................. | $ 649 | $ ---- | $1,351 | $ 1 | $ 1,651 | $ 3,254 | $ 6,906 | $ 6,658 |
| Weighted-average interest rate .... | 5.16% | ----% | 4.48% | 9.82% | 3.34% | 4.12% | 4.10% | |
| Variable rate[3] ................... | $ 1,252 | $ 500 | $ 1,300 | $ ---- | $ ---- | $ ---- | $ 3,052 | $ 3,052 |
| Weighted-average interest rate .... | 2.59% | 2.83% | 3.13% | ----% | ----% | ----% | 2.86% | |

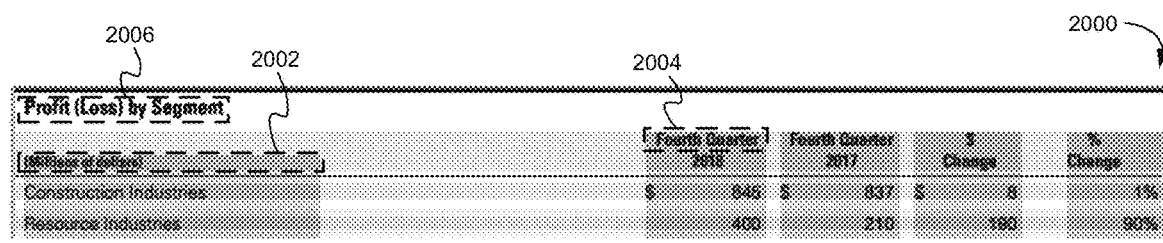
FIG. 20A
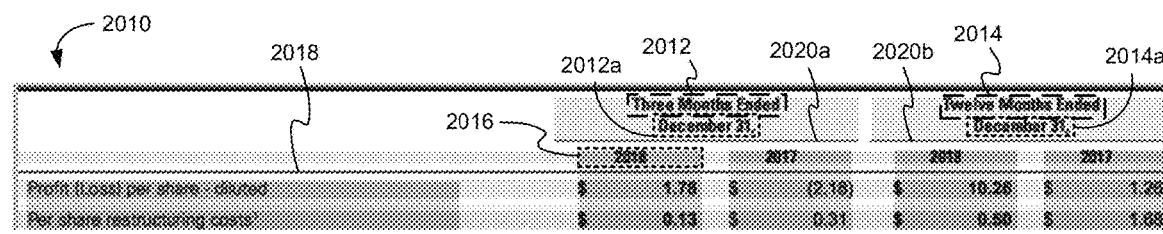
FIG. 20B
FIG. 21

|  | Year ended December 31, | | | % Change | |
|---|---|---|---|---|---|
|  | 2017 | 2016 | 2015 | 2017 vs. 2016 | 2016 vs. 2015 |
| Revenue | $ 1,556 $ | 1,480 $ | 1,492 | 5% | (1)% |
| Costs and expenses: | | | | | |
| Cost of revenue | 72 | 71 | 58 | 1% | 22% |
| Selling and marketing | 849 | 756 | 692 | 12% | 9% |
| Technology and content | 243 | 243 | 207 | 0% | 17% |
| General and administrative | 157 | 143 | 210 | 10% | (32)% |
| Depreciation | 79 | 69 | 57 | 14% | 21% |
| Amortization of intangible assets | 32 | 32 | 36 | 0% | (11)% |
| Total costs and expenses | 1,432 | 1,314 | 1,260 | 9% | 4% |
| Operating income | 124 | 166 | 232 | (25)% | (28)% |
| Other income (expense): | | | | | |
| Interest expense | (15) | (12) | (10) | 25% | 20% |
| Interest income and other, net | 1 | (3) | 17 | 133% | (118)% |
| Total other income (expense), net | (14) | (15) | 7 | (7)% | (314)% |
| Income before income taxes | 110 | 151 | 239 | (27)% | (37)% |
| Provision for income taxes | (129) | (31) | (41) | 316% | (24)% |
| Net income (loss) | $ (19) $ | 120 $ | 198 | (116)% | (39)% |
| Earnings (loss) per share attributable to common stockholders: | | | | | |
| Basic | $ (0.14) $ | 0.83 $ | 1.38 | (117)% | (40)% |
| Diluted | $ (0.14) $ | 0.82 $ | 1.36 | (117)% | (40)% |
| Other financial data: | | | | | |
| Adjusted EBITDA (1) | $ 331 $ | 352 $ | 466 | (6)% | (24)% |

FIG. 22

AUTOMATED DOCUMENT PROCESSING FOR DETECTING, EXTRACTING, AND ANALYZING TABLES AND TABULAR DATA

FIELD OF INVENTION

The present invention relates to document processing, and more specifically, this invention relates to computerized analysis of documents to detect tables therein, including single and multi-page tables, as well as tables having diverse layouts, formatting, content and/or terminology; extraction of such tables and/or content depicted therein from documents; and/or classification of tables, and/or portions thereof (especially columns) according to relevancy for downstream applications.

BACKGROUND

Documents, especially "large" documents like financial reports, medical charts, benefits documents, etc. often contain large volumes of diverse data. The data are diverse with respect to the formatting, content, extent (e.g., single/multi-page), and/or layout, even among similar document types (e.g., prepared by different entities and/or according to different conventions, organizational schemes, languages, etc.).

Accordingly, it would be useful to provide systems, methods, and computer program products capable of computerized analysis of documents to detect tables therein, including single and multi-page tables, as well as tables having diverse layouts, formatting, content and/or terminology; extraction of such tables and/or content depicted therein from documents; and/or classification of tables, and/or portions thereof (especially columns) according to relevancy for downstream applications.

Indeed, there has been a long-felt need in the field of document analysis and processing for techniques, especially automated, computerized techniques, for processing and analyzing the tabular information within documents, especially when such tables span multiple pages of a document, and/or exhibit unique/diverse structure, information layout, content, terminology, etc.

The concept of table analysis, extraction, and analysis of information therefrom, has existed for decades. However, efforts to-date to solve this problem have heretofore been limited in scope and/or accuracy and require substantial assumptions regarding the nature of table(s) and/or data contained therein. Often, these assumptions require tedious and/or complex user guidance and analysis that is typically very specific to a single kind of table to be targeted, thus limiting the applicability of any given extraction approach.

For instance, assumptions about table(s) and/or documents containing tables typically include and/or relate to one or more of: table structure (i.e., physical organization/layout of the table, such as a grid of graphical lines defining cells, an arrangement of data with columns/rows separated by whitespace (but no graphical lines), cell/table dimensions, etc.), document/file type (e.g., MS WORD®, HTML, PDF, XML, plain text, delimited text, etc.), document/page layout (e.g., number of columns/rows per page, ability for tables to span multiple pages, location of tables within pages, etc.), presence, location, and/or format of content (e.g., predefined table types, keywords, units of expression, data patterns (such as data format, data type, permitted/excluded data values, etc.)), etc., which may be known or required to be present in a particular location within the table/document, e.g., in the title, header, column(s), etc., as well-known in the art of document processing, and particularly table detection, extraction, and/or analysis.

Assumptions relating to table descriptors (e.g., title, column headers, etc.) and/or data values represented within tables typically include and/or relate to: formatting (e.g., patterns (such as social security number, account number, routing number, phone number, zip code, date of birth, date/time formatting, etc.)), units (e.g., currency, time, date, weight, volume, mass, etc.), expected/accepted/excluded character values/ranges (e.g., alphabetic, numeric, alphanumeric, symbols, etc.), context (e.g., type of information included in the table, which may include a designated "domain(s)" such as medical, financial, legal, mathematical, scientific, etc.), language, and other assumptions as well-known in the art of document processing, and particularly table detection, extraction, and/or analysis.

Additionally, conventional approaches to processing tables often rely on a priori knowledge and/or "ground truth(s)" regarding the nature of the table(s) and/or content therein. For example, conventional approaches may require up front designation of the location of table(s) within the document(s) to be processed (e.g., page number, location within page), table format (e.g., graphical lines, delimiters, amount of space separating values, number of columns, number of rows, etc.), expected values and/or format (e.g., table title, column and/or row header(s), presence of specific values, patterns, etc. (such as keywords) expected to be present in table(s), etc.), location of data of interest (e.g., table location, column and/or row number), etc. and/or other assumptions as well-known in the art of document processing, and particularly table detection, extraction, and/or analysis.

Skilled artisans familiar with table extraction, and/or upon reading the present disclosure, will appreciate the foregoing assumptions primarily address problems with recall. As such, providing a table/tabular data extraction tool exhibiting high recall (e.g., 90% or greater, preferably 95% or greater, and more preferably 99% or greater) when operating on/with a diverse and/or large set of documents and/or document types would provide a benefit to the field of document processing. Accomplishing such a feat using image data as the source of information regarding tables/tabular data detection, extraction, and/or analysis would also represent an improvement to image processing, as there is no currently available tool or technique for accomplishing such high recall from image data representing the large volume and/or diversity of documents/data sets available for modern applications.

Similar efforts, especially those directed to detecting, extracting, and/or classifying complex, diverse tables and/or constituent tabular data, have thus far failed to yield a robust, efficient, automated solution to the unique challenges associated with analyzing different document types to detect tables and/or tabular data, extracting such tables and/or data, and classifying the tables, portions thereof, e.g., columns, and/or data extracted therefrom.

Certain efforts have accomplished limited success. However, such approaches to providing robust table detection, extraction, and/or classification capabilities have exhibited one or more of the following exemplary limitations, among others described in corresponding cited references.

Historical tools for detecting, analyzing, and/or extracting tables and/or tabular data arrangements conventionally take advantage of structure and/or structured information, which is often directly coded/provided in/via the document containing the table/tabular data arrangement. For instance, spreadsheets such as provided in/via OPENOFFICE®, GOOGLE SHEETS®, MS EXCEL®, etc. are data files including inherent structure in the definition of the file itself, e.g., tables, table titles, headers, descriptors, sections, rows/columns, data values, etc. are all encoded directly in the file, including the defining structure of the table and corresponding data.

Similar, simpler examples of such structured data files including/enabling tabular data arrangements and corresponding structure in the definition of the file itself include extensive markup language (.XML) files, hypertext markup language (.HTML) files, delimited text files (especially tab-delimited and/or comma-delimited text or "comma separated value (.CSV)" files), and any other suitable example of structured data files regarding tables and/or tabular data arrangements, as would be appreciated by a person having ordinary skill in the art upon reading the present disclosure.

Reliance on such structured data, however, limits the scope of input from which tables and/or tabular data may be detected, extracted, and analyzed to those having a predefined structure, which is not the case for many documents (especially physical documents) and image data, generally. For instance, Tengli, et al. ("Learning Table Extraction from Examples" in Proc. 20th International Conference on Computational Linguistics, p. 987 (2004)) and W. Gatterbauer, et al. ("Table Extraction Using Spatial Reasoning on the CSS2 Visual Box Model." In Proc. 21st National Conference on Artificial Intelligence, p. 1313 (2006)) present techniques for table detection and extraction, but which rely heavily on structure and conventions regarding, and thus are limited to, processing HTML documents/data.

Moreover, in traditional approaches, user-defined search criteria, such as key words, are commonly used to locate and distinguish tables. Such techniques are limited to seeking a given value within a table having known values and/or characteristics (e.g., formatting, structure, etc.). However, such approaches require a priori knowledge of the content of the table/tabular data arrangement, and fail to take advantage of additional information (particularly regarding structure) available by analyzing image characteristics, especially graphical lines, for purposes of table detection and extraction.

In still more conventional/historical approaches, a user specifies column and/or row indices, and an automated system evaluates those portions of the pages/table(s) fully or partially located within the predefined, user-specified column/row index locations. Such techniques are accurate, but inflexible, and characterized by poor recall when working with diverse data sets, and/or where location(s) of data values (or even simply data type(s), e.g., columns) are not known a priori.

For instance: consider two tables similarly describing, among other data, gross earnings (v1) and expenses (v2) respectively for different companies A and B. In Table 1, for Company A, these values are respectively present in the first and fourth rows of the third column, i.e., $T1(r_1,c_3)=v_1$; $T1(r_4,c_3)=v_2$. In Table 2, for company B, values v1 and v2 are respectively present in the first row of the second column, and the fifth row of the fifth column (i.e., $T2(r_1,c_2)=v_1$; $T2(r_5,c_5)=v_2$), e.g., as shown below.

TABLE 1

Company A

| | $c_1$ | $c_2$ | $c_3$ | $c_4$ | $c_5$ |
|---|---|---|---|---|---|
| $r_1$ | | | $v_1$ | | |
| $r_2$ | | | | | |
| $r_3$ | | | | | |
| $r_4$ | | | $v_2$ | | |
| $r_5$ | | | | | |

TABLE 2

Company B

| | $c_1$ | $c_2$ | $c_3$ | $c_4$ | $c_5$ |
|---|---|---|---|---|---|
| $r_1$ | | $v_1$ | | | |
| $r_2$ | | | | | |
| $r_3$ | | | | | |
| $r_4$ | | | | | |
| $r_5$ | | | | | $v_2$ |

Despite the presence of common values in both tables, searching for such a match using column or other location indices for either table would not reveal a match in the corresponding location of the other table. In this way, searching by location index often fails to identify the existence of similarity between tables, resulting in poor/misinformative recall, and/or poor overall detection, processing, and extraction of tabular data and arrangements thereof.

Other common challenges with traditional table detection, extraction, and/or analysis of tabular data arrangements include processing source data to accurately identify content and any structure included in the document, (for images, also ensuring adequate image quality), addressing diversity of possible structure(s), presence of empty cells, margins, borders, or other gaps in the tables, etc., density of content, formatting of data values, separation of tables (e.g., across multiple pages and/or files), etc. such as described by Kurama, et al. ("Table Detection, Information, Extraction and Structuring using Deep Learning," Nanonets (March 2021)).

Clearly, historic, keyword-based, index-based detection, extraction, and analysis of tables and/or tabular data are not a suitable approach for robust, automated detection of diverse table(s) and/or constituent data. Several approaches to overcome these limitations are described below.

Certain entities, e.g., NANONETS® have investigated deep learning techniques employing neural networks, genetic algorithms, etc. to analyze very large sets of curated training examples and corresponding ground truths. However, analyzing and using such large datasets is prohibitive for practical applications, since the devices used to attempt table/tabular data arrangement detection and extraction have only limited resources. Moreover, ground truths for such large sets of training data are not typically available across diverse contexts/applications to which tables and tabular data arrangements are commonly employed in documents and image data. Further still, even modern approaches such as developed by Nanonets require extensive human annotation and/or curation for reliable, robust table detection, extraction, and analysis, for example in order to: track predictions which are correct, and predictions that are incorrect, make corrections to incorrect predictions, trim/remove incorrect predictions, supplement missing data/conclusions, and filter images, among other tasks.

Accordingly, despite a long-felt need, and attempts by the present Applicant and others, none have thus far succeeded in providing systems, methods, and computer program products for detecting, extracting, and/or classifying complex, diverse tables and/or constituent tabular data within documents, especially large, complex documents, and where the documents are provided/analyzed in the form of image data.

It would therefore be of practical benefit to implement systems, techniques, and computer program products generally configured to detect, extract, and classify tables and/or tabular data within documents, especially where tables/data are large, complex, and/or span multiple pages, such as medical charts, financial reports, explanation of benefits (EOB) documents, leases, asset tracking documents, shipping manifests, quality control/assurance tracking, etc. as would be understood by a person having ordinary skill in the art upon reading the present disclosure.

Further benefits will be realized by providing systems, techniques, and computer program products capable of detecting, extracting, and/or classifying tables/tabular data without relying on assumptions regarding the table(s) and/or documents, a priori knowledge regarding the table(s) and/or documents (especially regarding structure, format, content, etc. of table(s) and/or document(s)), and user guidance to direct the detection/extraction/classification process.

SUMMARY OF THE INVENTION

According to one embodiment, a computer-implemented method for detecting and classifying tables and/or tabular data arrangements within an original image includes: preprocessing the original image to generate processed image data; detecting one or more tables and/or one or more tabular data arrangements within the processed image data; extracting the one or more tables and/or the one or more tabular data arrangements from the processed image data; and classifying either: the one or more extracted tables; portions of the one or more extracted tables; the one or more extracted tabular data arrangements; portions of the one or more extracted tabular data arrangements; or a combination of: the one or more extracted tables; the portions of the one or more extracted tables; the one or more extracted tabular data arrangements; and/or the portions of the one or more extracted tabular data arrangements.

According to another embodiment, a computer-implemented method for classifying one or more tables and/or one or more tabular data arrangements depicted in image data includes: training a machine learning model, using a training dataset representing a plurality of different tables and/or tabular data arrangements, based at least in part on a plurality of recognized textual elements within the training dataset; and outputting a trained classification model based on the training, wherein the trained classification model is configured to classify one or more tables and/or one or more tabular data arrangements represented within a test dataset according to: one or more table classifications; one or more tabular data arrangement classifications; and/or one or more column classifications; and classifying the one or more tables and/or the one or more tabular data arrangements represented within the test dataset using the trained classification model.

BRIEF DESCRIPTION OF THE DRAWINGS

Figure 1A:
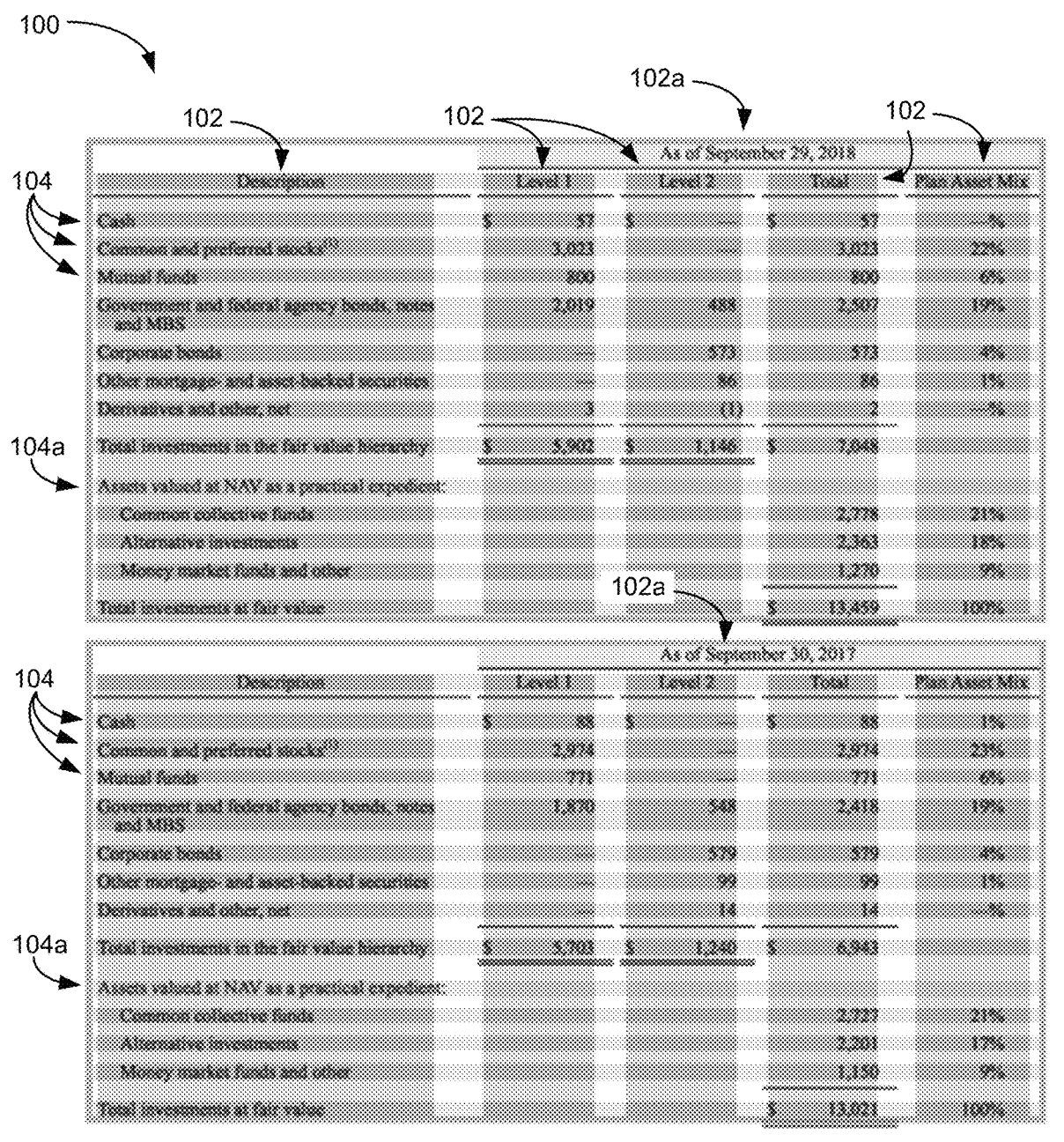

FIGS. 1A-1C illustrate column headers and row headers, and "qualification" of certain column headers and/or row headers as column descriptors and/or row descriptors, respectively, according to several illustrative embodiments.

FIGS. 1D-1G show simplified examples of boxes, according to several illustrative embodiments.

FIG. 3A depicts an example of a single table that is commonly misinterpreted as multiple tables by conventional automated image processing techniques, according to one embodiment.

FIG. 3B is an example of a table that is commonly misinterpreted as missing one or more headers by conventional automated image processing techniques, according to one embodiment.

FIG. 3C is an exemplary image of a table having "slightly overlapping" elements, according to one embodiment.

FIG. 3D is a simplified schematic of a single-column table including a subset of rows erroneously interpreted as including multiple phrases, and resulting in erroneous interpretation of the table as having multiple columns, according to one illustrative example.

FIG. 6A shows a substantially grid-like table including merged cells, according to one exemplary embodiment.

FIG. 6B depicts a substantially non-grid like table/tabular data arrangement, according to one embodiment.

FIG. 7A illustrates a table comprising a plurality of "bars" according to one exemplary embodiment. The table shown in FIG. 7A, as a whole, also fits the definition of a "stack" as understood herein, and according one exemplary embodiment.

FIG. 7B shows a table that includes a plurality of delineating lines, according to one illustrative embodiment.

FIG. 8C depicts a table including standalone dashes, which are commonly missed (equivalently, not recognized) using conventional character recognition techniques, according to one exemplary embodiment.

FIG. 8D shows one illustrative embodiment of a table including ellipses.

FIG. 8E depicts an exemplary textual element and corresponding unit/value symbol, according to one embodiment.

FIG. 9A illustrates an example of a document including multiple tables embedded within text, according to one embodiment.

FIG. 12 illustrates an exemplary embodiment of a table including one or more indented rows.

FIG. 13 shows a table having a "jagged" bottom row, according to one exemplary embodiment.

FIGS. 14A-14C illustrate exemplary results of table detection and expansion using a non-grid-based approach, according to one embodiment. The table as shown in FIG. 14A omits a header 1408 and a column 1404z. As shown in FIG. 14B, the table includes header 1408 but still omits column 14104z. As shown in FIG. 14C, all elements of the table are detected and included in the definition of the table.

FIG. 15A depicts a graphical representation of a user interface configured to facilitate review of tables detected by a trained machine learning detection model, and further configured to facilitate user designation of tables of interest, according to one embodiment.

FIG. 15C is a simplified representation of a user interface for displaying output of a table detection process, according to one exemplary approach.

FIG. 15D illustrates an exemplary embodiment of a table including a plurality of "verified" elements, and corresponding user interface for inspecting and/or manipulating verification status of elements of a table/tabular data arrangement.

FIG. 16 depicts one exemplary embodiment of a document including multiple tables and a text region including a plurality of text lines.

FIGS. 20A and 20B depict exemplary embodiments of tables built using one implementation of a "build headers upwards" technique as described herein. FIGS. 20A and 20B also depict exemplary embodiments of TLXs and the use thereof in the exemplary "build headers upwards" technique.

FIG. 21 is an exemplary depiction of a table having headers completely enclosed in boxes, according to one embodiment.

FIG. 22 illustrates an exemplary embodiment of a table including a plurality of horizontal lines spanning the width of the data region of the table, according to one implementation. Notably, at least some of the horizontal lines are "usable" in the context of building/defining rows of the table.

DETAILED DESCRIPTION

Figure 1D:
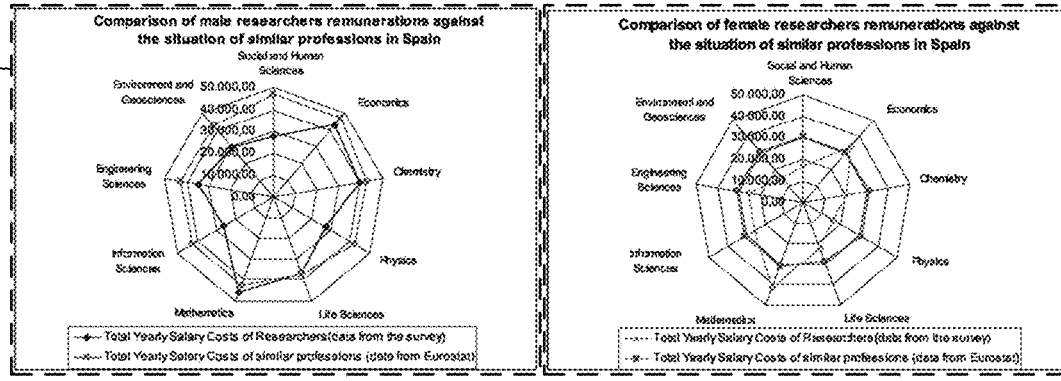

The following description is made for the purpose of illustrating the general principles of the present invention and is not meant to limit the inventive concepts claimed herein. Further, particular features described herein can be used in combination with other described features in each of the various possible combinations and permutations.

Definitions

Unless otherwise specifically defined herein, all terms are to be given their broadest reasonable interpretation including meanings implied from the specification as well as meanings understood by those skilled in the art and/or as defined in dictionaries, treatises, etc.

Various terms are defined, according to the inventors meaning thereof, throughout the present specification. The following list of definitions is not to be taken as an exclusive list of terms and corresponding definitions according to the intended meaning thereof, but an exemplary listing of terms and definitions to facilitate the skilled artisan's understanding of the presently disclosed inventive concepts.

It shall be understood that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

A "page" is to be understood as referring to one or more depictions of a document. A "page" may include a single page, or multiple pages within a document.

Similarly, a "document" shall be understood as including a single document, or multiple documents, whether physical or electronic, in various embodiments. "Document" may be used interchangeably herein to refer to physical documents and electronic documents.

The term "table" (or equivalently, "tabular data arrangement") as utilized herein is to be understood as referring to a collection of data, some or all of which is organized into a substantially two-dimensional layout including columns and rows. Tables are preferably rectangular, or include one or more rectangular portions, and comprise a plurality of rectangular "cells," "fields," etc. for storing data values. A "table" as described herein may be represented on a single page, or span multiple pages, without departing from the scope of the inventive concepts presented herein, though multi-page tables/tabular data arrangements may require unique considerations, as described in further detail hereinbelow.

The terms "cell," "field," and "rectangle" are to be understood as interchangeable, and unless stated otherwise refer to one or more portion(s) of a table, preferably characterized by, but in no manner limited to, a substantially quadrilateral shape and configured to receive/hold/display one or more data values.

Tables as described herein may include "descriptors" such as a table title, table header, column header, row header, or other information describing a table (more preferably, describing the nature of data values included in at least a portion of the table and associated with the descriptor). As understood herein, "column descriptors" serve to "fully qualify" column headers in a table, and "row descriptors" similarly serve to "fully qualify" the row headers that follow the descriptor. Exemplary embodiments of column descriptors and row descriptors are shown in FIGS. 1A-1C, below, according to several implementations of the presently disclosed inventive concepts.

For instance, with reference to FIG. 1A, table 100 includes a plurality of column headers 102 that describe the data in each column, e.g., "Description," "Level 1," "Level 2," "Total," and "Plan Asset Mix.","," Table 100 also includes a plurality of row headers 104 that describe the data in each row, e.g., "Cash," "Common and preferred stocks," "Mutual Funds," etc. However, the headers 102, 104 by themselves do not fully describe the data in the corresponding columns and rows, respectively. Instead, in the context of the present disclosure, the "column descriptors" 102a "As of Sep. 29, 2018" and "As of Sep. 30, 2017" must also be considered in order to provide context and thereby to fully describe the column contents, and the "row descriptors" 104a "Assets valued at NAV as a practical expedient:" must also be considered in order to provide context to the row headers "Common collective funds", "Alternative investments" and "Money market funds and other", and to thereby fully describe the contents of these rows.

In the example of table 110, shown in FIG. 1B, column headers 112a, 112b ("Ending Account Value 6/30/18") taken alone, do not reflect the full context of the information depicted in the respective columns. These column headers 112a, 112b therefore require additional qualification to fully understand their context and meaning. The fully qualified header values for column headers 112a, 112b must also include the context provided by the column descriptors 114a and 114b, which reside above column headers 112a, 112b.

While other notations may be used without departing from the scope of the presently described inventive concepts, according to one embodiment (using C++ double colon notation e.g., as in a namespace), the fully qualified header values for column headers 112a and 112b are, respectively: "Actual (actual return after expenses)::Ending Account Value 6/30/18" and "Hypothetical (5% annual return before expenses)::Ending Account Value 6/30/18." These values provide the full context for the corresponding data values in the fields of each column, and allow distinction therebetween.

Turning now to FIG. 1C, a similar situation exists with regard to row descriptors. Specifically, the row header value "Derivatives" appears in row headers 122a, 122b, 122c, and 122d. However, the value "Derivatives" has several different meanings, corresponding to the respective date, and categorization (assets or liabilities) for each entry, as provided by row descriptors. Accordingly, in this exemplary embodiment, the full qualification for these headers are: "December 31, 2017::Assets::Derivatives", "December 31, 2017::Liabilities::Derivatives", "December 25, 2016::Assets::Derivatives", and "December 25, 2016::Liabilities::Derivatives", respectively.

As demonstrated by the exemplary embodiments depicted in FIGS. 1A-1C, "full qualification" in the context of the present application refers to providing all information (e.g., context) necessary to understand the nature of data included in the corresponding portion of the table/data. Where the descriptive information in tables is capable of being represented as a tree structure, a "fully qualified" leaf node includes the name/label of the leaf node, and all nodes within a (preferably shortest) path leading to the root node. Taking city names as an example, while several cities may share a common name, each may be distinguished by qualifying information such as the state/province/etc. and/or country where the city is located. According to this example, three cities each named "Paris" may be fully qualified according to state/province and country as follows (again using "::" notation for convenience):

| City # | Qualification |
|---|---|
| City #1 | France::Paris |
| City #2 | United States::Idaho::Paris |
| City #3 | United States::Alabama::Paris |

While it is not possible to distinguish among the cities based on values in cells identifying the city name alone, once fully qualified each city may be identified uniquely, based at least in part on corresponding column descriptors and/or row descriptors, in preferred embodiments.

Tables, as understood herein, are characterized either as "grids" (or equivalently as having a "grid-like structure"), or as "non-grids" (or again, equivalently, as having a "non-grid-like" structure). "Grids" are characterized by a substantially rectangular shape including X rows and Y columns, a single cell at each integer position of (X, Y), with each cell delineated by surrounding graphical lines. By contrast, "non-grids" encompass tables and table-like structures where not all cells are delineated by graphical lines—where there may be some, or no graphical lines present in the table. Moreover, "non-grids" are not limited to rectangular shape, or having a same number of cells in any two given row(s)/column(s).

A "box" as referenced in the present descriptions refers to the outer-most rectangle of a given set of intersecting lines depicted in an image. In other words, a box is a rectangular portion of an image that bounds a connected component that corresponds to intersecting vertical and horizontal graphical lines depicted in the image. Typically, at least some of the borders of boxes are delineated by graphical lines appearing in the image, although not all borders need be delineated by graphical lines according to the present definition of "boxes." For example, FIG. 1D shows an image 130 depicting table 132 and two FIGS. 134, 136, each of which is completely bounded by (four) graphical lines, and each of which fits the definition of a "box" (where the outermost rectangle is indicated by dashed lines). However, the boxes shown in FIGS. 1E-1G are only partially delineated by graphical lines. FIG. 1E shows a table having upper and lower boundaries delineated by graphical lines, while no such graphical lines delineate the left or right boundary.

Regardless, the table shown in FIG. 1E fits the definition of a box as utilized herein, with the outermost rectangle being indicated by dashed lines. Moreover, some boxes may be characterized in that the "outermost" rectangle may include whitespace, as in the case of irregular tables/tabular data arrangements such as shown in FIGS. 1F and 1G. Again, these irregular tables fit the definition of "boxes" as utilized herein, and the outermost rectangles are indicated by dashed lines.

A "text line" as referenced herein shall be understood as including any grouping of textual elements arranged along a common axis of orientation and forming a single, contiguous line within an image, typically a substantially horizontal line.

A "text line index" (TLX) as referred to herein shall be understood as the index of and unique identifier for a distinct text line within a given page or subpage. Though any suitable indexing may be used without departing from the scope of the presently described inventive concepts, preferably TLXs are zero-indexed (i.e., the values of TLXs start at zero for the uppermost text line on the page or subpage and increase in the downward direction). For example, according to the preferred zero-indexing system, (TLX=1) identifies the text line that is immediately below the uppermost text line on the page or subpage. By uniquely identifying a text line and the bounding rectangle associated therewith, TLXs identify the vertical (y-value) positions within a digital image that are occupied by text, including text depicted within a table/tabular data arrangement. As described in further detail hereinbelow, TLX's preferably delimit or indicate the location of boundaries between various the regions of a table.

"Character recognition" as referenced herein includes any known technique for identifying symbols, preferably characters of one or more languages, within image data. According to various embodiments, character recognition includes optical character recognition (OCR), but additionally or alternatively employing other known character recognition techniques, such as intelligent character recognition (ICR), graphics device interface (GDI), clustering-based recognition, feature extraction-based recognition, pattern matching-based recognition, techniques using neural networks, etc. as would be understood by a person having ordinary skill in the art upon reading the present descriptions. References to any type of character recognition, especially OCR, shall be understood as referring also to other suitable types of character recognition in the alternative (or in combination) as would be understood by a skilled artisan reviewing this disclosure.

An "element," (equivalently referred to herein as a "character recognition element," "OCR element," etc.) is to be understood herein as comprising one or more connected components represented in digital image data and corresponding to a physical marking on a physical document, as recognized/identified using one or more character recognition techniques as disclosed herein, and any suitable equivalent(s) thereof that would be appreciated by a skilled artisan in the field of image analysis upon reading the present disclosure. In addition to the connected component(s) per se, an "element" includes, in various combinations and according to various embodiments, additional contextual information characterizing the connected component(s), including but not limited to: a predicted identity of the connected component (e.g., a character in one or more languages, a numeral, a symbol, etc., and combinations thereof, such as words, phrases, sentences, text lines, text blocks, paragraphs, etc.); a confidence score associated with the predicted/identified identity character component(s) (which may be expressed according to any suitable measure known in the art); geometric information characterizing the connected component(s) (e.g., according to page number, position on the page (e.g., x-y coordinate of the upper-left corner of the element), length, width, aspect ratio, thickness, number of connected component(s) included in the element, etc. as would be appreciated by a skilled artisan upon reading the present disclosure); image characteristics corresponding to the connected component(s) and/or surrounding background pixel(s) (e.g., pixel intensity information, whether expressed according to bitonal (2-bit), grayscale (8-bit), RGB color (24-bit, 8-bits per color channel and optionally including a grayscale intensity value), or any other suitable convention for expressing/characterizing characteristics of pixels of digital image); and/or location information regarding the position of the character with respect to the image (preferably a partial or complete image of a document) from which the character was detected, e.g., (X, Y) coordinate(s) of pixel(s) considered part of the connected component(s), and/or any surrounding pixels (e.g., background pixels) included in a (preferably rectangular) region surrounding the connected component(s), e.g., as defined by a bounding box or other suitable technique/representation that would be understood by a skilled artisan upon reviewing the instant specification. In various embodiments, the additional contextual information may be associated with the connected component(s), e.g., as metadata, in a database, or in any other suitable manner as known in the art and would be appreciated upon reading the present disclosure. According to preferred embodiments, an "element" includes at least: the connected component(s) and associated contextual information including but not limited to: the predicted identity/identities of the connected component(s); the location information corresponding to the connected component(s), the geometric characteristics of the connected component(s), and the image characteristics of the connected component(s), wherein the additional contextual information is associated with the connected component(s) as metadata.

The term "feature" as utilized herein shall be understood as including "elements" as defined hereinabove, and also any other visible/visually discernable aspect of an image, particularly a digital image, and more particularly a digital image of a document. In accordance with various exemplary embodiments of the presently described inventive concepts, "features" of images may include, without limitation, lines, graphical lines, textures, pictures, icons, elements, patterns, etc., any portion of the foregoing, and/or any combination of the foregoing (and/or portions thereof) examples, as well as equivalents thereof that would be understood by a person having ordinary skill in the art upon reading the present disclosure.

The present descriptions refer in several places to "tolerance" and/or "units of tolerance." These descriptions shall be understood as referring to a distance (i.e., distance within which the x- and/or y-position) between two different visible features that is the smallest effective distance represented within an image. In other words, all distances between visible features depicted in an image that are less than the defined "unit of tolerance" are considered equivalent (and within a given multiple of units of tolerance, e.g., all distances falling between two units of tolerance and three units of tolerance may be considered equivalent), depending on the particular application and as consistent with the foregoing descriptions). In one exemplary embodiment, a "unit of tolerance" is established as one third of the average character width as observed across all OCR elements within the document under consideration. However, skilled artisans will appreciate that other values, particularly values based on analyzing statistics (especially geometric statistics) of elements and/or features (preferably textual elements) may be employed to measure/define units of tolerance without departing from the scope of the presently described inventive concepts.

Skilled artisans will further appreciate the critical features/and or advantages of using units of tolerance as a measure of distance include, but are not limited to: (1) different images of the same document but at different resolutions will be processed in the same way, and (2) small differences in the pixel coordinates of visual features that are intended to be considered as aligned (e.g., as may occur due to printing inconsistencies, misalignment during scanning, etc. as would be understood by a person having ordinary skill in the art upon reading the present disclosure) are correctly interpreted as being aligned and are not misconstrued as being misaligned. Herein, the smallest standardized unit of distance as defined above is equivalently identified as one unit of "tolerance".

A "phrase" as referenced herein refers to a group of elements (usually a group of words, numbers, and/or symbols) that reside on the same text line and that are closely spaced, such that a human reader would understand that the elements comprising the phrase are intended to be considered as a single unit. For instance, in various embodiments, phrases may include sentence fragments, sentences, lines of text or portions thereof, numerical values and corresponding unit symbols, etc. as would be understood by a person having ordinary skill in the art upon reading the present disclosure. The amount of space permitted between elements in a phrase may be set to correspond to known indicia of a separation between phrases, such as a maximum number of pixels, maximum number of character widths/whitespaces, an average character width, as a fraction of character height, based on OCR characteristics (such as geometric characteristics of characters, of bounding boxes corresponding to characters, or any other suitable measure of distance), etc. in various embodiments and as would be appreciated by a person having ordinary skill in the art upon reading the present disclosure. In preferred approaches, especially where text is represented in a Unicode or monospace format, the amount of space permitted between elements is, according to one embodiment, one character width. Skilled artisans reading the present application will understand, in light of subsequent detailed disclosure, that certain embodiments of the presently described inventive embodiments may employ other definitions for the amount of space permitted between elements, e.g., as described hereinbelow regarding grouping of elements/sections.

"Excluded regions" as referenced herein shall be understood as including portions of digital images that, based on pre-processing zone and/or layout analysis as described herein, are determined to be either a non-table region/zone, or a region previously identified as a grid table.

Keeping the foregoing definitions in mind, the following description discloses several preferred implementations of systems, methods and computer program products for detecting, analyzing, classifying, and extracting information from a diverse set of documents including various types of tables. Some or all of said tables, and/or constituent data, may be of interest for use in downstream applications.

In addition, while various exemplary embodiments of documents and corresponding table detection, extraction, and analysis approaches are described with reference to documents printed/depicted in standard "letter" format (8.5" wide×11" long), and a "portrait" orientation, with text correspondingly oriented in a horizontal procession (such as left-to-right, e.g., for English) as opposed to a right-to-left procession, (e.g., Arabic, Hebrew, etc.) it shall be understood that the inventive concepts described herein are equally applicable, e.g., with appropriate change of axis/axes, to documents with either or both text orientations represented, and/or documents having different dimensions, orientations, aspect ratios, etc. without departing from the scope of the present disclosure.

Moreover, the presently described inventive embodiments are advantageously applicable, individually and in combination, to single-page and multi-page tables/tabular data arrangements, though unique considerations/rules may be implemented in certain embodiments to facilitate single-page versus multi-page documents, as described in further detail hereinbelow.

Moreover still, it shall be appreciated that the presently described inventive concepts, including pre-processing, detection, extraction, and classification techniques detailed below, do not utilize or rely on "template matching" or associated techniques to accomplish the advantageous results disclosed herein. While certain embodiments of classification may utilize learn-by-example or other supervised machine learning techniques, it shall be understood that use of feature vectors to represent image data, and/or to evaluate similarity between images or portions thereof, is not to be considered a form of "template matching" in accordance with the presently described inventive concepts.

General Embodiments

According to one general embodiment, a computer-implemented method for detecting, extracting, and classifying tables and/or tabular data arrangements within an original image includes: pre-processing the original image to generate processed image data; detecting one or more tables and/or one or more tabular data arrangements within the processed image data; extracting the one or more tables and/or the one or more tabular data arrangements from the processed image data; and classifying either: the one or more extracted tables; portions of the one or more extracted tables; the one or more extracted tabular data arrangements; portions of the one or more extracted tabular data arrangements, or a combination of: the one or more extracted tables, the portions of the one or more extracted tables, the one or more extracted tabular data arrangements, and/or the portions of the one or more extracted tabular data arrangements.

According to another general embodiment, a computer-implemented method for pre-processing an original image depicting one or more tables and/or one or more tabular data arrangements includes performing image processing, character recognition, and layout analysis. Image processing comprises: detecting graphical lines depicted in the original image; detecting boxes depicted in the original image; detecting bars and/or stacks depicted in the original image; determining effective rectangles for textual characters depicted in the original image; and identifying delineating lines depicted in the original image. Character recognition involves: statistically analyzing one or more geometric characteristics of the textual characters depicted in the original image; detecting and/or correcting recognition errors corresponding to the textual characters depicted in the original image; filtering the textual characters depicted in the original image; grouping some or all of the textual characters depicted in the original image; and characterizing a context and/or a value of some or all of the textual characters depicted in the original image. Layout analysis includes identifying one or more excluded zones within the original image, wherein the excluded zones do not encompass any of the one or more tables and/or any of the one or more tabular data arrangements.

According to yet another general embodiment, a computer-implemented method for detecting one or more grid-like tables and/or one or more grid-like tabular data arrangements depicted in image data includes: evaluating the image data against a first set of rules defining characteristics of grid-like tables and/or grid-like tabular data arrangements, and defining a structure of the one or more grid-like tables and/or one or more grid-like tabular data arrangements based on the evaluation; evaluating the image data against a second set of rules defining characteristics of cells, and identifying one or more cells of the one or more grid-like tables and/or the one or more grid-like tabular data arrangements based on the evaluation; generating, based on a result of the first evaluation and a result of the second evaluation, a set of grid-like table candidates, and/or a set of grid-like tabular data arrangement candidates; and defining, from the set of grid-like table candidates, and/or the set of grid-like tabular data arrangement candidates, the one or more grid-like tables and/or the one or more grid-like tabular data arrangements.

According to still yet another general embodiment, a computer-implemented method for detecting one or more non-grid-like tables and/or one or more non-grid-like tabular data arrangements depicted in image data includes: evaluating the image data against a first set of rules defining characteristics of column seeds, and identifying a set of column seed candidates based on the first evaluation; evaluating the image data against a second set of rules defining characteristics of column clusters, and identifying a set of column cluster candidates based on the second evaluation; evaluating the image data against a third set of rules defining criteria for updating column clusters, and either or both of: reformulating one or more existing column definitions based on the third evaluation; and modifying a definition of some or all of the column cluster candidates based on the third evaluation; evaluating the image data against a fourth set of rules defining characteristics of row title columns, and identifying a set of row title column candidates based on the fourth evaluation; defining a structure and a content of the one or more tables and/or the one or more tabular data arrangements based on a result of some or all of: the first evaluation; the second evaluation; the third evaluation; and the fourth evaluation.

According to an additional general embodiment, a computer-implemented method for extracting information from one or more non-grid-like tables and/or one or more non-grid-like tabular data arrangements depicted in image data includes: determining one or more properties of each text line depicted in the original image; determining, based at least in part on the text lines, one or more regions of the one or more tables and/or one or more tabular data arrangements; identifying one or more vertical graphical lines, one or more implied vertical lines, and/or one or more horizontal graphical lines at least partially present in a header region of the one or more tables and/or the one or more tabular data arrangements; excluding one or more of the lines of text from the header region and/or the data region based at least in part on the one or more vertical graphical lines, and/or the one or more implied vertical lines; identifying one or more columns in the data region; adjusting and/or expanding the header region; determining one or more row clusters within the data region; and computing final columns for the one or more tables and/or one or more tabular data arrangements based at least in part on the identified vertical graphical lines, any implied vertical lines, and/or one or more of the horizontal graphical lines.

According to a further general embodiment, a computer-implemented method for classifying one or more tables and/or one or more tabular data arrangements depicted in image data includes: training at least one machine learning model, using a training dataset representing a plurality of different tables and/or tabular data arrangements, based at least in part on a plurality of recognized textual elements within the training dataset; outputting at least one trained classification model based on the training, wherein the at least one trained classification model is configured to classify one or more tables and/or one or more tabular data arrangements represented within a test dataset according to: one or more table classifications; one or more tabular data arrangement classifications; and/or one or more column classifications; and classifying the one or more tables and/or the one or more tabular data arrangements represented within the test dataset using the at least one trained classification model.

According to one general embodiment, a computer-implemented method for classifying columns of one or more tables and/or one or more tabular data arrangements depicted in image data includes: training at least one machine learning model, using a training dataset representing a plurality of different types of tables and/or tabular data arrangements, based at least in part on: a plurality of recognized textual elements within the training dataset; and a plurality of recognized regions and/or subregions of the different types of tables and/or tabular data arrangements represented by the training dataset; outputting at least one trained column classification model based on the training, wherein each trained column classification model is configured to classify columns of a particular type of table or a particular type of tabular data arrangement represented within the training dataset; and classifying, using the at least one trained column classification model, a plurality of columns of tables and/or tabular data arrangements represented by a test dataset.

General Computing Concepts

The description herein is presented to enable any person skilled in the art to make and use the invention and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

In particular, various embodiments of the invention discussed herein are implemented using the Internet as a means of communicating among a plurality of computer systems. One skilled in the art will recognize that the present invention is not limited to the use of the Internet as a communication medium and that alternative methods of the invention may accommodate the use of a private intranet, a Local Area Network (LAN), a Wide Area Network (WAN) or other means of communication. In addition, various combinations of wired, wireless (e.g., radio frequency) and optical communication links may be utilized.

The program environment in which one embodiment of the invention may be executed illustratively incorporates one or more general-purpose computers or special-purpose devices such hand-held computers. Details of such devices (e.g., processor, memory, data storage, input and output devices) are well known and are omitted for the sake of clarity.

It should also be understood that the techniques of the present invention might be implemented using a variety of technologies. For example, the methods described herein may be implemented in software running on a computer system, or implemented in hardware utilizing one or more processors and logic (hardware and/or software) for performing operations of the method, application specific integrated circuits, programmable logic devices such as Field Programmable Gate Arrays (FPGAs), and/or various combinations thereof. In one illustrative approach, methods described herein may be implemented by a series of computer-executable instructions residing on a storage medium such as a physical (e.g., non-transitory) computer-readable medium. In addition, although specific embodiments of the invention may employ object-oriented software programming concepts, the invention is not so limited and is easily adapted to employ other forms of directing the operation of a computer.

The invention can also be provided in the form of a computer program product comprising a computer readable storage or signal medium having computer code thereon, which may be executed by a computing device (e.g., a processor) and/or system. A computer readable storage medium can include any medium capable of storing computer code thereon for use by a computing device or system, including optical media such as read only and writeable CD and DVD, magnetic memory or medium (e.g., hard disk drive, tape), semiconductor memory (e.g., FLASH memory and other portable memory cards, etc.), firmware encoded in a chip, etc.

A computer readable signal medium is one that does not fit within the aforementioned storage medium class. For example, illustrative computer readable signal media communicate or otherwise transfer transitory signals within a system, between systems e.g., via a physical or virtual network, etc.

Figure 2A:
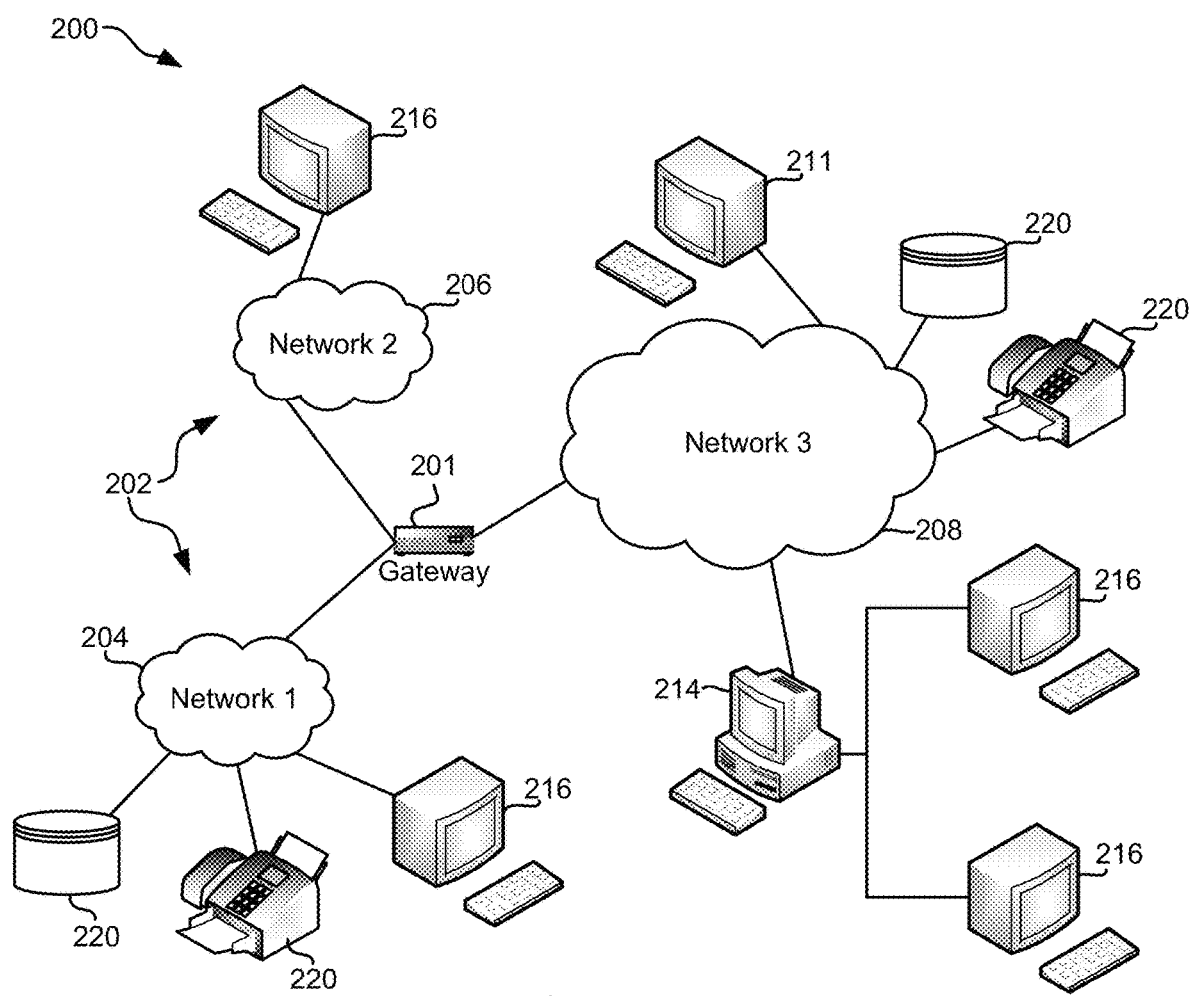
FIG. 2A illustrates a network architecture, in accordance with one implementation of the presently disclosed inventive concepts.

FIG. 2A illustrates an architecture 200, in accordance with one approach. As shown in FIG. 2A, a plurality of remote networks 202 are provided including a first remote network 204 and a second remote network 206. A gateway 201 may be coupled between the remote networks 202 and a proximate network 208. In the context of the present architecture 200, the networks 204, 206 may each take any form including, but not limited to a local area network (LAN), a wide area network (WAN) such as the Internet, public switched telephone network (PSTN), internal telephone network, etc.

In use, the gateway 201 serves as an entrance point from the remote networks 202 to the proximate network 208. As such, the gateway 201 may function as a router, which is capable of directing a given packet of data that arrives at the gateway 201, and a switch, which furnishes the actual path in and out of the gateway 201 for a given packet.

Further included is at least one data server 214 coupled to the proximate network 208, and which is accessible from the remote networks 202 via the gateway 201. It should be noted that the data server(s) 214 may include any type of computing device/groupware. Coupled to each data server 214 is a plurality of user devices 216. User devices 216 may also be connected directly through one of the networks 204, 206, 208. Such user devices 216 may include a desktop computer, lap-top computer, hand-held computer, printer or any other type of logic. It should be noted that a user device 211 may also be directly coupled to any of the networks, in one approach.

A peripheral 220 or series of peripherals 220, e.g., facsimile machines, printers, networked and/or local storage units or systems, etc., may be coupled to one or more of the networks 204, 206, 208. It should be noted that databases and/or additional components may be utilized with, or integrated into, any type of network element coupled to the networks 204, 206, 208. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some implementations.

In more approaches, one or more networks 204, 206, 208, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2B:
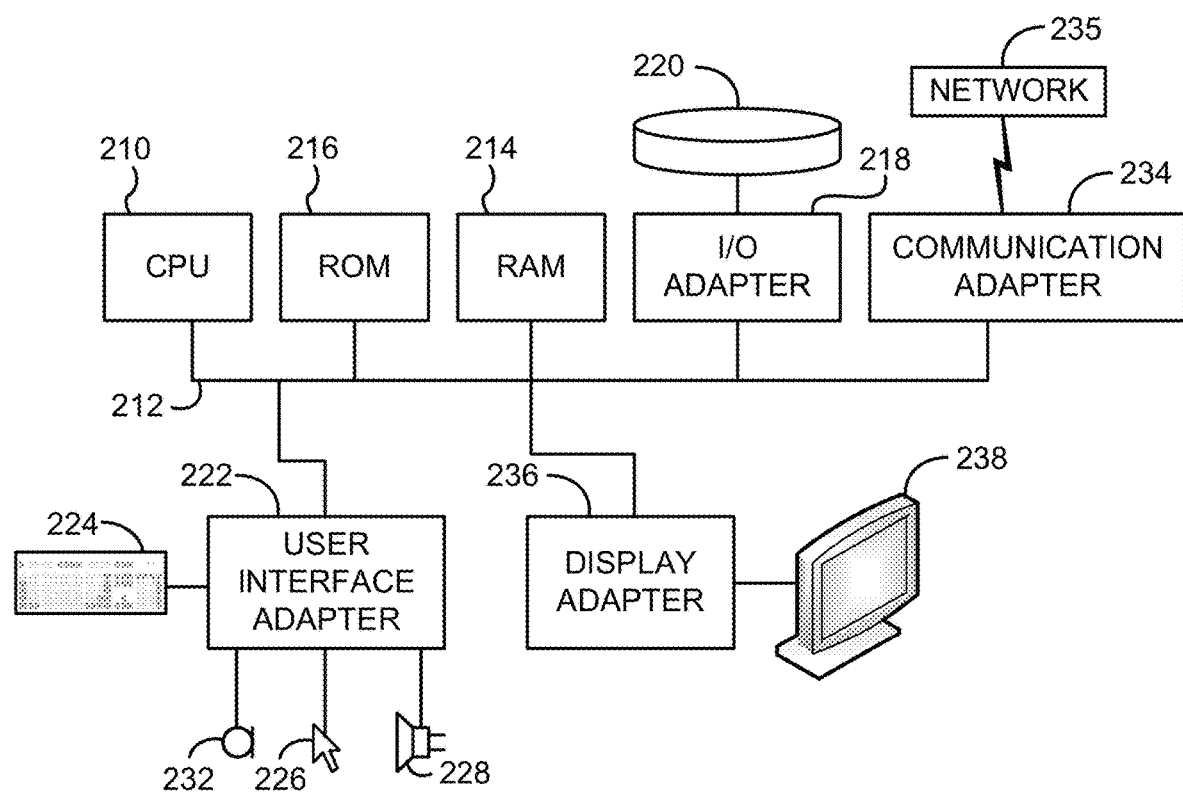
FIG. 2B shows a representative hardware environment that may be associated with the servers and/or clients of FIG. 2A, in accordance with one implementation of the presently disclosed inventive concepts.

FIG. 2B shows a representative hardware environment associated with a user device 216 and/or server 214 of FIG. 2A, in accordance with one approach. Such Figure illustrates a typical hardware configuration of a workstation having a central processing unit 210, such as a microprocessor, and a number of other units interconnected via a system bus 212.

The workstation shown in FIG. 2B includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as virtual reality googles and/or handheld controllers, a touch screen (e.g., for receiving/detecting gestures) and a digital camera (not shown, but also optionally for receiving/detecting gestures, recording video, etc.) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred approach may also be implemented on platforms and operating systems other than those mentioned. A preferred approach may be written using eXtensible Markup Language (XML), C, and/or C++ language, or other programming languages, along with an object-oriented programming methodology. Object oriented programming (OOP), which has become increasingly used to develop complex applications, may be used.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some implementations, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to implementations of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various implementations of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various implementations may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Problem(s) to be Solved: Technical Challenges Associated with Table/Tabular Data Detection, Extraction, and Classification Returning to the notion of tables and tabular data within document(s), the presently disclosed inventive concepts advantageously address technological limitations and impediments that prevented or frustrated previous efforts to automate and/or standardize the detection, extraction, and classification of tables and/or portions thereof (especially column(s)) from/within documents.

For instance, technical challenges encountered while attempting to detect tables within documents and/or tables, and addressed by the inventive concepts described herein include the following.

Identifying/Interpreting Diverse Structure, Arrangement, and/or Formatting Conventions While tables and tabular arrangements of data are conventionally characterized by substantially rectangular, grid-like structures (where each cell is substantially aligned with vertically and horizontally adjacent cells, and/or all cells are delimited by graphical lines and/or gaps (e.g., whitespace)), in practical applications table and tabular data arrangements are often represented in very diverse ways, particularly with respect to structure (i.e., physical layout of the table/data), arrangement, (i.e., how data are organized within the overall structure, e.g., order of columns/rows) and formatting (i.e., manner in which data (including any headers, footers, title, or other descriptor of the data in the table/arrangement) are represented).

The lack of a standard or governing convention for the structure, arrangement, and format of any given table, e.g., as exemplified by in various embodiments described and/or depicted herein, makes robust detection of tables, and data particularly problematic. For example, data may be arranged in different locations with respect to different documents including similar tables (e.g., different columns, rows, etc.). Data may be formatted differently (e.g., using different units, patterns of expression, etc.), and/or tables may have different structures (e.g., different numbers of rows/columns, spacing between rows/columns, presence/absence of some or all graphical lines, etc.). Additionally, extraneous and/or ancillary information may be printed within the boundary of the table (e.g., as unstructured text), while not constituting a portion of the tabular data that is desired to be extracted from the table (e.g., notes printed between rows, etc.). Ensuring a robust detection, classification, and extraction tool requires addressing each of these variables.

Problems associated with identifying/interpreting diverse structure, arrangement, and/or formatting conventions are addressed, in various embodiments, by the presently disclosed inventive approaches to table detection and/or table extraction, as described in further detail hereinbelow.

Distinguishing Tables from Other Structured and/or Semi-Structured Information (Especially Common Information Appearing in Different Document Types)

Tables and tabular data arrangements are far from the only form of structured, or even semi-structured, information appearing in documents. Accordingly, robust table/tabular data detection techniques are preferably able to distinguish between tables/tabular data and other forms of structured information, such as graphics (charts, logos, etc.), multi-column text pages (e.g., as commonly seen in newspapers), lists (e.g., numbered lists, bulleted lists, key/value lists, etc.) and even text paragraphs (e.g., a block of text formatted with "justify" text alignment, a block of Unicode text, etc.). This problem is exacerbated as a function of how many tables/tabular data arrangements may be found in a given document, especially where the tables/arrangements follow distinct structural and/or organizational characteristics.

Problems associated with distinguishing tables from other structured and/or semi-structured information (especially common information appearing in different document types) are addressed, inter alia and in accordance with various embodiments, by the presently disclosed inventive approaches to layout analysis, including zone identification and exclusion, as described in further detail hereinbelow.

Detecting/Distinguishing "Usable" Graphical Lines within Image Data

Skilled artisans will appreciate that not all lines, and even not all graphical lines, are necessarily useful or even facilitate detection of tables within image data. For instance, many tables may include small gaps, intersecting lines, misaligned graphical lines, line-like artifacts, and even false lines (e.g., as commonly present in low-quality images, in various approaches). Such gaps, intersecting lines, alignment, artifacts, etc. frustrate the ability to detect grid-like structures, particularly within image data.

For instance, in one exemplary embodiment of misalignment, there will be a "stepwise" line. For example, a horizontal line might be defined as located in a vertical position y=3 for a series of corresponding x positions, then step up to y=5 or down to y=2. Such misalignment undesirably causes the potential to treat the misaligned single line as multiple lines. Furthermore, graphical lines can frequently be wider than a single pixel, and the above example can equivalently apply to the top and/or bottom of the horizontal line (or equivalently left/right of a vertical line).

Similarly, artifacts such as "garbage" lines appearing in (e.g., low resolution, low illumination, improperly contrasted, etc.) image data may cause substantial misidentification of lines of a table, respective data values, and or a failure to identify the table at all. Also, certain text characters may include or otherwise substantially represent one or more lines, such as a character "E," which includes lines (four, one vertical and three horizontal), a character "1" or "l", each of which include a single line, etc. as will be appreciated by skilled artisans upon reading the present disclosure. Robust table/tabular data detection techniques preferably account for these (additional) sources of error. Similar problems exist where text characters partially or wholly overlap/coincide with graphical lines of a table/tabular data arrangement.

Problems associated with detecting/distinguishing "usable" (i.e., detectable by human visual inspection)

graphical lines within image data are addressed, inter alia and in accordance with various embodiments, by the presently disclosed inventive approaches to image processing, as described in further detail hereinbelow.

Detecting and Correcting Character Recognition Errors

To the extent that table/tabular data detection relies on text, especially text depicted in image data, it is essential for the character recognition process employed to accurately recognize the characters represented on the document. Errors in character recognition often cause problems with regard to segmentation (i.e., determining whether a particular element includes one, or more, words, which may cause improper definition of rows/columns), as well as with regard to content (e.g., "1980" vs. "1980", which may prohibit keyword matching or other content analyses).

Splitting Over-Joined Elements, Joining Over-Split Elements, and Handling Missing Characters Problems associated with detecting and correcting character recognition errors are addressed, inter alia and in accordance with various embodiments, by the presently disclosed inventive approaches to character recognition, and especially error recognition and correction, as described in further detail hereinbelow.

Misaligned Text

Documents, especially printed documents, and/or images thereof, such as scanned images or photographs of documents, often include misaligned text, e.g., due to scanning/imaging errors (e.g., page (mis)orientation, movement during imaging, etc.) and/or artifacts of the imaging process (e.g., projective effects, geometric distortions, etc.). When seeking tables and/or tabular arrangements of data, which are typically constrained to grid-like arrangement, such misalignment often causes erroneous detection of multiple lines of text where in fact fewer lines (often one line) contain the text in the physical document. Automated, image-based table detection techniques preferably address the misalignment issue to ensure accurate representation of data relative to the document, as well as recall of tables generally (e.g., where misalignment is sufficiently severe that the data do not represent a substantially grid-like or rectangular layout).

Problems associated with detecting and correcting misaligned text are addressed, inter alia and in accordance with various embodiments, by the presently disclosed inventive approaches to layout analysis—zone identification and exclusion, and especially descriptions regarding textual zones, as described in further detail hereinbelow.

Detecting Intersecting Lines and Characters

Sometimes graphical lines, particularly lines within a document including a table or tabular data arrangement, intersect with text (e.g., via close underlining, strikethrough, handwritten annotations, etc. as would be understood by a person having ordinary skill in the art reading the present disclosure). Such intersections are particularly problematic for the detection of graphical lines and of text as individual elements of an image. Frequently neither the line, nor the character, are identified using conventional image processing and/or character recognition techniques.

Accordingly, the presently disclosed inventive concepts, in illustrative embodiments, address problems associated with intersecting characters/lines as described hereinbelow with reference to image processing, particularly line detection.

Detecting Adjacent Tables and Distinguishing from Single Large Tables

Furthermore, automated table detection techniques, particularly where using image data as input/source information, face challenges with respect to detecting, and moreover distinguishing, adjacent tables/tabular data arrangements from single, larger tables/arrangements. Vertically adjacent and horizontally adjacent tables/arrangements of data are easily conflated with single larger tables having gaps between rows/columns. Accordingly, automated solutions for table detection are preferably able to distinguish between separate, adjacent tables/data arrangements and single tables having gaps.

Problems associated with detecting adjacent tables and distinguishing from single large tables are addressed, inter alia and in accordance with various embodiments, by the presently disclosed inventive approaches to table detection, and particularly to non-grid detection, as described in further detail hereinbelow.

Detecting Gaps within Tables

As noted above, tables and tabular arrangements of data often include vertical gaps, e.g., empty rows. Particularly where using image data as input/source information, such gaps are easily and commonly interpreted as a break or delimiting indicator for a table, i.e., vertical gaps often cause image-based analyses to "detect" multiple (often adjacent) tables, separated by the vertical gap(s) (e.g., empty rows). Similar errors are common for tables/data arrangements with horizontal gaps (e.g., empty columns). Avoiding improper "splitting" or "detection" of multiple tables due to gaps represents a significant technical challenge for detection.

For instance, FIG. 3A depicts an example of a single table 300 that is commonly interpreted by automated/computerized analysis techniques as two tables (indicated by regions 302 and 304), e.g., introducing/interpreting existence of a boundary above label 306, "Net Realized Loss and Unrealized Deprecations" due to the continuous stretch of whitespace extending across the entire horizontal span of the table, and consistently within a small vertical span above label 306.

Figure 3B:
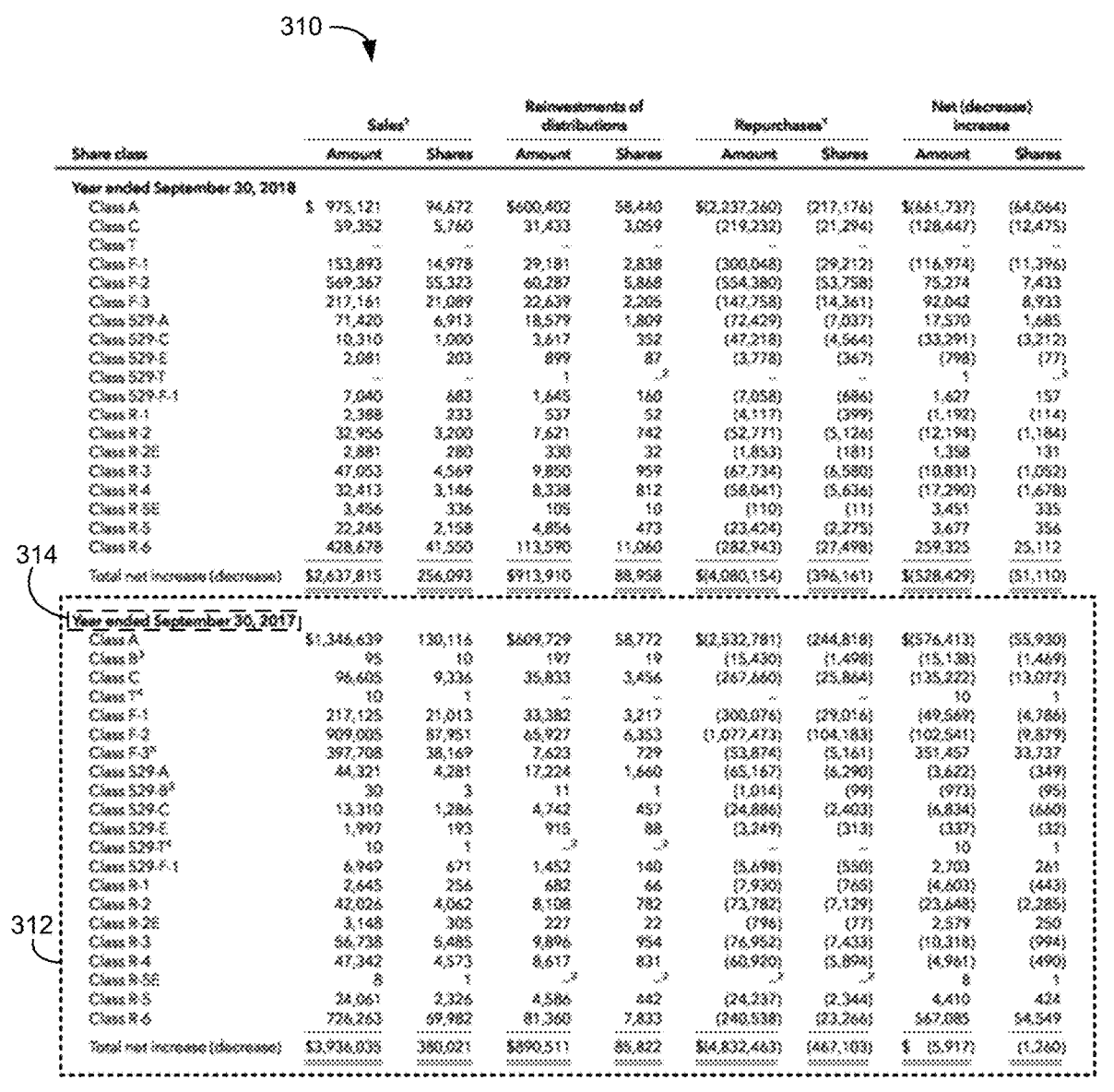

In another embodiment, table 310 as shown in FIG. 3B is easily misinterpreted by automated/computerized analytical approaches as lacking any header labels for the region 312, including and below label 314 "Year ended September 30, 2017." However, a human reader easily implies, e.g., from the existence of aligned headers ("Share Class," "Sales," "Reinvestments of distributions," "Repurchases," "Net (decrease) increase," and respective "Amount," and "Shares") at the top of the table/tabular arrangement, that such header labels apply to the entire data table 310, not just the portion corresponding to "Year ended September 30, 2018.

Problems associated with detecting gaps within tables are addressed, inter alia and in accordance with various embodiments, by the presently disclosed inventive approaches to table detection, and especially descriptions regarding non-grid detection and joining tables, as described in further detail hereinbelow.

Detecting Table Boundaries

Yet another challenge presented by attempting to detect, classify, and/or extract information from tables and/or tabular data arrangements involves determining the location of table boundaries. This issue is particularly challenging for tables having a complex structure (e.g., deviating from a strictly rectangular form) such as often is the case when a complex header structure is employed, where data alignment within the table varies, where data include potentially misleading characters and/or formatting (e.g., underline, including dashes, hyphens, bars, or other linear elements), where text appear in close proximity to one or more table boundaries (e.g., table titles, text paragraph(s), captions, etc. appearing within close proximity to a table boundary).

As noted by the examples hereinabove, conventional approaches to table detection, extraction, etc. typically employ either character recognition techniques, or image processing techniques, to infer knowledge about detected tables/tabular data arrangements. However, this approach erroneously detects lines as characters, and vise-versa. Accordingly, the presence of lines and intersecting characters can defeat detection of both lines and characters. This is one reason the presently disclosed inventive concepts include removing recognized characters/text lines prior to performing graphical line detection. Also, simply removing/erasing the lines and/or detected characters is not always sufficient, as it can remove portions of the extraction target (e.g., character or line). To address this and other problems described herein regarding detecting table boundaries, the presently described inventive concepts perform "painting over" of OCR characters in a specific manner configured to remove the object(s) not of interest (e.g., character), and recreate the overlapping/other portion of the object of interest (e.g., line).

In addition, according to preferred approaches, special care should be taken to avoid creating "artificial" lines in the "painting over" process, as described in further detail hereinbelow, e.g., with respect to associating column headers with data columns. For example, according to one exemplary embodiment involving an image with black foreground text overlaying a light gray background, if one were to simply paint white over the entire rectangle of the text, one would create edges in the image that would be detected as graphical lines. Of course, skilled artisans will understand upon reading the present disclosure that real-world examples are often more complex, with variable background/foreground color profiles, intersecting lines and characters, etc. as described elsewhere herein.

Problems associated with detecting boundaries within tables are addressed, inter alia and in accordance with various embodiments, by the presently disclosed inventive approaches to table detection, as described in further detail hereinbelow.

Identifying Multi-Line Rows, Distinguishing from Raw Text Lines

Another challenge presented by attempting table/tabular data detection, classification, and/or extraction, again particularly when using image data as input/source information, is to distinguish cells/rows of a table that include multiple lines of text from rows that are comprised of a single line of text, and also distinguishing rows in the table from other, multi-line blocks of text, particularly where such multi-line text portions are or include structured information, such as is the case for many lists.

Problems associated with identifying multi-line rows and distinguishing from raw text are addressed, inter alia and in accordance with various embodiments, by the presently disclosed inventive approaches to table detection and table extraction, as described in further detail hereinbelow.

Distinguishing "Closely Spaced" Columns from Single Columns

Like distinguishing cells including multiple rows/lines of text, tables exhibiting closely spaced columns, especially if not delineated by graphical lines, are easily misinterpreted (particularly when relying on image processing) as single columns. A primary problem is that the space between columns can be approximately equal to, or even less than, the typical space between words. Accordingly, from a purely spatial perspective one cannot distinguish such columns from a single column (since a column can contain more than one word horizontally).

For example, according to one embodiment of "closely spaced" columns, a table/tabular data arrangement includes a plurality of data values, which for simplicity may be arranged in a substantially grid-like structure (though the inventive approaches described herein shall be understood as applicable to any type or form of table/tabular data arrangement, including non-grid like tables/tabular data arrangements, irregular tables/tabular data arrangements, etc. as described herein, and equivalents thereof which would be understood by a person having ordinary skill in the art upon reading the present disclosure). The table/tabular data arrangement includes adjacent columns A and B. Even where the exemplary table exhibits a substantially grid-like structure, a first element $A_1$ and a second element $B_1$ each appearing in the same row, may be characterized by at least partial overlap with respect to the corresponding x-value position within the digital image, particularly if the elements reside on different text lines (i.e., the row in question is comprised of multiple text lines). In other words, $A_1$ and $B_1$ may be considered as "overlapping" with respect to x-value position within the digital image. This overlap can cause conventional automated detection techniques to erroneously consider $A_1$ and $B_1$ as a single element, thus part of a single column, where in fact two distinct columns and corresponding elements exist.

Indeed, even where elements $A_1$ and $B_1$ do not overlap with respect to x-value position, but are characterized by a small gap therebetween (e.g., a span of approximately one average character width or less), conventional automated techniques conflate the elements as corresponding to a single column, and similarly misunderstand the "true" structure of the table/tabular data arrangement.

A related but distinct problem occurs where elements $A_1$ and $B_2$, located in different rows of the table/tabular data arrangement, are characterized by at least partial overlap with respect to x-value position. In this "slightly overlapping" scenario, $A_1$ and/or $B_2$ "spill over" from one column to an adjacent column, which may obscure bounding graphical lines, and/or implied lines, due to overlapping data between columns. Such obscuring of information useful for determining the "true" structure of the table/tabular data arrangement commonly cause conventional automated detection techniques to erroneously misinterpret the number of columns present in the given table/tabular data arrangement, especially where a non-grid like structure is present.

For example, referring to FIG. 3C, elements 322 (corresponding to A1 in the foregoing description, and having a value of "Berkshire Hathaway no. Class A") and 324 (corresponding to B2 in the foregoing description, and having a value of "105,806,700) of table 320 slightly overlap with respect to x-value position. While a human (based on subjective analysis of the table 320, e.g., noting substantial horizontal alignment of values in each column and presence of whitespace between each column) would readily reach the conclusion that elements 322 and 324 belong to different columns, conventional automated approaches frequently misinterpret table 320 such that the leftmost two columns are considered a single column. Elements 326 and 328 also slightly overlap with element 324 as shown in FIG. 3C, which increases the likelihood that a conventional automated approach would conflate the leftmost two columns as a single column (as there are multiple overlapping elements).

Overlap can result from various factors, such as element alignment, presence of whitespace or other equivalent placeholder (especially where there is little whitespace present throughout the table/tabular data arrangement, as is the case for compact tables having minimal width (x-value magnitude)), non-uniform whitespace in different rows of the table/tabular data arrangement, or any other suitable arrangement of elements within tables/tabular data arrangements as would be understood by a person having ordinary skill in the art upon reading the present disclosure.

In more embodiments, a column may be misconstrued as multiple columns where text depicted in one or more rows of the column is interpreted as including multiple phrases. For instance, a simplified, illustrative table 330 as shown in FIG. 3D includes a single column having a plurality of rows 332a-332i. Rows 332e and 332f are characterized by relatively long text strings compared to rows 332a-332d and 332g-332i. Moreover, each text string in rows 332e and 332f includes a substantial whitespace e.g., greater than two average character widths (preferably as measured between the dashed lines in the figure). In some embodiments, text strings similar to those depicted in FIG. 3D may be construed as including multiple phrases, and thus a corresponding number of columns, where the "true" table structure includes only a single column.

On the other hand, if rows 332e and 332f are interpreted as including a single phrase, then the table 330 will be properly understood as including only a single column. Similarly, if another row has a text string that spans the whitespace separating portions of the text strings shown in rows 332e and 332f, then table 330 will be properly understood as including only a single column despite the arrangement of the text strings in rows 332e and 332f.

Accordingly, in preferred embodiments of the presently disclosed techniques, (particularly table detection and extraction) columns may be defined according to the number of "phrases" detected within given row(s) of the table/tabular data arrangement. Most preferably, columns are defined such that each column of the table/tabular data arrangement includes only one phrase.

While humans can easily understand the "true" structure of the table/tabular data arrangement, table/tabular data arrangement detection techniques developed to date are ill equipped to discern the structure of tables/tabular data arrangements including closely spaced columns and/or overlapping elements within a given row of the table.

Problems associated with distinguishing single versus closely spaced columns are addressed, inter alia and in accordance with various embodiments, by the presently disclosed inventive approaches to table extraction as described in further detail hereinbelow.

Identifying Intervening Text not Part of the Table but within Table Boundaries

Yet another challenge presented when attempting to automate/computerize detection, extraction, and analysis of tabular data arrangements/tables arises from user-created notes, comments, annotations, modifications, and other notations not properly/typically considered part of the table per se, i.e., not forming a data value or any label, descriptor, etc. thereof that is integral to the table/tabular structure. For example, in accordance with the exemplary table 400 shown in FIG. 4, regions 402 are not part of the table as defined by headers, but rather additional information written within the outer boundary of the table structure.

Problems associated with identifying intervening text within the boundary of the table, but which is not part of the table, e.g., user notes, annotations, etc., are addressed, inter alia and in accordance with various embodiments, by the presently disclosed inventive approaches to finding graphical lines in the header region, especially regarding excluding text lines, as described in further detail hereinbelow.

Associating Column Headers with Data Columns

Another challenge for automated/computerized detection, extraction, and analysis of tables/tabular data involves associating column headers with data columns. This challenge is yet another aspect addressing problems caused by differences in alignment of values throughout tabular data.

For instance, values in a "data section" (generally referring to the internal portion of the table/tabular data arrangement, as (optionally) qualified by one or more labels and/or descriptors such as: table title, header(s), row label(s), column descriptor(s), row descriptor(s), etc. as described herein and as would be appreciated by a person having ordinary skill upon reading the present disclosure) are often characterized by at least partial alignment along one or more axes of a document, table, page, etc. However, some or all of the corresponding label(s) may not align well with the pattern established by the data values. In some approaches, such misalignment may present similar challenges as described hereinabove regarding "intervening text."

A common consequence of such misalignment is that column headers do not have clearly defined/delineated upper boundaries/termini. Instead, the column headers may be characterized by a "jagged" appearance with respect to upper boundary, such as shown in FIG. 5, according to one exemplary embodiment.

Problems associated with associating column headers with data columns are addressed, inter alia and in accordance with various embodiments, by the presently disclosed inventive approaches to non-grid detection, and particularly building headers upward, as described in further detail hereinbelow.

Figures 4, 5:
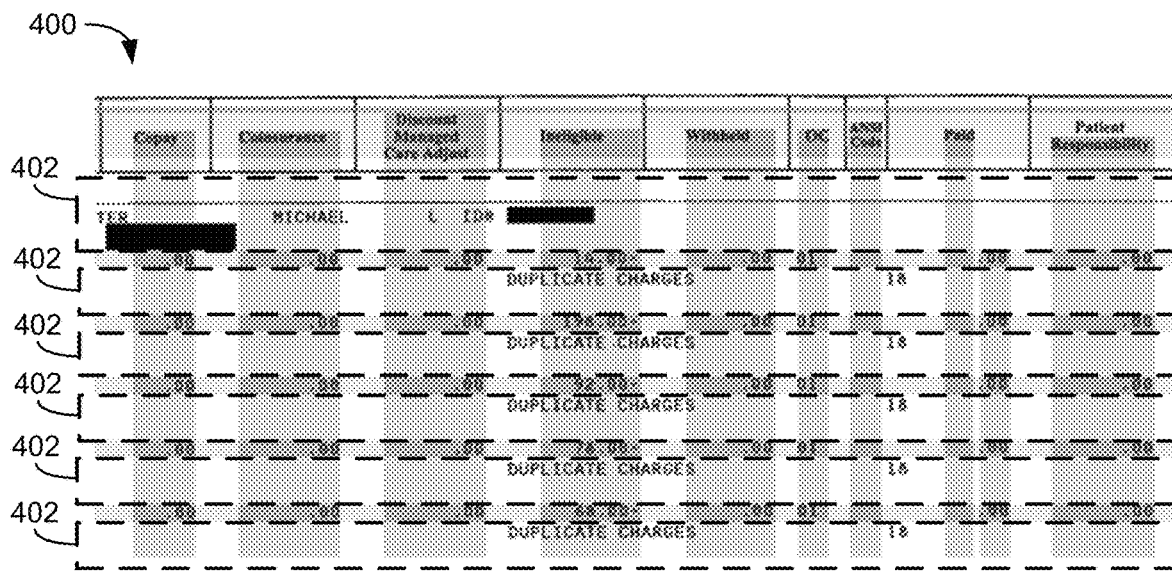
FIG. 4 shows a table including intervening text that are not part of a formal table structure, according to one exemplary embodiment.
FIG. 5 is an example of a table including aligned data values and non-aligned headers, according to one embodiment.

For instance, in table 500 as shown in FIG. 5, the data values are rather well-aligned both vertically and horizontally (with a few notable exceptions, including unit indicators such as the "%" signs that extrude to the right and dollar or other currency signs that extrude to the left, which present their own unique challenges). However, the headers have different and more ambiguous alignment characteristics.

For example, if the data values were not present, then for header portion 502, it would be difficult (even for a human) to group the column headers appropriately, especially if lacking additional context that may be derived from the meaning of the words in the headers (here in the English language) and corresponding values/units. In other words, the header portion 502 of table 500 is a good example of how headers may not be suitable for determining table structure based on alignment of text, e.g., column headers, or even based on alignment of cells/fields of the header portion 502.

Automated/Computerized solutions for detection, extraction, and/or analysis of tables/tabular data arrangements should preferably be configured to robustly account for such variations to ensure precise identification of tables and constituent information, and advantageously enable such precision independent of any understanding of the meaning/language of the textual values of the headers. The presently disclosed inventive concepts, according to various embodiments, address these problems as discussed in greater detail regarding Finding Headers, Validating Headers, Determining the Header/Data Boundary and Building Headers Upward.

Complex Multi-Level Column Header Structure: Identifying and Distinguishing Column Headers Vs. Column Descriptors Still yet another challenge extant to automated/computerized detection, extraction, and/or analysis of tables/tabular data arrangements regards tables with "merged" cells. In particular, such cells (and the value(s) expressed therein, whether label(s) or data value(s) per se) apply to more than one column and/or row of the table. For example, as shown in table 600 of FIG. 6A, the first 4 columns 602, 604, 606, and 608 include cells that apply to more than one row of the most granular row structure (i.e., n rows of approximately equal height; in FIG. 6 the most granular row height h is equal to the height of data cells). Determining the appropriate way to reflect this context for detection, extraction, and/or analysis of tables/tabular data arrangements is yet another outstanding obstacle to using automated/computerized techniques.

Indeed, the exemplary grid-like table 600 has two kinds of "merged" cells—a first kind in data section 610 ("Compressor Foundation . . . ") and a second kind appearing in column descriptors in header region 612 ("Sulphate Content as . . . ").) While the merged cells in the data section 610 are not applicable to this example involving a substantially grid-like table, the merged cells in the header region 612 are indicative of another specific challenge presented by a multi-level header structure.

Another example of problems presented by a multi-level header structure, this time in the context of a substantially non-grid like table/tabular data arrangement 620, is illustrated in FIG. 6B. Such arrangements essentially present header information in a tree-structure and detecting all the details of such structures is a technical challenge, particularly for automated approaches that cannot leverage contextual information such as the meaning of words in the header(s), units of data values, etc. and must rely on alignment of text, and/or other visual information represented in an image of a table/tabular data arrangement.

Problems associated with complex multi-level column header structures, including but not limited to identifying and distinguishing column headers vs. column descriptors are addressed, inter alia and in accordance with various embodiments, by the presently disclosed inventive approaches to table extraction, particularly building headers upward, as described in further detail hereinbelow.

Handling Multi-Page Tables

In terms of the technical challenge, a table may span many pages with labels (particularly column headers, but also possibly row headers, depending on layout) only on the first page. Alternatively, a multi-page table may include common headers on each page. The task of identifying tables on subsequent pages as a continuation of the same table vs. a different table on each page is difficult, especially where little or no contextual information can be obtained from analyzing the text and/or lines of pages lacking labels. It is also useful, upon determining subsequent pages are a continuation of a previous table, to be able to associate the headers from the first page with the columns of the continued table on one or more, preferably all, subsequent pages.

Problems associated with handling multi-page tables are addressed, inter alia and in accordance with various embodiments, by the presently disclosed inventive approaches to table detection, particularly non-grid detection and building headers upward, as described in further detail hereinbelow.

Table and Column Classification

Capturing the contextual meaning of tables as a whole, and of individual columns/groups of columns, which is often essential for comparison of similar information represented in different ways in different tables, especially within different documents (and further still within different document types), is yet another important challenge for automated/computerized detection, extraction, and/or analysis of tables/tabular data arrangements. For instance, a core component of classification problems is how to correlate/identify the existence of similar information when represented so diversely.

Problems associated with classification, including but not limited to table and column classification are addressed, inter alia and in accordance with various embodiments, by the presently disclosed inventive approaches to classification, as described in further detail hereinbelow.

Despite the extensive challenges set forth hereinabove, and known generally in the art, one aspect enabling the presently disclosed inventive concepts to perform table detection precisely, and with high recall, across diverse table and document types, is to utilize character recognition techniques combined with the use of image data and image processing techniques. Employing image processing allows robust detection of tables without relying on assumptions required by conventional detection and extraction techniques.

Of course, robust detection, extraction, and classification of tables and tabular data from image data presents unique technical challenges, including but not limited to those described hereinabove, and which the presently disclosed inventive concepts address in accordance with the various embodiments set forth in this disclosure.

Having described the various technical challenges associated with table detection and classification, the following descriptions detail various inventive aspects, concepts, and embodiments to address said challenges and provide useful solutions for various applications of table detection and classification. The inventive approaches to table detection described herein generally include pre-processing, table detection, table extraction, and table and column classification. Each of these general procedures shall be understood as proceeding according to a set of objective rules, which are further detailed in the following descriptions. The objective rules generally define characteristics of tables/tabular data arrangements that have been derived from analyzing a large set of diverse table types, with respect to format, structure, layout, content, context, etc. of the tables/tabular data arrangements themselves, as well as the format, structure, layout, content, context, etc. of the documents themselves, and/or of non-tables/non-tabular data arrangements depicted therein (e.g., text, figures, lines, whitespace, etc. as would be understood by a skilled artisan upon reading the present descriptions).

The presently described inventive concepts shall be understood as operating according to the general principle of evaluating and/or generating image data according to a plurality of objective rules, e.g., to generate hypotheses regarding the location, structure, format, layout, content, and context of diverse types of tables/tabular data arrangements, and/or to generate images more suitable for automated analysis and characterization. It shall be understood that documents suitable for use in connection with the inventive concepts disclosed herein include single-page and/or multi-page tables/tabular data arrangements. The inventive techniques described herein are particularly suitable for practical applications such as processing large documents including many diverse types of information (including diverse types of tables/tabular data arrangements). Moreover, in preferred approaches, results generated by evaluating and/or generating image data against one set of objective rules may be used/refined to facilitate subsequent operations, e.g., results of pre-processing may be evaluated against table detection rules to generate/refine table detection results, which in turn may be evaluated against table extraction rules to generate/refine table extraction results, which again in turn may be evaluated against table classification rules to generate/refine table/tabular data arrangement classification results. In this manner the various techniques described herein shall be understood as related, and mutually beneficial to the overall application of automatically and robustly detecting, extracting, and classifying diverse types of tables/tabular data arrangements depicted within documents.

As will be appreciated by persons having ordinary skill in the art upon reading the present disclosure, the inventive techniques described herein include manipulation and generation of data structures, especially digital images, and pixels. For instance, and as described in further detail hereinbelow, detecting table boundaries and line detection may involve "painting over" connected components, or portions of connected components. This process involves manipulating image data, e.g., manipulating the intensity value(s) (either in grayscale, or according to one or more color channels) of a subset of pixels in a digital image to generate a new digital image (referred to below as a "no lines" image, in one embodiment). As pixels and digital images are understood in the art as exemplary forms of data structures, the presently disclosed inventive concepts shall be understood, in certain embodiments, as involving manipulation and/or generation of data structures.

Moreover, and as described in greater detail hereinbelow, the presently described inventive concepts also involve the use of machine learning, including training of various models such as neural networks, etc. as would be understood by a person having ordinary skill in the art upon reading the present disclosure. In particular, table and column classification as described herein preferably includes generating a training dataset, and training a machine learning model to learn criteria indicative of relevance, and/or particular table/column types represented within the training set. The trained model may be used to determine a type and/or a relevancy of various tables and/or columns within a test dataset. Accordingly, various embodiments of the presently described inventive concepts shall be appreciated as including training and/or application of machine learning models.

Moreover still, each of the general procedures described herein (including but not limited to pre-processing, table detection, table extraction and table/column classification, and/or respective suboperations thereof) may, and preferably do, include one or more suboperations, which are described in connection with each general procedure below. It shall be understood that the various suboperations (and further details thereof), while described in connection with one general procedure, may be employed in the context of other general procedures, may be combined with other suboperations (and/or details thereof) in any manner that would be appreciated as suitable by a person having ordinary skill in the art reading these descriptions. All operations, suboperations, and details are thus to be considered modular, and capable of being applied in any combination, permutation, etc. without departing from the scope of the presently disclosed inventive concepts.

Figure 23:
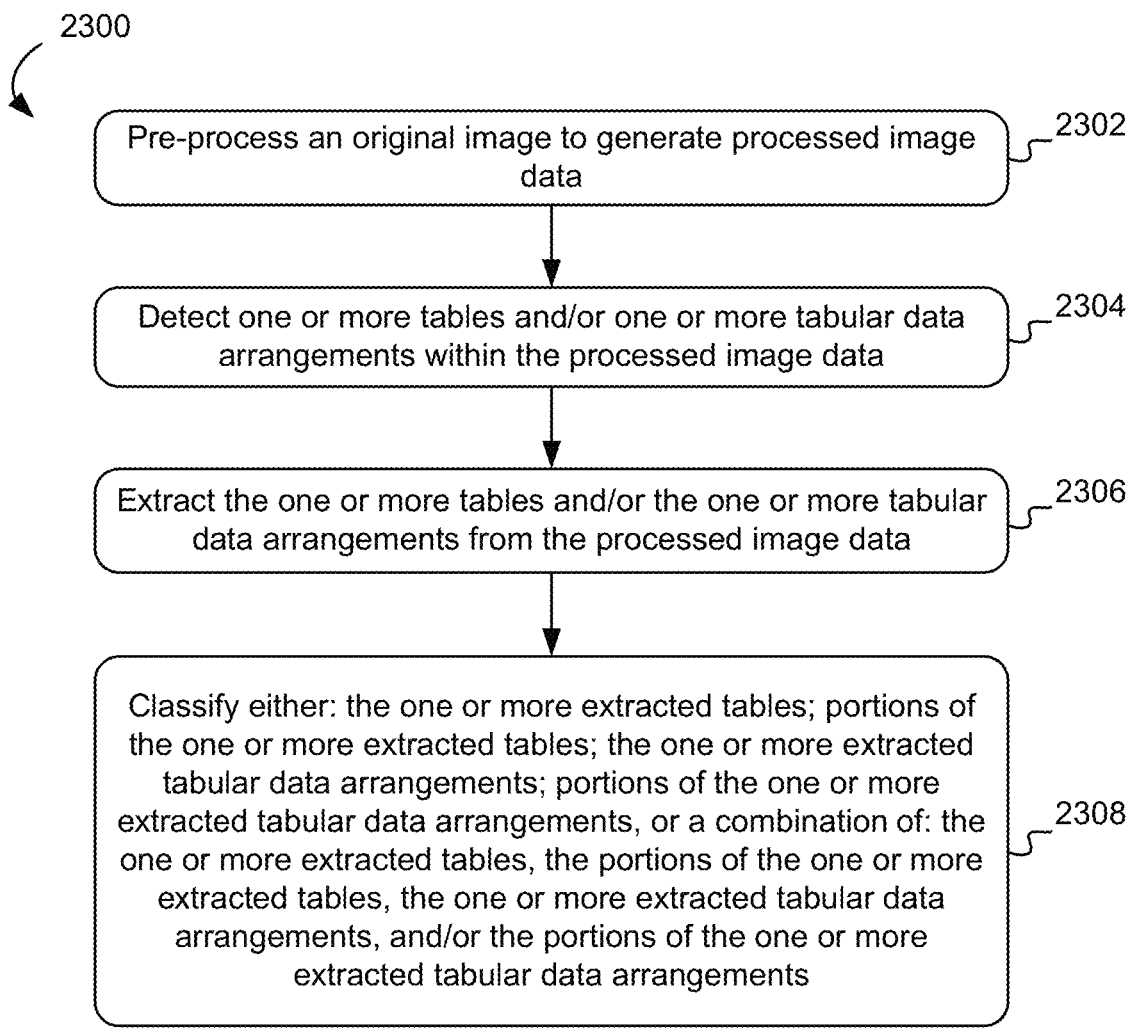
FIG. 23 is a simplified flowchart of a computer-implemented method for detecting, extracting, and classifying tables and/or tabular data arrangements that are depicted in image data, according to one embodiment.

For instance, and with reference to FIG. 23, a simplified flowchart of a computer-implemented method 2300 for detecting, extracting, and classifying tables and/or tabular data arrangements that are depicted in image data is shown, according to one embodiment. The method 2300 may be performed in accordance with the present invention in any of the environments depicted in FIGS. 1-22, among others, in various embodiments. Of course, more or less operations than those specifically described in FIG. 23 may be included in method 2300, as would be understood by one of skill in the art upon reading the present descriptions.

Each of the steps of the method 2300 may be performed by any suitable component of the operating environment. For example, in various embodiments, the method 2300 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 2300. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 23, method 2300 includes operation 2302, in which an original image is pre-processed to generate processed image data. The pre-processing may include/involve any selection, combination, or permutation of operations, features, evaluations, considerations, etc. described herein with respect to "Pre-Processing" without departing from the scope of the inventive concepts presented herein.

Moreover, in operation 2304, method 2300 includes detecting one or more tables, and/or one or more tabular data arrangements, within the processed image data. The detection may include/involve any selection, combination, or permutation of operations, features, evaluations, considerations, etc. described herein with respect to "Table Detection" (including detection of grid-like tables and/or detection of non-grid-like tables) without departing from the scope of the inventive concepts presented herein.

Moreover still, method 2300 includes operation 2306, which involves extracting the one or more tables and/or the one or more tabular data arrangements (or portions thereof) from the processed image data. Preferably, extraction is based at least in part on the result of detection as performed in operation 2304. However, it shall be understood that extraction may include/involve any selection, combination, or permutation of operations, features, evaluations, considerations, etc. described herein with respect to "Table Extraction" without departing from the scope of the inventive concepts presented herein.

With continuing reference to FIG. 23, method 2300 also includes classifying either extracted table(s); portion(s) of extracted table(s) (e.g., columns); extracted tabular data arrangement(s); portion(s) of extracted tabular data arrangement(s), or any combination thereof ( e.g., any combination of: the one or more extracted tables, the portions of the one or more extracted tables, the one or more extracted tabular data arrangements, and/or the portions of the one or more extracted tabular data arrangements) in operation 2308. It shall be understood that classification may include/involve any selection, combination, or permutation of operations, features, evaluations, considerations, etc. described herein with respect to "Table Classification" and/or "Column Classification" without departing from the scope of the inventive concepts presented herein.

Pre-Processing

In accordance with various embodiments of the presently disclosed inventive concepts, detecting tables and/or tabular arrangements of data within images of documents generally includes pre-processing source data, including but not limited to image data, using various techniques, preferably including character recognition and analysis, zone/layout analysis, and/or image processing.

Image Processing

According to various embodiments of the presently described inventive concepts, table detection preferably employs image processing techniques, such as line detection to detect graphical lines (preferably, line detection is performed on an image of the document with recognized characters omitted/removed therefrom, leaving an image substantially devoid of text). In accordance with various embodiments of the presently disclosed inventive concepts, image processing in the context of table detection may additionally or alternatively include: line detection, box detection, grid detection, bar detection, and/or stack detection.

Line Detection

In one exemplary approach, pre-processing line detection seeks to identify a set of substantially perpendicular lines, preferably (at least partially) intersecting perpendicular lines, oriented substantially horizontal and vertical with respect to the page/image (although skewed/diagonally oriented lines, and/or lines deviating slightly from strict perpendicularity may appear in images of documents due to imaging artifacts, document (mis)alignment, etc. as would be understood by a person having ordinary skill in the art upon reading the present disclosure). In some approaches, lines deviating from substantial perpendicularity and/or horizontal/vertical orientation (e.g., by ten degrees or more) may be ignored for the purpose of table processing.

A preferred approach to line detection proceeds substantially as follows, using horizontal orientation as an exemplar. Vertically oriented lines may be detected using a substantially similar method, on a rotated image. Accordingly, skilled artisans will appreciate that line detection may be performed equivalently on horizontal or vertical lines, in any order, depending on the orientation of the source image subject to detection.

In particularly preferred approaches, source image(s) are analyzed to identify and remove recognized (e.g., OCR'ed) text therefrom, e.g., as described herein, according to several exemplary embodiments. Removing recognized text is preferably performed such that new "lines" on the image are not created.

For instance, each recognized element has a corresponding position on the page, preferably defined by pixel coordinates which in turn define a rectangle. Removing recognized text without creating new lines includes "painting over" the recognized rectangles in a gray-scale image. "Painting" all rectangle with one color causes the rectangle to appear faint, undesirably leading to potential erroneous detection of lines at the rectangle sides. To avoid such erroneous detection, in preferred approaches "painting" the rectangle includes using an average color of the four projections to the rectangle's boundary.

The boundary is preferably defined by the smallest rectangle containing the recognized element's rectangle. Normally, the boundary pixels are of background color, with slight variations. Sometimes, a boundary pixel can be part of the recognized element's text (e.g., part of the connected component recognized via character recognition). Therefore, if a projection has a significantly different color value, e.g., a color value exhibiting a difference in intensity value of at least about 10 units in a given color channel relative to a the most frequent boundary color (again, preferably in at least the given color channel), the color value is replaced with the most frequent boundary color when computing the average, in preferred approaches.

Having painted over text in the gray image, the gray image is binarized, and horizontal lines are preferably detected within the binarized version of the gray image. Most preferably, the binarization technique employed cleanly removes the text without creating new line artifacts, in large part because of the way rectangles were "painted over" as described herein.

Line detection according to the various embodiments described herein may employ one or more known techniques, such as erosion and/or dilation, image processing techniques known in the art. However, the application of these known techniques in the context of table/tabular data detection, extraction, and/or analysis implements a new and specific implementation as described hereinbelow.

According to one embodiment, such new and specific implementation includes using multiple, preferably two kernels, one large and one small. The large kernel is used to apply erosion to the source image and identify candidate rows that may include horizontal lines. Additionally, a custom padding process is employed to build horizontal rows from pixels distributed across neighboring rows (growing the row boundary to include such distributed pixels, and optionally pixels therebetween). Erosion and dilation may subsequently be applied, e.g., in combination via a "close" operation, and preferably using the small kernel to reinforce the horizontal rows created thus far. Further, erosion and dilation operations are preferably applied using the large kernel to eliminate "junk" lines (typically caused by scanning artifacts) and rectify detected line segments.

Preferably, the foregoing set of operations yields vertical and horizontal lines from the image. Therein, small gaps are detected and removed where multiple found lines exist for a given point (x, y) or stretch (e.g., a plurality of consecutive/adjacent pixels having a common x (vertical stretch) or y (horizontal stretch) value, particularly where the small gaps are smaller than a configurable, predefined percentage (e.g., 1%, 5%, 10%, in various embodiments) of the page height (for vertical stretches) or width (for horizontal stretches). Gaps larger that the predefined minimum page height/width threshold(s) are preferably tolerated for gaps where vertical and horizontal lines cross (which often indicate/correspond to a vertex in a grid).

As noted hereinabove, sometimes graphical lines, particularly lines within a document including a table or tabular data arrangement, intersect with text (e.g., via close underlining, strikethrough, handwritten annotations, etc. as would be understood by a person having ordinary skill in the art reading the present disclosure). Such intersections are particularly problematic for the detection of graphical lines and of text as individual elements of an image, especially for words that contain letters that have a "stem" that extrudes below the word baseline, e.g., "j,p,q" etc. Often the underline (e.g., as in a hyperlink) intersects the character stem. Frequently neither the line, nor the character, are identified using conventional image processing and/or character recognition techniques.

Accordingly, in such embodiments it is advantageous to perform a repre-detection analysis to determine where a part of a graphical line could be lost due to removal of the intersecting/intersected text. Preferably, particularly for recognized elements that contain characters with descending stems, the repre-detection analysis includes inspecting each recognized text element for the presence of a graphical line that spans the entire width of the element and is located within the bottom portion of the element rectangle, as follows: (1) creating a binary image corresponding to the element rectangle, (2) inspecting each row of pixels in the bottom third of the resulting binary image, (3) identifying the presence of a graphical line where all pixels in a given row of the image correspond to the image foreground color (e.g., black), and (4) if one or more graphical lines is detected adjust the bottom of the element rectangle upward such that the new rectangle omits the highest graphical line detected, and (5) use the newly updated rectangle for the purpose of removing text, as described hereinabove with respect to "painting over" lines and/or characters.

Preferably, the repre-detection analysis also includes identifying gaps in what would otherwise be continuous horizontal or vertical lines, and where such a gap exists in the location previously occupied by recognized text (as defined, e.g., by the rectangle associated with a word or a phrase produced as part of the character recognition process) restoring the line within the corresponding text element rectangle.

In accordance with illustrative embodiments, restoring a line generally refers to recreating/drawing a connecting/intersecting/missing part of a line as represented within a binary image. For instance, consider two line segments with a gap in between, the gap being or corresponding to one or more pixels previously representing a character or other connected component in the binary image. In one approach, line restoration includes noting the location (e.g., (x, y) pixel coordinate(s)) of endpoint(s) of one line, and the end point(s) of the other line (preferably the $(x_1,y_1)$ of an endpoint of the first line and the $(x_2,y_2)$ of an endpoint of the second line), where a gap exists between these points, and drawing (e.g., in/on the image) on the image a straight line that connects them. Most preferably, this drawn portion will be or correspond to a purely horizontal line (i.e., with constant y) or purely vertical line (i.e., with constant x) but slight deviations from strict vertical/horizontal orientation are also to be understood as within the scope of the presently described inventive concepts, in various embodiments.

Notably, scanning artifacts that create "garbage" horizontal and/or vertical lines are removed from consideration and not subjected to further processing. Specifically, in preferred embodiments a detected graphical line will be discarded and removed from further consideration if any of the following conditions apply: (1) a horizontal or vertical line intersects any edge of the page (left, right, top, bottom) within one standard unit of tolerance, (2) if not determined to be part of a grid (as described herein below) a vertical line lies within the leftmost or rightmost 5% of the page width (i.e., within a left or right margin of the page).

The horizontal and vertical lines detected herein are preferably used to detect higher-level graphical elements, including but not limited to boxes, bars, stacks, and delineating lines, e.g., as described in greater detail hereinbelow.

Having identified graphical lines, an image where these lines are removed may be generated and stored. Using the "no lines" version of the image, wherein preferably all lines are removed, and only detected characters remain, prevents graphical lines from being confused with the pixels that constitute characters. As such, this "no lines" image is particularly suitable for performing operations related to fixing character recognition errors and/or involving direct pixel inspection, such as described in greater detail herein with respect to "Error Detection and Correction" and "Filtering."

Box Detection

In accordance with several illustrative embodiments of the presently described inventive concepts, table detection includes box detection, where the maximal rectangle is identified. For example, a typical grid consists of many rectangles, and the desired "box" that represents the table boundary is defined by the outer-most rectangle. However, as noted in the above definition of "boxes" the outer-most rectangle in a given image, or portion of an image, may correspond to non-grids, and/or to objects other than tables/tabular data arrangements, such as graphs. Further still, boxes may correspond to portions of tables and/or tabular data arrangements in various embodiments.

In preferred approaches, the presently described box detection process finds the largest (outermost) rectangle, which may be accomplished by finding vertical lines and horizontal lines, computing intersections therebetween, and finding the outermost rectangle defined by the intersections (e.g., by disregarding all internal boxes). This is accomplished as described below, according to a preferred approach.

First, it is advantageous to compute all intersections of horizontal and vertical graphical lines on the image. Notably, "nearly intersecting" lines are still considered to intersect in cases where the distance between the endpoint of a vertical line lies within a distance of one standard unit of tolerance from any portion of a horizontal line, and similarly where the endpoints of horizontal lines lie within a distance of one standard unit of tolerance from any portion of a vertical line. Each such intersection is then considered to represent a vertex in a graph. Vertices in the graph are connected by an edge when the corresponding intersection of graphical lines on the image is connected by a graphical line.

Next, from such intersections, connected components are identified within the graph, where a connected component is defined as a list of vertices that are connected by an edge (or equivalently a list of graphical line intersections on the image that are connected by a graphical line).

Each connected component may then be considered a candidate for a box, and boxes are found according to the connected components, e.g., according to one embodiment using the following rules/logic: (1) if a connected component has fewer than 3 edges, no box is created; (2), if a connected component has 3 edges, then either (a) if there are two vertical lines in the connected component, create a box where the left and right sides of the box correspond to these two vertical lines. The top and bottom sides of the box are preferably computed according to the topmost and bottommost extent of the vertical lines, respectively; else (b) if there are two horizontal lines in the connected component, create a box where the top and bottom sides of the box correspond to these two horizontal lines. The left and right sides of the box are preferably computed according to the leftmost and rightmost extent of the horizontal lines, respectively. Finally, (3) if a connected component has greater than 3 edges, compute the "maximal" box sides using the following rules: (a) the left side of the box is defined by the leftmost left-value of all horizontal lines; (b) the right side of the box is defined by the rightmost right-value of all horizontal lines; (c) the top of the box is defined by the topmost top-value of all vertical lines; and (d) the bottom of the box is defined by the bottommost bottom-value of all vertical lines; (4) if any box that results from the above-described methodology (1)-(3) is contained by another box, the contained box is discarded.

Advantageously, the foregoing inventive, rule-based approach robustly identifies "boxes" even where not fully defined by graphical lines. For instance, boxes defined by three sides (e.g., substantially representing a (forwards/backwards) "C" or (right-side-up/upside-down) "U"), boxes having only partially defined vertices (e.g., including adjacent boxes separated by substantially "T" and/or "I" shaped graphical lines, etc. as would be appreciated by those having ordinary skill in the art upon reading the present disclosures) are reliably detected using the presently described inventive techniques.

Moreover, in particularly preferred approaches, intersections are detected within a certain degree of tolerance, e.g., allowing for lines that nearly, but do not quite touch, and if touching otherwise would form an intersection, (e.g., according to a predefined minimum proximity threshold) may be used to define intersections. Most preferably, however, intersections are confined to "perpendicular" or "normal" intersections, i.e., where all angles formed by the intersecting lines are characterized by an angle of about 90 degrees (again, in some approaches, a tolerance with respect to intersecting angle is permitted).

Further still, boxes characterized by having four intersecting sides, but where sides do not quite form perpendicular intersections/vertices, may be transformed into "strict" rectangles using the foregoing methodology, e.g., via operation (2) above.

Bar and Stack Detection

In preferred approaches, a "bar" is defined as a "box" having a longitudinal axis oriented horizontally within the image, having a narrow aspect ratio (e.g. an aspect ratio of about 0.2 or less) indicating a width of the box is at least five times as large/long as a height of the box), and colored on the inside (i.e., exhibiting primarily a color or color(s) different than the background color of the image, which is preferably defined as the most frequent color on the image). Table 700 as shown in FIG. 7A includes a plurality of bars 702, according to one exemplary embodiment. Note, depending on the background color of the image, that the bars 702 could be defined as corresponding to either the shaded regions (as shown in FIG. 7A) or to the white regions, without departing from the scope of the term "bar" or the presently described inventive concepts. According to the embodiment shown in FIG. 7A, the image background is white, so the bars 702 correspond to the shaded regions.

A "stack" is a group of "bars" where each horizontally oriented bar is a rectangle with alternating shading, e.g., as shown in FIG. 7A, which frequently define alternating rows of a table/tabular data arrangement. The outer extant of the stack is defined by a rectangle that contains all such bars. Again with reference to FIG. 7A, table 700 in its entirety is an exemplary embodiment of a "stack."

Effective Rectangle Detection

The effective rectangle of an OCR element is defined as the rectangle of the element that has been extended horizontally to correspond to the width of a graphical line that underlines the element, if any. The use of effective rectangles when defining the width of columns (i.e., according to the contained elements) more accurately reflects the intended horizontal extent of the column than if the literal OCR rectangles were used for this purpose, and allows for more appropriately incorporating into the column other elements that reside within this horizontal extent.

Accordingly, particularly when the bounding rectangle of the OCR element is centered horizontally with respect to the underlining graphical line, the horizontal extent (i.e., left and right boundaries) of the OCR element is replaced by the horizontal extent of the underlining graphical line in all subsequent processing related to table detection and table extraction.

As referenced throughout the present disclosure, it shall be understood that extents, if extended, remain extended for all subsequent processing operations, unless expressly stated otherwise.

Line Delineation

The concept of a delineating line is that certain, especially horizontal, lines are important and convey special (often contextual) meaning for tables/tabular data arrangements. For example, delineating lines often: delineate one or more text line(s) above from text line(s) below, e.g., as in underlined column headers; and/or indicate the horizontal extent of something, typically a column. For example, as shown in FIG. 7B, table 710 may be considered to include three delineating lines 712, 714, and 716, each of which spans the horizontal extent of the region 718 (to the right of the row labels and accompanying ellipses).

The uppermost delineating line 712 delineates the header region 718a ("Units", "Weighted-Average Grant-Date Fair Value") from the data region 718b, while the delineating lines 714 and 716 respectively delineate the upper and lower boundaries of the last row (bottommost delineating line 716 also defines the bottom of the table). Each delineating line may include, and preferably consists of, one or more sub-lines (lines having the same or similar y-value, e.g., where the difference in y-value is less than one standard unit of tolerance, as described herein below). Accordingly, "sublines" may appear as or similar to "long dashes" in a dashed line, in various embodiments.

Coordinate values of delineating lines may provide important contextual information about the corresponding table/tabular data arrangement, such as the boundary/boundaries of the table and/or portions thereof (especially where graphical lines of a table do not form a full grid).

The y-values of delineating lines (i.e., and of all sublines, with some tolerance) may be important. For instance, again with reference to the above table, the top or uppermost delineating line indicates the y-boundary between the data and the header(s) of the table; the middle delineating line defines a y-boundary between the last two rows of the table, and the bottommost delineating line define the lower y-boundary of the last row (and of the table itself).

The x-values of delineating lines (and particularly of the left and right endpoints of the associated sublines) may also be important. For instance, x-values may indicate the corresponding x-value boundary or boundaries of columns within a table/tabular data arrangement. Additionally, or alternatively, x-values may define "implied vertical lines" as described in greater detail elsewhere herein.

In essence, delineating lines may form a "partial" grid. In preferred embodiments, delineating lines satisfy the following objective criteria: (1) the lines must not be narrower than the width of the smallest element on the page in question; (2) the lines must not overlap and/or be located partially or wholly within an excluded region; (3) the lines should (a) not be or include any part of a "box" or "grid", (b) should be located immediately adjacent to (i.e., next to) an element and (c) should not have any intervening element(s) located therebetween; while (4) the lines are preferably positioned vertically adjacent to a textual element.

In addition, sublines of a given delineating line may be, and preferably are, grouped to form a single associated delineating line. Criteria for such grouping may include subline(s): sharing y-values that are within one standard unit of tolerance, having a leftmost value defined by a leftmost point on a leftmost one of the grouped sublines, and/or having a rightmost value defined by a rightmost point of a rightmost one of the grouped sublines.

Character Recognition

In various approaches, detecting tables and/or tabular data includes performing character recognition, preferably optical character recognition (OCR), but additionally or alternatively employing other known character recognition techniques, such as intelligent character recognition (ICR), graphics device interface (GDI), clustering-based recognition, feature extraction-based recognition, pattern matching-based recognition, techniques using neural networks, etc. as would be understood by a person having ordinary skill in the art upon reading the present descriptions.

Statistical Analysis

Regardless of the specific technique employed, character recognition is preferably accompanied by a set or series of analyses, including statistical analysis of the recognized character(s) geometric characteristics, such as mean, median, mode, measures of character height, width, aspect ratio, etc., and/or distance measures, preferably distance measures independent of image resolution (e.g., pixel units). These statistics are preferably used in subsequent steps to refine the content of the page and facilitate table detection and extraction, as described below in further detail according to various exemplary embodiments of the presently described inventive concepts.

Distance Measures

In particular, in order to effectively accomplish table detection and extraction, it is often necessary to evaluate the horizontal and/or vertical alignment of two different visible features as rendered on a page image (e.g., OCR elements, graphical lines, or any other visually discernable feature that may appear in an image, particularly an image of a document, as would be appreciated by persons having ordinary skill in the art upon reading the present disclosure) and to similarly measure the distance between the x- and/or y coordinates, respectively, of such visible features. Preferably, this is accomplished in a manner that is independent of image resolution, by establishing units of distance that do not rely on an absolute number of pixels.

More preferably, units of tolerance as defined hereinabove may be employed as the units of distance that do not rely on absolute number of pixels. In a particularly preferred embodiment, a unit of tolerance may be established as one third of the average character width as observed across all OCR elements within the document under consideration. Of course, those having ordinary skill in the art will appreciate, upon reading the present disclosure, that other units of distance that are independent of absolute number of pixels may be employed without departing from the scope of the inventive concepts described herein. Similarly, other values, which in turn may be based on other characteristics (particularly geometric characteristics) of recognized text elements depicted in an image may be used as units of measure independent of absolute number of pixels.

Error Detection and Correction

To further to refine the content of the page and facilitate table detection and extraction, in one approach statistics such as average character height and width may be used to detect and/or fix OCR errors on the analyzed page(s). For instance, rectangles of OCR elements that are invalid, and/or that extend beyond at least one page boundary may be removed/omitted from further analysis.

Based on these statistics, words appearing on the page that are over-joined may be identified and split, over-split words may be joined, and missing characters (e.g., punctuation marks, dashes, ellipses, spaces, etc.) may be filled in/fixed.

Figure 8A:
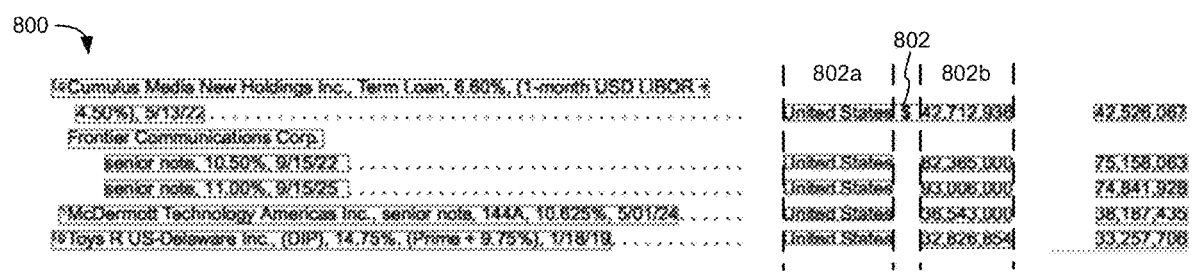
FIGS. 8A-8B depict exemplary tabular data arrangements that each respectively include a plurality of distinct textual elements, at least one of which is erroneously combined with an adjacent textual element, according to some illustrative embodiments.
Figure 8B:
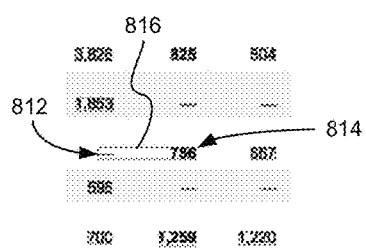

With reference to splitting over-joined words, in various embodiments character recognition yields text elements, such as element 802 ("United States $42,712,936"), as shown in FIG. 8A, where text elements recognized by OCR are indicated by rectangular bounding boxes. In reality, element 802 includes two distinct values: the value "Unites States" actually belongs column 802a of table 800, while and the dollar amount belongs to an adjacent column 802b. Such "combined" or "agglomerated" elements often complicate correct column detection since they can span multiple columns.

Accordingly, the embodiments described herein may include detecting one or more predefined indicators, such as currency symbols (e.g., $, €, etc.), percent symbols, unit indicators (e.g., "lbs.", "No.", etc.), or any other suitable label/indicator associated with text value(s).

Such indicators preferably are identified in association with the internal portion of a text element. If so, the element is considered a candidate for splitting. If an adjacent value to the left and/or right of the symbol (in this case "United States" on the left) also appears on neighboring lines as a separate element, this is taken as indicative of a potentially mistaken split based on character recognition results. Where such neighboring indicators are found, it may be advantageous to split the element, where the resulting "new" elements each form individual columns.

While splitting over-joined words in some embodiments addresses problems caused by presence of certain symbols, in other embodiments dashes or other placeholder values present in tables may lead to over-joining. For instance, dashes are commonly used in tables as a placeholder (e.g., to indicate the value is zero and/or not applicable). These characters are frequently problematic for OCR and can be joined to other words. This causes problems for table processing since the mistakenly joined word can cross columns. For example, in FIG. 8B dash 812 is mistakenly attached to the horizontally adjacent text element 814 (value "756"), causing two distinct text elements to be erroneously considered a single element 816.

Such conflation of elements is a frequent occurrence for dashes. For instance, if an OCR element starts with a dash, the position of individual characters within the OCR rectangle (according to pixels on the image) may be characterized by a large horizontal distance between the dash and the next/adjacent character to the right of the dash. If this distance is significantly larger than the average distance between characters in the page, the element is preferably split between the dash and the adjacent character(s), creating two elements, one a dash, and the other the remaining characters that followed the dash in the mistakenly conflated single character recognition element. Notably, this process also advantageously determines (via explicit search) the correct height of new OCR rectangles from the image, as well as the left and right edges of the resulting two elements.

With continuing reference to dashes, character recognition also often misses stand-alone dashes. For example, in table 820 shown in FIG. 8C, there are a total of fifteen dashes, but when an image of table 820 is subjected to conventional OCR, only four of the dashes are properly identified. In practice, OCR and other conventional character recognition techniques tend to omit/exclude/ignore/miss dashes that are located within a small distance (e.g., 1-5 units of tolerance) of other graphical lines, particularly commonly-oriented graphical lines. Similarly, conventional character recognition techniques struggle to detect dashes characterized by a substantial length (e.g., at least two character widths, at least three character widths, or more, in various embodiments). Without wishing to be bound to any particular theory, the inventors postulate conventional character recognition engines may be configured to avoid interpreting graphical lines as textual elements, with the resulting consequence that "line-like" textual elements such as dashes are detected with less accuracy and fidelity compared to other types of textual elements.

Since the dashes in fact are entries in the table(s) (e.g., indicating a "null" value) and thereby facilitate correctly detecting columns and rows, identifying the missed dashes can provide significant advantage with respect to identifying columns, rows, and/or cells of tables. In particular, from one or more exemplary dashes, one can determine a range of suitable dimensions for dashes. Therefore, in some embodiments it is advantageous to look for horizontal lines on the source image where the bounding rectangle matches these known dimensions, and if such lines are found, to create an OCR element with a value of a dash.

Ellipses are commonly used in tables to indicate rows. These tend to confuse character recognition algorithms, and are often joined with tokens, especially on the right side of the ellipsis (i.e., in the data portion of the table). This joining may become problematic where the incorrectly joined OCR element spans multiple columns.

Accordingly, preferred embodiments of error detection and correction include detecting ellipses (e.g., using regular expressions), determining whether one or more text elements follow (e.g., are immediately adjacent in the proper text-orientation direction), and if so, splitting the ellipsis and adjacent text into individual OCR elements based on average character width, which is used to estimate the adjacent character/word length. In this sense, the term "ellipsis" refers to a sequence of two or more adjacent dot characters.

In more embodiments, ellipses may be missed by character recognition, and undesirably excluded from/ignored in subsequently analyzing the document/page/table. For example, in table 830 as shown in FIG. 8D there are many ellipses, but all are missed by conventional character recognition engines. However, since ellipses can help to correctly detect columns and rows (and in particular often serve to define the row boundaries), e.g., as described hereinabove, it is advantageous to search for the missed dots and ellipses, and ensure such characters/symbols are included in subsequent analyses, as appropriate.

The methodology for addressing missed ellipses, in one approach, is similar to finding dashes—i.e., identify groupings of foreground pixels on the image that satisfy the dimensions of a dot (preferably where both the height and width of bounding box of the connected component in question are no less than 10% of the average character height and no more than 20% of the average character height), sort the found dots by vertical coordinate, and group found dots having the same (or similar, e.g., within a threshold of one standard unit of tolerance, according to various embodiments) vertical coordinate. The width of the ellipsis is preferably taken to be the longest streak of dots exhibiting a substantially constant interval between the dots. Groups of dots may be evaluated, e.g., for length, and those groups satisfying a minimum length criterion may be retained as elements of the table/tabular data arrangement.

With continuing reference to exemplary embodiments of error detection and correction, another text-based artifact occurring in the scope of table detection is the existence of over-split words, undesirably creating multiple elements where a single element truly is present. In particular, over-split words are often indicated by being associated with a corresponding symbol, e.g., a currency value, unit of measure, percent symbol, etc. that is located a substantial distance, e.g., several character width(s) or more, away from the associated (adjacent) word, but substantially aligned in vertical position, such as element 842 and corresponding currency symbol 844 as shown in FIG. 8E.

In accordance with various embodiments of the presently disclosed inventive concepts, joining such over-split words into a single element advantageously results in more reliable determination of column width (e.g., where the dollar sign and/or elements otherwise located the above dollar sign might not be included within the column and/or might be construed as part of a separate column). Locating characters and associated symbols is preferably performed using a pattern matching approach, in some embodiments.

In preferred embodiments, over-split words, symbols, ellipses, dots, dashes, etc. are located based on analyzing a "no lines" version of the digital image, which may be generated as described hereinabove with respect to line detection.

Filtering

Filtering is another preferred aspect of the inventive character recognition-based table detection techniques described herein. In general, according to the present disclosure filtering may include/involve removing junk characters, vertically oriented characters, and/or large text. Filtering these elements advantageously improves accuracy of subsequent analyses and ultimately table detection.

In preferred approaches, filtering may include removing: (1) elements that overlap, in whole or in part, with a boundary of a page/subpage; (2) elements that entirely contain other element(s); (3) "tiny" elements, i.e., elements characterized by an area less than about 0.5 W×0.5 W (where W is an average width of characters appearing in a same image as the "tiny" elements); and/or (4) "large" text, i.e., characters having a height greater than about twice an average height of characters appearing in a same image as the "large" text.

Grouping

Character recognition for purposes of table detection also preferably includes grouping recognized characters, more preferably grouping characters into words, grouping words into lines of text, and/or grouping words into phrases, depending on the type of character recognition employed and corresponding output (e.g., where character recognition outputs recognized words, grouping characters into words may not be necessary).

As defined hereinabove, a "phrase" refers to a group of elements (usually a group of words, numbers, and/or symbols) that reside on the same text line and that are closely spaced, such that a human reader would understand that the elements comprising the phrase are intended to be considered as a single unit. Grouping of words into phrases is preferably accomplished by considering each text line separately and determining an average character width within the text line in question.

In one embodiment, phrases may be identified by moving from left to right within the text line in question (or equivalently from right to left, without departing from the scope of the inventive concepts presented herein, e.g., as would be appreciated by a skilled artisan as suitable for right to left languages such as Arabic), grouping OCR elements until one or more criteria are satisfied that identify that the present position within the text line represents a boundary between groups (i.e., the present position in the text line corresponds to the end of one group and the beginning of a different group), and continuing along the text line until the end of the text line is encountered.

Preferably, the criteria used to identify boundaries between phrases includes the presence of a large gap between adjacent words, where the width of the gap is greater than 1.5 times the average character width for the line in question, and/or the width of the gap is greater than 1.5 times the average height of the elements to the left and right of the gap, excluding consideration of punctuation elements such as dash, dot, comma, etc.

Even where the size of the gap between words is small, the criteria used to identify boundaries between phrases preferably include: (1) the presence of a vertical graphical line in the gap between words, (2) determination that the element on the left of the gap is or ends with an ellipsis (as determined by the presence of two or more consecutive dots) while the element on the right is not an ellipsis, (3) determination that the element to the left of the gap and/or the element to the right of the gap correspond to known "data" elements that commonly occur singly in columns of a table (e.g., currencies, percentages, numerical amounts, etc. as would be appreciated by a skilled artisan), (4) the location in question within the text line lies within and "unclosed" parentheses or bracket, i.e., where an "open" parentheses or bracket lies to the left of the location without a corresponding "close" parentheses or bracket that is also to the left of the location in question, (5) the elements to the left and right of the gap exhibit a difference in height that is greater than 50% relative to the height of the smaller element, indicating a significant change in font size.

According to several embodiments, phrases may be considered (and referred to herein) as individual "OCR elements" for subsequent processing. Using phrases as individual elements is advantageous in the context of table/tabular data detection and extraction since the intention of the writer in writing closely-spaced words is that the words should be considered by the reader as a single unit, and accordingly, column boundaries within tables should not be established that cross the horizontal extent of a phrase. In practice, the vast majority of tables are limited to a single phrase per cell.

Of course, in various embodiments, grouping of characters into words, and/or of words into phrases, may be performed using appropriate, conventional character recognition techniques, as would be appreciated by a skilled artisan upon reading the present disclosure.

Regardless of the manner of grouping characters/words, in preferred embodiments "phrases" (also expressed, in various approaches, as "N-grams") are employed as the "unit" of character recognition for other operations relying on characters as a source of information.

Characterization of Values

Recognized characters may be further analyzed, e.g., to assign contextual meaning to certain characters, to assign character values (e.g., OCR, ICR, GDI, etc. values), etc. in order to provide additional information (especially contextual information) about the nature of the information stored in the table(s). In particularly preferred embodiments, such characterization of values involves evaluating recognized characters using pattern recognition techniques/tools, such as regular expressions and associated heuristics, e.g., any one or more heuristics as described hereinabove regarding splitting over-joined words.

In preferred embodiments, the characterization analysis includes identification of information types that are commonly present in tables, including but not limited to information such as, units, phone numbers, dates, years, currency amounts, numerical values, percentages, symbols that are used to indicate that no value (null value) is available and/or applicable for a particular cell in the table (e.g., "-", "n/a", etc., and optionally any associated units), alphanumeric identifiers (e.g., "123-AB-78-X7"), key-value pairs (e.g., "NAME: JOE SMITH"), etc. It is then frequently beneficial for the purpose of table detection, extraction and classification to consider OCR elements in terms of the type of information that the literal value represents (e.g., currency amount) rather than the literal value (e.g., $413.12).

The characterization analysis may further identify generic patterns within text, including but not limited to identifying classes of characters such as "uppercase alphabetic," "numeric," "lowercase alphanumeric," "symbol," "other," etc. as would be understood by a person having ordinary skill in the art upon reading the present disclosure. According to one example, a string of characters "aa0.0A" may be assigned a generic pattern such as "lowercase alphabetic-lowercase alphabetic-numeric-other-numeric-uppercase alphabetic." In different approaches, case sensitivity may or may not be an aspect of the generic patterns employed.

As will be further understood by skilled artisans, since columns generally include values of a same/similar type, meanings and patterns are often consistent within columns, e.g., all values having the same units, formatting, character sets, etc.

Layout Analysis—Zone Identification and Exclusion

With continuing reference to table detection, in one embodiment, pre-processing preferably includes identifying one or more zones within images of the page/document, most preferably including at least zones that do not correspond to tables or tabular data. Such zones occur most frequently in table-like structures, such as numbered lists (e.g., footnotes), bullet lists, key-value lists, lines for page headers, footers, etc. Zone identification may additionally or alternatively include identifying other features such as borders, page numbers, text regions, text columns (e.g., for pages arranged in "newspaper column" format).

Identifying Enumerated Lists

Enumerated lists can often be misidentified as tables by automated table detection and extraction techniques, due the aligned nature of such lists. In particular, such lists are frequently comprised of two columns of aligned of text, where the first column represents the enumerating value (e.g., "1, 2, 3, . . . ", or "(1), (2), (3), . . . " or "(a), (b), (c), . . . ", or many other equivalent sequential representations, as would be appreciated by a skilled artisan upon reading the present disclosure), and a second column that contains information associated with the enumerating value. In spite of the "tabular" layout with which such lists are often rendered, they do not constitute a table and should not be identified as such by automated table detection and extraction techniques. Additionally, such lists are often present as footnotes that serve to explain selected items in a table, are located in close proximity to the bottom of the table, and should not be misconstrued as comprising a portion of the table. Avoiding these undesirable outcomes is preferably accomplished by detecting the locations and boundaries of enumerated lists and subsequently excluding the identified regions from consideration during table detection and extraction.

Specifically, it is advantageous to consider all text lines within a given page and identify those text lines that begin with an enumerating value, as described above, where such enumerations can take the form of either numerals or single alphabetic characters, and may or may not be written using parentheses or brackets (e.g., "(1)", 1)", "[1]", etc.), and may or may not contain a trailing period (e.g., "1.", "1).", etc.). Subsequently, from among these enumerated text lines, sets of enumerated text lines are preferably formulated as list candidates, where within a given set the enumerating value is sequential and ascending in order. For example, valid sequences include 1-2-3, a-b-c, 7-8-9, etc., while invalid sequences would include e.g., 1-e-3, 1-3-4, 9-6-2, etc. To be included within a candidate set, it is not necessary for the text lines in question to be strictly adjacent, i.e., the text lines can be separated by one or more non-enumerated text lines (e.g., as would be the case in lists where the "data" associated with one or more enumerated values is multiple text lines in length). However, in formulating the candidate sets all consecutive enumerated text lines must be considered.

For each such candidate set, it is advantageous to evaluate whether the enumerated text lines within the set indeed identify a list. In preferred embodiments, if the percentage of text lines that contain greater than 3 phrases is greater than 80% of the number of text lines within the set, there is a high likelihood that the enumeration in question is a portion of a table and should not be identified as a list.

To further evaluate whether a candidate set of enumerated text lines corresponds to a list, the following criteria are preferably employed: (1) the enumerated text lines should be left aligned, (2) the (un-enumerated) text lines, if any, that occur between the enumerated text lines should be left aligned with respect to each other, but not necessarily with respect to the enumerated text lines, and (3) if the (un-enumerated) text lines, if any, that occur between the enumerated text lines are comprised of more than one phrase, the gap between phrases should not be aligned with the gap that follows the enumerating value of the enumerated text lines.

Lastly, it is advantageous to consider whether the text lines that follow the last enumerated text line, if any, are also part of the list, according to the following criteria: (1) the height of the trailing text line(s) must be consistent with the height of other text lines previously identified as included within the list (i.e., indicating the same font size), (2) the vertical distance to the trailing text line(s) must be consistent with single-spacing, i.e., with a vertical separation of no more than a given fraction (preferably half) the height of the text lines in question, and (3) the trailing text line(s) must be commonly (preferably left) aligned with other (un-enumerated) text lines, if any, that occur between the enumerated text lines.

If all of these criteria are met, the area occupied by the group of (now strictly consecutive) text lines should be identified as a list and this region should be excluded from consideration during table detection and extraction.

Identifying Bulleted Lists

Identifying bulleted lists preferably occurs in a manner substantially similar to the identification of enumerated lists, with the following differences.

First, rather than identifying text lines that begin with an enumerating value, text lines are identified that begin with a character commonly used as a "bullet" indicator in bullet lists (e.g., variations of characters that represent dots, dashes, asterisks, etc.). Second, rather than formulating candidate sets based on sequentially increasing enumerating values, the candidate sets are formulated such that the distance between neighboring text lines within a given set cannot exceed 15% of the height of the page in question.

Evaluation of whether a candidate set of bullet text lines should be identified as a list, and appending of trailing text lines both preferably use the same methodology as used for detection of enumerated lists.

Identifying Key-Value Lists

Key-value lists are another construct that is frequently misidentified as tables by automated table detection and extraction techniques, due to the structured layout frequently associated with such lists. In particular, a key value list is frequently comprised of aligned key-value pairs, where each key-value pair is comprised of a "key" followed by an associated "value", with the key and value being separated by a colon (e.g., "Purchase Order: 123456"). Such key-value lists are frequently rendered on the page such that the keys and/or values are aligned and can therefore easily be mis-identified as columns of a table. Avoiding these undesirable outcomes is preferably accomplished by detecting the locations and boundaries of key-value lists and subsequently excluding the identified regions from consideration during table detection and extraction.

Specifically, it is advantageous to consider all text lines within a given page and identify those text lines that contain one or more key-value pairs, regardless of the location of the key-value pair(s) within the text line. Subsequently, the identified text lines are inspected for sets of neighboring key-value pairs that comprise a key-value list, where the criteria for identification of a list includes: (1) the key-value pairs are either left-aligned or are aligned about the colon that separates keys from values, and (2) neighboring key-value pairs within the list are not separated by a vertical distance of greater than 1.5 times the average height of the text lines in question. If these criteria are met, the minimal bounding rectangle of the identified key-value pairs should be identified as a list and this region should be excluded from consideration during table detection and extraction.

Identifying Subpages

As one aspect of layout analysis, it is useful to identify regions wherein a given page is effectively split into two separate subpages that are situated side-by-side, and to subsequently perform table detection and extraction separately on each identified subpage. Many documents have this layout on some or all pages, and these printed columns (e.g., "newspaper columns") are problematic in part because the printed information is presented in a form similar to, or indeed as, structured information. As will be understood by those having ordinary skill in the art, structured information is easily misinterpreted as a table using automated/computerized techniques.

Figure 9B:
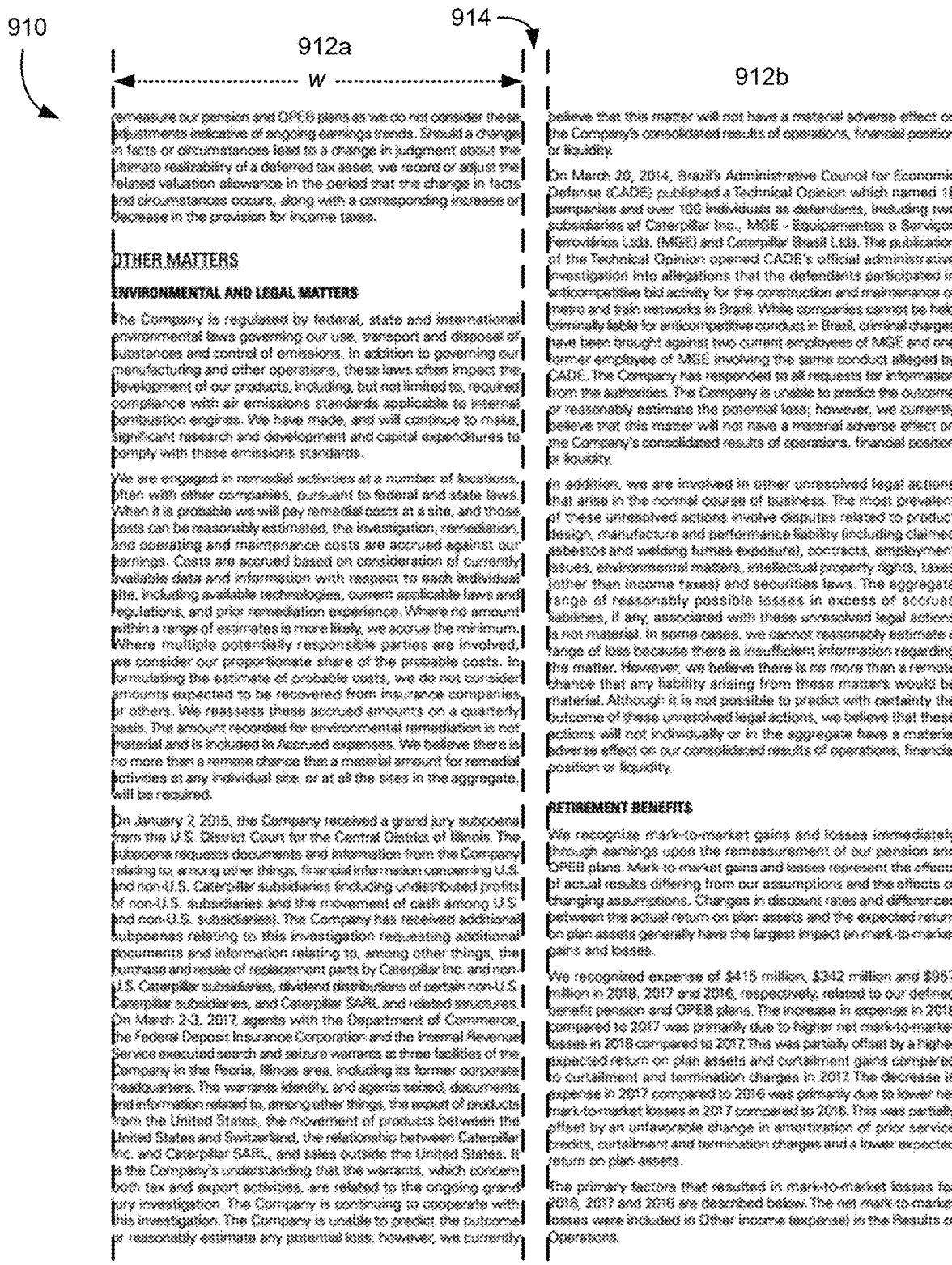
FIG. 9B depicts an exemplary multi-column document, according to one approach.

For example, with reference to the exemplary multi-column document 910 shown in FIG. 9B, this is due, in part, to the fact that small gaps, e.g., gap 914, extending along a vertical axis of the page may appear very similar to, and thus be confused with, the whitespace gaps that separate columns in a table. As such, absent subpage identification as described herein, conventional table detection algorithms frequently and erroneously extend a table's width to include horizontally adjacent portion(s) of the same page.

Figure 9C:
FIG. 9C shows a multi-column document including an embedded table, with emphasis on various gaps and margins defining text regions of the document, according to one embodiment.

For example, in page 920 as shown in FIG. 9C, it is very easy (but prevented by the presently described inventive concepts, particularly subpage detection and use thereof) to mistakenly extend the table 924 (emphasized by a bounding box) into the leftmost adjacent text column 922, especially since some of the text elements in text column 922 align vertically with the rows of table 924.

To address the foregoing problems with conventional detection approaches, in an exemplary embodiment, subpage detection may be performed and include one or more of the following operations.

Subpage detection preferably includes a preliminary analysis to determine whether a vertical graphical line is present that both: (1) spans the vertical extent of the page, and (2) has an x-coordinate that is located in the center of the page, within a tolerance of the average text height on the page in question. If such a vertical line is present, it is reasonable to conclude that this text line delineates two subpages and no further consideration is necessary.

If a separating vertical graphical line is not present, subpage detection preferably proceeds wherein printed columns (e.g., 912a, 912b in FIG. 9B) are identified in a manner analogous to finding columns within a table. Specifically, within such printed column the text elements (preferably produced by character recognition analysis and/or grouping as described herein) such as words, N-grams, phrases, etc., as well as any horizontal graphical lines that are present on the page, align in the sense that they form a single column that does not intersect (horizontally) with other column(s) on the same page, resulting in one or more whitespace gaps e.g., as in gap 914 in FIG. 9B.

To verify suspected subpages comply with this structure, in one embodiment a validation process may be employed, ensuring (or at least substantially increasing the likelihood) that no two columns of a page are conflated. In preferred embodiments, candidate subpages are inspected to verify that: (1) subpages on the same page are approximately equal in width, and (2) a majority of the text lines on the page contain at least one element located within each subpage region.

Since tables depicted in accordance with multi-column page layouts are typically constrained to a single column (at least with respect to width), pages are preferably broken into subpages, and subpages are subsequently processed separately in substantially the same manner as individual pages, which significantly improves precision of the table detection process, according to various techniques described herein.

Identifying Textual Zones

It is a non-trivial task to identify text segments in a document full of data and tables, particularly where text is represented in substantially block-like format, as is typical to many documents. Accordingly, illustrative embodiments of the presently disclosed inventive concepts include detecting textual zones, which conveys substantial improvements to precision of table detection.

In one approach, detecting textual zones includes identifying areas within a document, preferably within a single subpage, that are occupied by text and should be excluded from consideration when detecting tables. Even when there is only a single subpage for a given page, detecting text zones per se helps distinguish surrounding text from text belonging to a table, e.g., text present near or on the top and/or bottom borders of the table. For example, FIG. 9A shows a typical situation where tables 902, 904 are embedded within text on a page 900. Text zone detection preferably includes the following steps, all within the context of a single subpage.

It is particularly helpful to determine a left margin for text zones corresponding to those text lines that do not form the first line of a paragraph (which are often characterized by indentation, and thus are not left-aligned with other text lines in the paragraph). This may be accomplished by identifying candidate text lines that satisfy the following criteria, thereby indicating a significant likelihood that the text line lies within a text block: (1) the text line is greater in length than 70% of the subpage width, (2) the text line does not have any gap between adjacent phrases that is larger than a predefined horizontal gap threshold value, e.g., 5 times the average character width, (3) the text line does not include more than one element corresponding to predetermined types of elements commonly found in tables (e.g., currencies, percentages, etc.), and (4) the text line does not intersect any vertical graphical lines. After the set of such candidate text lines has been identified, the left margin of text zones on the subpage may be selected as the leftmost boundary among the candidate text lines, provided that at least two such text lines have this same left boundary.

Next, all text lines that satisfy the "candidate text line" criteria (set forth above), and that are substantially left-aligned (e.g., within one standard unit of tolerance) with the established left margin for text zones, may be identified as lying within a text zone. In most instances, such text lines will correspond to the interior text lines within a paragraph (e.g., generally excluding the first line of the paragraph, which is typically indented, and potentially excluding the last line of the paragraph, which is frequently short).

Next, the text lines that have been identified as lying within a text zone may be analyzed in order to determine a right margin for text zones, wherein the right margin is identified as the right-most extent of the text lines in question, but only if more than half of such text lines are substantially right-aligned with this value (e.g., within one standard unit of tolerance).

Additionally, in some embodiments text detection includes evaluating paragraphs to determine whether, and if so to what degree, the first text line of paragraphs are consistently indented. Accordingly, each text line that is immediately above one or more text lines that have been identified as lying within a text zone may be inspected in order to determine a paragraph indentation level. The paragraph indentation level may be taken to be the most frequent indentation among such lines, provided that the most frequent indentation is not more than 10 average character widths to the right of the left margin of text zones.

Having established these values, additional text lines may be identified as lying within a text zone, if the text line in question satisfies the "candidate text line" criteria (set forth above), and the text line is either (1) substantially left-aligned (e.g., within one standard unit of tolerance) with the paragraph indentation level, or is (2) substantially right-aligned (e.g., within one standard unit of tolerance) with the text zone right margin. This methodology may effectively serve to identify the first line of each paragraph.

Next, the last line of each paragraph may be identified according to the following criteria: (1) the text line is immediately below a line of text previously identified as lying within a text zone, (2) the text line satisfies the "candidate text line" criteria (set forth above) but excluding the minimum length requirement, and (3) the text line is substantially left-aligned (e.g., within one standard unit of tolerance) with the left margin of text zones.

In addition, the text lines that have been identified as lying within a text zone may be inspected, and a distinct text zone established for each group of consecutive such text lines. Subsequently, each text zone is preferably identified as a region to be excluded from consideration during table detection and extraction processing.

Notably, even where one of the foregoing criteria (excepting indentation level) is not satisfied, suspected text zones may be designated where the indentation level is consistent with other indentation(s) present in the subpage. Suspected text zones are preferably subject to additional analysis to verify/refute "text zone" status/designation.

Figure 24:
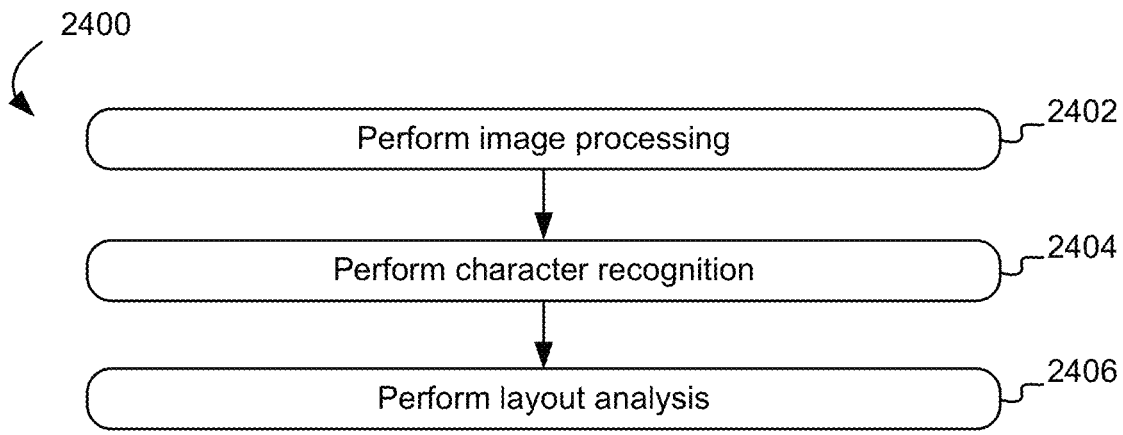
FIG. 24 is a simplified flowchart of a computer-implemented method for pre-processing image data to facilitate detection, extraction, and classification of tables and/or tabular data arrangements depicted therein, according to one embodiment.

Now referring to FIG. 24, a simplified flowchart of a computer-implemented method 2400 for pre-processing an original image depicting one or more tables and/or one or more tabular data arrangements is shown, according to one embodiment. The method 2400 may be performed in accordance with the present invention in any of the environments depicted in FIGS. 1-22, among others, in various embodiments. Of course, more or less operations than those specifically described in FIG. 24 may be included in method 2400, as would be understood by one of skill in the art upon reading the present descriptions.

Each of the steps of the method 2400 may be performed by any suitable component of the operating environment. For example, in various embodiments, the method 2400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 2400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 24, method 2400 includes operation 2402, in which image processing is performed. Preferably, image processing includes detecting graphical lines depicted in the original image; detecting boxes depicted in the original image; detecting bars and/or stacks depicted in the original image; determining effective rectangles for textual characters depicted in the original image; and/or identifying delineating lines depicted in the original image. However, it shall be understood that image processing may include/involve any selection, combination, or permutation of operations, features, evaluations, considerations, etc. described herein with respect to "Image Processing" without departing from the scope of the inventive concepts presented herein.

With continuing reference to FIG. 24, method 2400 includes performing character recognition in operation 2404. According to preferred approaches, character recognition includes statistically analyzing one or more geometric characteristics of the textual characters depicted in the original image; detecting and/or correcting recognition errors corresponding to the textual characters depicted in the original image; filtering the textual characters depicted in the original image; grouping some or all of the textual characters depicted in the original image; and/or characterizing a context and or a value of some or all of the textual characters depicted in the original image. Again, however, it shall be understood that character recognition may include/involve any selection, combination, or permutation of operations, features, evaluations, considerations, etc. described herein with respect to "Character Recognition" without departing from the scope of the inventive concepts presented herein.

In addition, method 2400 includes operation 2406, wherein layout analysis is performed. Layout analysis, in preferred embodiments, includes identifying one or more excluded zones within the original image. Excluded zones may include, without limitation, numbered lists, bulleted lists, key-value lists, subpages, page headers, page footers, page numbers, and/or textual zones. However, it shall be understood that layout analysis may include/involve any selection, combination, or permutation of operations, features, evaluations, considerations, etc. described herein with respect to "Layout Analysis" without departing from the scope of the inventive concepts presented herein.

Table Detection

Table detection preferably follows pre-processing, although in cases where tables and/or tabular data arrangements are relatively simple (e.g., strictly rectangular, including obvious graphical lines and/or clear delimiters between cells, rows, and columns, homogenous (or near-homogenous) data formatting, etc. (i.e., generally lacking characteristics described hereinabove as presenting substantial technical challenges)) table detection may be performed without pre-processing without departing from the scope of the presently described inventive concepts.

Regardless of whether pre-processing is applied or not, the inventive table detection approaches described herein generally include detecting grids, and detecting "non-grids" within the image data. Each previously detected box is inspected to see if it forms a grid, and thereby a table. If so, a table is defined from the grid, and the grid region is marked as "excluded" to prevent subsequent non-grid processing from potentially creating another table in the same region. Thereafter, detection of non-grids is performed.

Grid Detection

Table detection preferably includes grid detection, according to illustrative embodiments, and preferably including techniques for identifying grids, characterized by a substantially rectangular shape including X rows and Y columns, and a single cell at each integer position of (X, Y), with each cell delineated by surrounding graphical lines. In some approaches, detected grids are marked as "excluded" regions for purpose of subsequently detecting additional, e.g., non-grid, tables.

In various embodiments, grid detection includes one or more sub-operations, including but not limited to table determination and table creation.

Table Determination

Not all grid-like structures are tables. Various images may include graphics that include intersecting lines, and such intersecting lines may even form a box, without being a table. As understood herein, for a "grid" to be a "table," it preferably satisfies at least some, more preferably all, of the following criteria.

First, the table preferably corresponds to a box, as described hereinabove. Second, the table preferably has a header line, most preferably the header line is the first horizontal graphical line (or uppermost horizontal graphical line) within the box under consideration, excluding the topline of the box itself. Third, the header line preferably spans the entire width of the box containing the line. Fourth, the header line includes at least one dividing vertical line that extends above (or upward from) the horizontal line that defines the header line (in other words, the header line and vertical lines above indicate that headers are present for at least two columns). Fifth, at least some of the cells above the header line contain text (the particular portion of which that are required to contain text may vary depending on the type of table, in various approaches) Sixth, those cells, if any, that contain more than one element corresponding to predetermined types of elements commonly found in tables (e.g., currencies, percentages, etc.) cannot constitute a percentage of all cells greater than a predetermined threshold (e.g., no more than 5% of all cells).

Notably, during the table determination process described hereinabove, "nearly intersecting" lines are still considered to intersect in cases where the distance between the endpoint of a vertical line lies within a distance of one standard unit of tolerance from any portion of a horizontal line, and similarly where the endpoints of horizontal lines lie within a distance of one standard unit of tolerance from any portion of a vertical line.

Cell Identification

Having determined that a grid represents a table, each cell within the grid is preferably identified, along with the corresponding rectangle that defines the position of the cell. It should be noted that the cells within many grid tables are not uniform with respect to size and/or the number of rows and/or columns of which the cell is a member. For instance, in the exemplary table 1000 shown in FIG. 10, many cells have different sizes, and certain cells are members of multiple columns and/or rows, as further described below with respect to "merged" cells.

Identification of cells preferably occurs based on the OCR element(s) that reside within the bounding rectangle of the table. Most preferably, for such each OCR element, the left boundary of the containing cell, if any, is identified by the first graphical line within the table boundary that resides to the left of the OCR element. The corresponding top, right and bottom boundaries of the cell are similarly identified by the first graphical line within the table boundary that resides above, to the right of and below the OCR element, respectively. In the case than no such graphical line exists, the boundary of the cell is taken to be the corresponding boundary of the table (i.e., left, top, right or bottom of the corresponding box). It should be noted that a given cell can contain multiple OCR elements, i.e., each element in a multiple-element cell does not necessarily create a duplicate cell.

Identification of cells preferably includes additional analysis to determine whether each identified cell, and the OCR element(s) contained therein, constitutes a valid portion of the table, or conversely whether the cell contains extraneous information that is not in fact part of the table structure and should therefore be discarded. This is accomplished in preferred embodiments by considering how the sides of the cell were identified as described hereinabove. In particular, it is beneficial to consider whether each side was defined by a graphical line, or whether the side was defined by the table boundary because no graphical line was present.

Figures 12, 13:
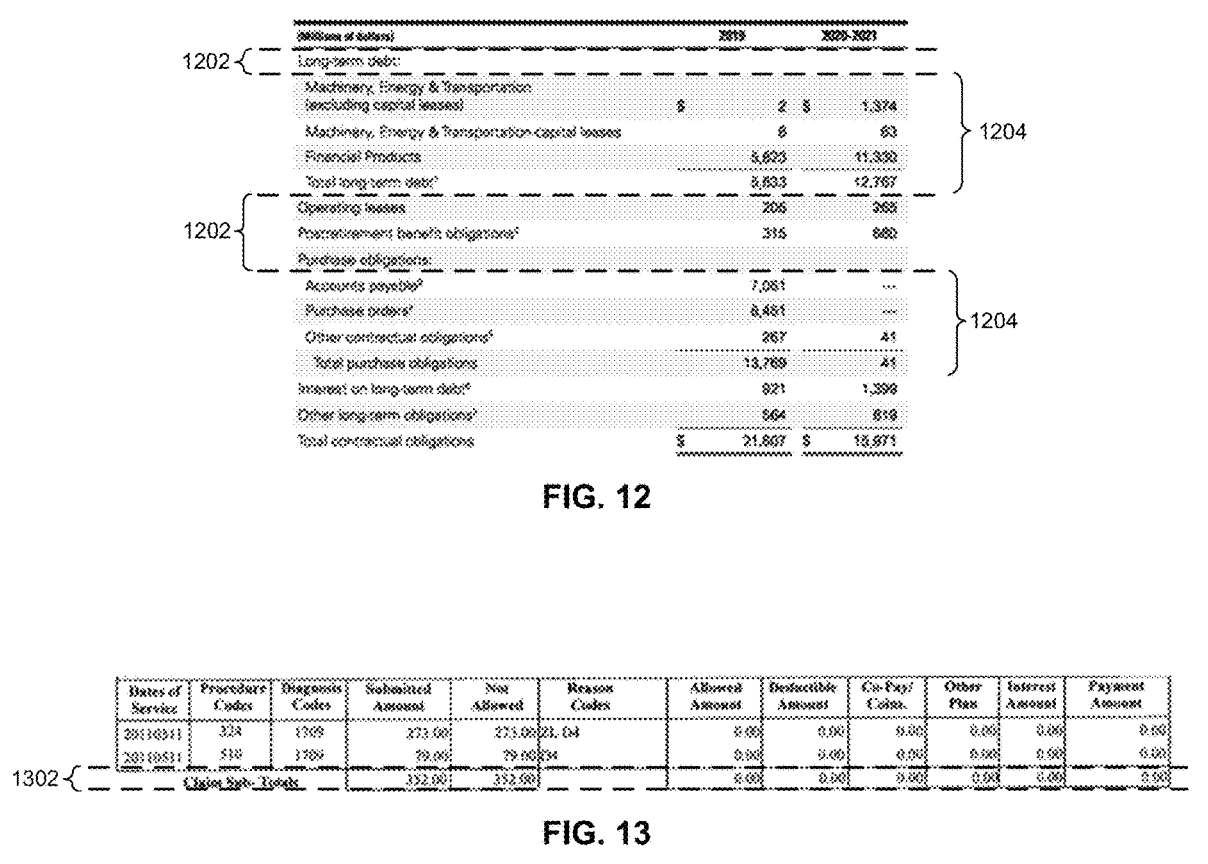

In preferred embodiments, cells where three or more sides were defined by graphical lines are deemed to constitute a valid portion of the table. Cells with two or fewer sides defined by graphical lines are valid only if: (1) all such graphical lines intersect the table boundary, and (2) the cell does not overlap with any other cell. Otherwise, the cell is understood to contain ancillary information that is not part of the table, and no value should be associated with such a cell during table creation and/or extraction. The aforementioned considerations are advantageous in order to properly address grids that are incomplete and/or have jagged bottom edges, such as shown in FIGS. 1E-1F and 13, according to several exemplary embodiments.

Table Creation

With tables and the corresponding cell structure determined, grid detection preferably includes performing table creation. In illustrative embodiments, table creation includes defining the header line, i.e., as detected during table determination described above. Further, table creation includes defining a plurality of rows that are delineated by the horizontal lines within the table boundary that reside below the header line, regardless of whether the horizontal line extends the entire width of the table. A plurality of columns are similarly defined based upon the vertical lines that intersect the header line.

It should be noted that according to this methodology, rows and columns are defined at the "most granular" level indicated by the graphical lines, and that some cells will intersect with, and thereby may be considered to be members of, more than one row and/or more than one column. Such cells are frequently termed "merged cells" and are preferably handled in a manner such that extraction results produce a uniform matrix of cell values.

Accordingly, a cell or a "virtual cell" may be defined for each (X, Y) position in the (X, Y) grid forming the table, even if no single cell actually exists at said (X, Y) position in the image data. "Virtual cells" are defined where multiple (X, Y) position(s) in the grid are assigned/allocated to a single (typically merged) cell. All "virtual cells" are preferably assigned the same data value.

Figures 10, 11:
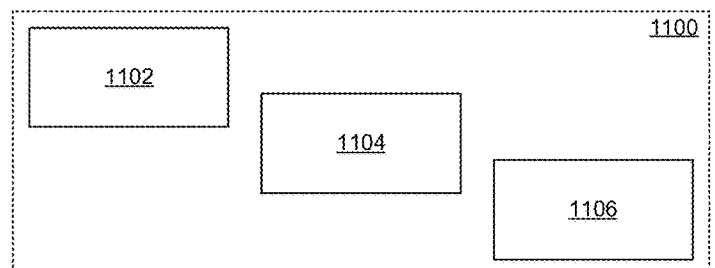
FIG. 10 shows an example of a table including merged cells, in accordance with one exemplary embodiment.
FIG. 11 is a simplified schematic of a "column cluster" according to one exemplary embodiment and as defined herein.

For instance, in the exemplary table 1000 shown in FIG. 10, the first three columns 1002, 1004, 1006 each have two merged cells in the data section, e.g., cells 1002a, 1002b for column 1002. Regardless, according to the presently disclosed inventive concepts, rows are defined to match the smallest granularity of the table, such that cells form a uniform matrix. Hence e.g., the data values (e.g., "11" for column 1002, "DS-11" for column 1004) are used to define different "virtual cells" (represented in FIG. 10 by dashed boxes with gray background), where each such virtual cell corresponds to a different row of the most granular table structure. Similar virtual cells (and replicated values) are created in the third column 1006. The remaining cells (represented by gray boxes) have defined boundaries according to the most granular table structure, and are defined according to this grid structure as present on the image.

Additional aspects of table creation include creating/defining row descriptors and column descriptors, in some approaches. A cell is defined as a "row descriptor" if the cell intersects the x-value of any vertical line (note: the lines need not necessarily actually intersect, but may merely have a same x-value), and the cell extends across the entire width of the table. A cell is defined as a "column descriptor" of the bottom of the cell rectangle is above the header line of the table (i.e., the cell rectangle is above and does not intersect with the header line).

Figure 25:
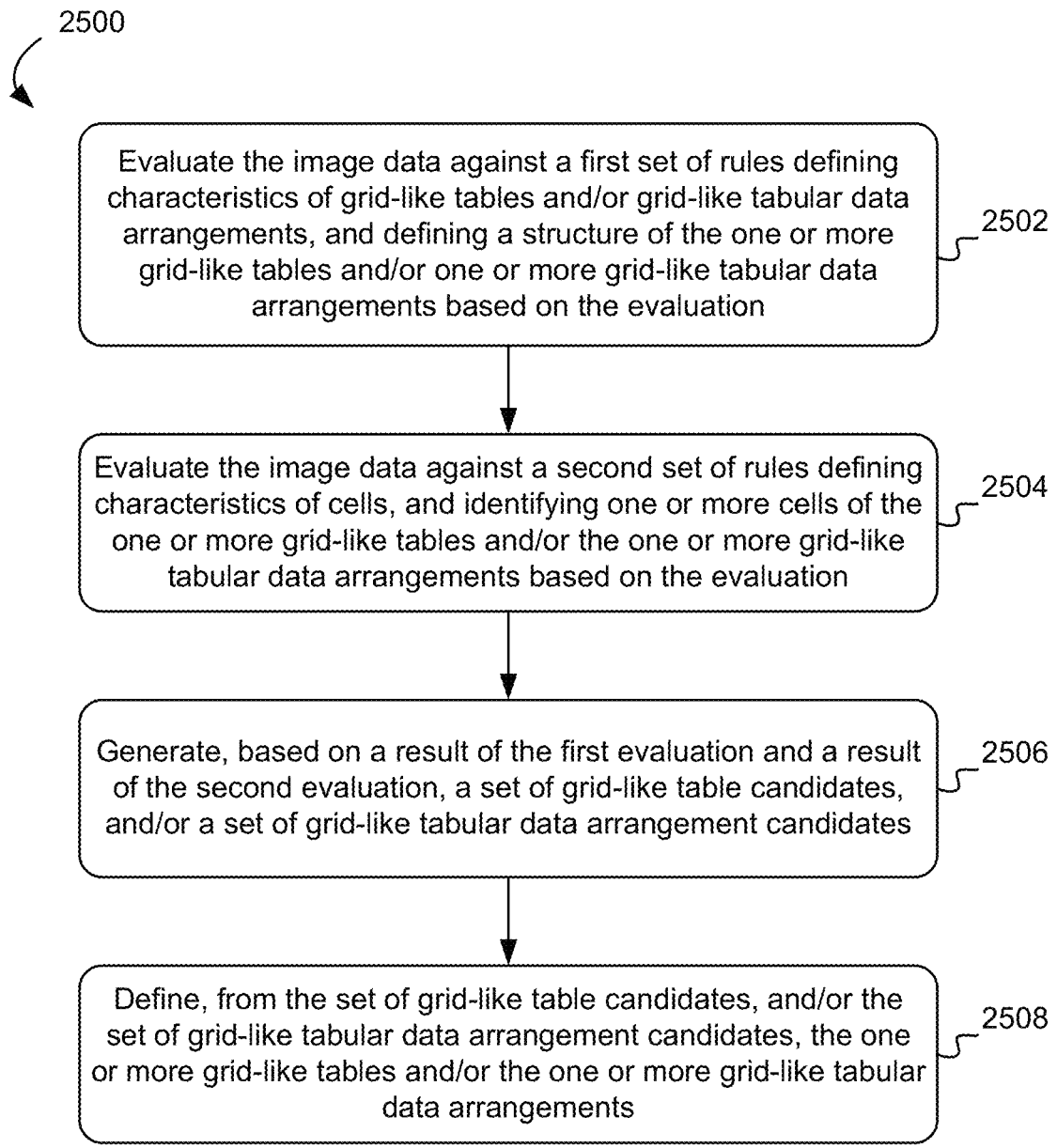
FIG. 25 is a simplified flowchart of a computer-implemented method for detecting grid-like tables and/or grid-like tabular data arrangements that are depicted in image data, according to one embodiment.

Now referring to FIG. 25, a simplified flowchart of a computer-implemented method 2500 for detecting one or more grid-like tables and/or one or more grid-like tabular data arrangements depicted in image data is shown, according to one embodiment. The method 2500 may be performed in accordance with the present invention in any of the environments depicted in FIGS. 1-22, among others, in various embodiments. Of course, more or less operations than those specifically described in FIG. 25 may be included in method 2500, as would be understood by one of skill in the art upon reading the present descriptions.

Each of the steps of the method 2500 may be performed by any suitable component of the operating environment. For example, in various embodiments, the method 2500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 2500. Illustrative processors include, but are not limited to, a central processing unit (CPU), an application specific integrated circuit (ASIC), a field programmable gate array (FPGA), etc., combinations thereof, or any other suitable computing device known in the art.

Moreover, it shall be understood that grid-based detection as performed in accordance with method 2500 may include/involve any selection, combination, or permutation of operations, features, evaluations, considerations, etc. described herein with respect to "Grid Detection" without departing from the scope of the inventive concepts presented herein.

As shown in FIG. 25, method 2500 includes operation 2502, which in turn involves evaluating image data against a first set of rules defining characteristics of grid-like tables and/or grid-like tabular data arrangements, and defining a structure of the one or more grid-like tables and/or one or more grid-like tabular data arrangements based on the evaluation.

In operation 2504, method 2500 includes evaluating the image data against a second set of rules defining characteristics of cells, and identifying one or more cells of the one or more grid-like tables and/or the one or more grid-like tabular data arrangements based on the evaluation.

Moreover, method 2500 includes, as part of operation 2506, generating, based on a result of the first evaluation and a result of the second evaluation, a set of grid-like table candidates, and/or a set of grid-like tabular data arrangement candidates.

With continuing reference to FIG. 25, operation 2508 of method 2500 includes defining, from the set of grid-like table candidates, and/or the set of grid-like tabular data arrangement candidates, the one or more grid-like tables and/or the one or more grid-like tabular data arrangements.

Non-Grid Detection

Table detection preferably further includes detection of "non-grids," which encompass tables and table-like structures where not all cells are delineated by graphical lines—where there may be some, or no graphical lines present in the table. Preferably, non-grid detection is performed for all zones not excluded from table detection by the foregoing zone/layout analysis and/or grid detection. Moreover, since "non-grids" are usually not characterized by the strict rectangular structure of grids, non-grid detection preferably includes an iterative boundary finding process.

The tables that are detected using non-grid analysis are not complete grids, but preferably contain at least some graphical lines. Where graphical lines are present they may be utilized to an extent to improve detection of table boundaries (and also in extraction—e.g., in detecting the table interior structure, as described in greater detail elsewhere herein) in combination with OCR.

In one embodiment, non-grid detection uses text alignment and any present graphical lines to identify column "seeds," i.e., small groups (e.g., two or more) of vertically aligned elements within the page. These seeds are defined/identified based on vertical alignment, preferably using stacks and vertical lines to group columns into clusters of columns, where each cluster of columns is a potential table.

Seed-based clustering of columns may be repeated iteratively until the clustering reaches convergence, for example using operations substantially as follows. In preferred embodiments, the non-grid detection workflow essentially detects the table interior, and extends outward so long as text alignment (vertical and/or horizontal, according to various approaches) is consistent. Notably, this inside-out approach is fundamentally the opposite of pattern-recognition techniques typically employed, e.g., by humans mentally, to identify and characterize tables/tabular data arrangements.

Specifically, while a human typically identifies the outer bounds of a table/tabular data arrangement, and gleans context about the information included in the table from outer-lying elements such as the table title, header(s), and/or row label(s), the presently disclosed inventive concepts follow a distinct set of objective rules to identify the boundaries of tables/tabular data. In brief, the presently disclosed inventive concepts include first identifying internal data values, then based on geometric characteristics (particularly regarding horizontal and/or vertical extent, alignment, etc.) and/or existence of common aspects/patterns (e.g., common units, common pattern of expression such as formatting, number of placeholders, type of characters included/excluded, sequence of characters, etc. as described elsewhere herein and/or as would be understood by a person having ordinary skill in the art upon reading the present descriptions), iteratively identifying boundaries (e.g., of values, cells, rows, columns, groups of rows, groups of columns, etc. in various approaches) corresponding to the data values, and growing and associating such boundaries outward until the entire table/tabular data arrangement is included in the definition of the resulting table. These rules are described in greater detail below.

Moreover, the iterative boundary finding and table growth process proceeds according to a set/series of objective rules and definitions (including but not limited to the definition of various sub elements and elements of cells, rows, columns, and tables) evaluated in a logical procession entirely distinct from the subjective manner in which humans (and similarly employed pattern recognition techniques) identify, analyze, and extract/derive information from tables and other tabular data arrangements.

Returning now to the notion of non-grid detection, and the presently disclosed inventive, seed-based approach thereto, in preferred embodiments non-grid detection includes finding column seeds in one or more of three principal ways: from element pairs (especially pairs that are well-aligned, e.g., as described herein with respect to column seed alignment, on adjacent text lines and/or satisfy other criteria), from stacks or boxes, and from vertical lines, again as described in more detail below, and in accordance with various embodiments of the presently disclosed inventive concepts, regarding non-grid detection, and more particularly regarding finding column seeds.

Find Column Seeds from Element Pairs

This approach creates initial column seeds based on elements within adjacent text lines that are not separated vertically by more than a configurable distance, e.g., a distance between text lines of at least about 2.5 times a height of a "tallest" of the adjacent text lines. A column "seed" is created for each element pair (one from each text line) that satisfies some, preferably all, of the below criteria (and may be equivalently referred to as a "vertical element couple").

First, the elements are preferably not part of an excluded zone (defined by zone/layout analysis). Second, if the elements are known data types (e.g., currency amounts, percentages, dates, etc. as would be understood by a person having ordinary skill in the art upon reading the present disclosure) then such elements preferably are not separated by: a different type of element (e.g., text), and/or a delineating line. Third, the elements preferably are well-aligned in some way, e.g., left aligned, right aligned, center aligned, justified, etc. Fourth, if the elements are unknown data types, the pattern of the elements preferably match to a predefined degree, e.g., as may be evaluated using a generic pattern, e.g., character type and/or case (as described above, e.g., alphabetic, numeric, other, upper/lower case, etc.). Fifth, the elements preferably are not in separate boxes, i.e., elements are either in the same box or no box at all.

This test is preferably applied for three different definitions of "adjacent": (1) "strictly adjacent," in which no text lines exist between elements/text lines, (2) "nearly adjacent," in which elements/text lines may be separated by a single line of text therebetween, and (3) "somewhat adjacent," in which elements/text lines may be separated by up to two lines of text therebetween. Furthermore, to be considered as a column seed, the absolute distance between the elements in the y direction cannot exceed 4 times the average height of text lines on the page in question. Column seeds are identified based on element pairs that satisfy one or all definitions.

Find Column Seeds from Stacks or Boxes

Again, a "stack" is a group of "bars" where each horizontally oriented bar is a rectangle with alternating shading, which frequently define alternating rows of a table/tabular data arrangement. The outer extent of the stack is defined by a rectangle that contains all such bars.

Detection of "seeds" within stacks are treated differently and more aggressively, as it can be inferred the "seeds" are part of a table from the definition of "stacks." Preferably, columns (seeds in this case) may be defined within stacks by finding sets of elements that are "connected" vertically, e.g., by common alignment, data values, patterns, etc. In preferred approaches, "connectedness" is a transitive property, in that two elements "A" and "C" which do not have any common alignment, data values, etc. with respect to one another, but each do have common alignment, common data values, etc. with a third element "B", then elements "A" and "C" are to be considered "vertically connected components." For example, FIG. 11 depicts "horizontally connected" elements within an image. "Vertically connected" elements exhibit a similar arrangement, except transposed relative to the arrangement shown in FIG. 11, such that the "vertically connected components" share at least one common (x) coordinate value.

Preferably, the methodology described above for stacks is similarly employed for boxes, if the box in question: (1) does not exhibit uniform shading across the interior of the box that is different in color from the predominant background color of the containing subpage, and (2) does not substantially occupy the entirety of the containing subpage, for example as identified by an area greater than 90% of the subpage area.

Find Column Seeds from Vertical Lines

For each pair of adjacent vertical lines that: (a) have substantially the s vertical extent (e.g., within one standard unit of tolerance), and (b) are not separated too widely, e.g., not separated by more than half the width of a subpage in question, with respect to the containing subpage/subpage, it is logical to formulate a column (seed) from the contained elements, particularly if one or more, preferably all, of the following criteria are met: (1 there are at least three such elements contained within the rectangle defined by the pair of vertical lines, i.e., where the left/right edges of the rectangle are defined by the vertical lines; (2 all elements are all of known, and preferably the same, data types (e.g., currency, date, Vehicle Identification Number, etc. as would be appreciated by a person having ordinary skill in the art upon reading the present disclosure); and (3) only one such contained element is located between any given pair of vertical lines on any given text line.

Once column "seeds" are identified, an iterative, boundary growing process is performed to continue identifying additional elements of the table, in an outward-growing manner, until the full extent of the non-grid table is determined, as described in the subsections that follow.

Group Columns

As understood herein, a "column cluster" 1100 as depicted in FIG. 11 is a potential/prototype table. These start small and grow outward. To be joined into a cluster, the columns in question preferably satisfy one or more, most preferably all, of the following criteria. First, the columns belong to the same box or no box. Second, the column or columns belong to the same subpage/subpage. Third, the column or columns intersect horizontally (i.e., share some common text lines). This last criterion is transitive in the sense that if a first column 1102 is connected to a second column 1104, and second column 1104 is connected to third column 1106, then first column 1102 is considered connected to third column 1106—even if 1102 and 1106 do not intersect horizontally, as in FIG. 11.

Join Columns

If two (or more) columns contain the same element, the columns in question may be joined to form a single column. Based on the "expand" logic (described in separate subsections), it is possible the same element can be added to (at the time) different columns.

Expand Columns Upward

For each cluster separately, for each column in the cluster, try to extend the column upward: Consider each element between the top of the column up to and including one text line above the top of the cluster, if any, and add the element to the column (thereby growing the column upward and potentially in width) if some or all (again, preferably all) of the following criteria are satisfied: (1) the element is not in an excluded zone; (2) the element and column are in the same box or no box at all; (3) the element is not an underlined element that intersects multiple columns; (4) the element alignment matches the alignment of other cells in the column e.g., left aligned, right aligned, center aligned, justified, indented, hanging, having same line spacing, or any other alignment type and/or characteristics of an alignment type would be understood by a person having ordinary skill in the art upon reading the present disclosure); (5) either or both: a) least half (50%) of the element's width intersects the horizontal extent of the current column; and/or b) the element intersects the current column, and only the current column; (6) adding the element would not cause the cluster to intersect an excluded region; (7) if the element and the current column are not located within a common box, the vertical distance between the element and column is not greater than a predefined amount (e.g., 2.5 times the average height of elements currently contained within the column); and/or (8) the element in question cannot reside within a suspected column descriptor, as identified by the presence of delineating lines such that (a) a first delineating line with multiple sublines exists within the currently defined vertical extent of the column; (b) a second delineating line exists that underlines the candidate element to be added (i.e., and is therefore above the first delineating line); and (c) the second delineating line contains a subline that spans the horizontal extent of one or more gaps between the sublines of the first delineating line.

Notably, unless expressly stated otherwise, all references herein to the term "alignment", "align", "aligned", etc. refer to alignment within one standard unit of tolerance, i.e., it is not necessary for precise equality of x- and/or y-pixel values to exist for two quantities to be considered "aligned." For example, two OCR elements are considered to be left-aligned if the distance between the x-coordinates or their respective left edges is less than one standard unit of tolerance (and similarly with respect to right-aligned, center-aligned, etc. as would be understood by one with ordinary skill in the art).

Expand Columns Downward

After expanding columns upward, a similar downward expansion is preferably performed. For each cluster separately, for each column in the cluster, try to extend the column downward: Consider each element between the bottom of the column down to and including one text line below the bottom of the cluster, if any, and add the element to the column (thereby growing the column downward and potentially in width) if certain criteria are met.

The inclusion criteria for downward expansion are preferably very similar to the inclusion criteria for expanding upward, but slight modifications are appropriate. For example, it is appropriate to omit the criteria for expanding into a suspected column descriptor, since this is not possible in the downward direction.

In the case that no element is added to the cluster according to these criteria, additional specialized criteria may be used in order to reliably identify and incorporate "jagged" bottom rows, such as row 1302 in FIG. 13, in preferred embodiments. Such specialized criteria preferably includes: (1) the cluster contains at least two columns, (2) the element in question resides within the text line immediately below the current bottom of the cluster, (3) the vertical distance between the text line and the bottom of the cluster is less than twice the average height of text lines on the subpage, (4) the text line does not intersect another cluster or have elements that reside in different boxes, (5) the text has at least two elements, (6) each element in the text line horizontally overlaps one and only one column, and (7) if any element in the text line is of a predefined type commonly present in tables (e.g., currency amounts, percentages, etc.), the bottom element in the corresponding (overlapping) column must be of the same predefined type.

Expand Columns Inside

It is possible that a column may "skip" text lines, e.g., the column may contain an element from the $3^{rd}$ text line on the subpage, and an element from the $5^{th}$ text line on the subpage, but not any element from the $4^{th}$ text line on the subpage (i.e., the text line between the $3^{rd}$ and $5^{th}$ text lines on the subpage). This step inspects such elements (i.e., within the existing vertical extent of the column but not already part of the column, which may represent one or more rows in a table) and adds them (thereby widening the column) if at least some (again, preferably all) of the following conditions are met: (1) the element is not excluded or already part of the column; (2) the element and column are in the same box or no box at all; and/or (3) the element is aligned with at least two elements that are already in the column, e.g., left aligned, right aligned, center aligned, etc.

This interior expansion advantageously includes elements within columns robustly even where elements of the column in adjacent text lines are not "well aligned," according to the same criteria set forth above regarding upward/downward expansion of columns.

Iterative Cluster Growth

In accordance with preferred embodiments of the presently disclosed inventive concepts, the foregoing column-based growing procedure is repeated iteratively until the entire extent of the table/tabular data arrangement is included in the resultingly defined column cluster, i.e., a prototype non-grid table.

Moreover, after column seeds are found, each iteration preferably proceeds by performing the following sequence of operations as described hereinabove: Expand Columns Upward→Join Columns→Group Columns→Expand Columns Downward→Join Columns→Group Columns→Expand Columns Inside→Join Columns→Group Columns. The iterations cease when convergence is attained. According to preferred embodiments of non-grid detection as described herein, convergence occurs when a state of a column cluster upon completing the current iteration does not change relative to the state of the column cluster following the previous iteration. Of course, other measures of "convergence" that would be appreciated by a skilled artisan as suitable for non-grid detection, upon reading the present disclosure, may be employed in other embodiments without departing from the scope of the inventive concepts presented herein.

Find Row Titles/Row Title Columns

In preferred approaches, "row titles" are synonymous with row headers, which are present in some but not all tables (typically appearing as descriptive text in the leftmost column of all rows for tables including text. Skilled artisans will appreciate this approach is equally applicable to languages depicted according to a horizontal orientation (e.g., left-to-right as for the English language) and languages depicted according to a right-to-left orientation (e.g., as is the case for Arabic and Hebrew languages). Moreover, as row titles/headers commonly indicate or delineate columns, as described herein references to "row titles" shall be understood as equivalent to "row title columns."

Row titles may be problematic for table detection, because they are text, potentially comprise multiple text lines, and therefore have different alignment characteristics than is typical in data cells (i.e., row titles are not always "well aligned" in the conventional sense). While row titles tend to be left-aligned as is the case for rows 1202 in FIG. 12, there is often indentation, e.g., as demonstrated graphically in rows 1204.

Accordingly, as part of non-grid detection, it is preferable, for every identified cluster, to determine whether a column exists on the left that exhibits the characteristics of a row title column, e.g., as may be indicated by criteria such as: (1) there being elements on two "neighboring" text lines (within the cluster) that are to the left of the left-most column (here, "neighboring" can be adjacent text lines or text lines that are separated by a configurable number of other text lines); (2) neither element being located in an excluded region; and/or (3) the elements exhibit at least one common alignment characteristic (e.g., in the example of FIG. 12, many of the indented text lines are left aligned with each other, while not left aligned with non-indented text lines). In this way, the row title column may have less-stringent alignment criteria than other columns. For instance, in one approach it is sufficient to require only that a certain subset of the elements in this column are aligned, not all elements (again, for the purpose of handling indentation).

If a row title column is identified according to the above description, the cluster-growing process (Expand Up→Join→Group→Expand Down→Join→Group→Expand Inside→Join→Group) is preferably repeated until convergence to ensure that any identified row title columns are included in the final table definition. Furthermore, it can frequently occur that a vertical gap exists in the data portion of the table, but no such gap exists in the row title column, and that inclusion of the row title column can therefore serve to joint two clusters that properly constitute parts of the same table (e.g., the upper and lower portions of the table).

Once defined, boundaries and/or edges of a non-grid table/tabular data arrangement are preferably refined, e.g., according to one or more of the following approaches.

Create Tables from Column Clusters

This step manipulates a "cluster" to generate a "table" data structure. This unique "table" data structure is particularly well-suited to the remaining tasks involved in table detection and table extraction, which generally involve manipulation of the data structure and/or evaluation of the data represented therein/thereby.

Split Tables that are Joined Horizontally (Side-by-Side Tables)

This technique splits adjacent tables that were improperly construed as a single table, e.g., using one or more detection techniques described hereinabove.

It is easy for tables that are adjacent horizontally (i.e., side-by-side) to be mistakenly interpreted as a single table, as such tables most often: (1) are not separated by a significant horizontal distance; and (2) have the same row structure (i.e., rows align).

The creation and separate processing of "subpage(s)" (e.g., as described hereinabove) facilitates avoiding inadvertent joining of adjacent tables. To further reduce, or more preferably prevent, such inadvertent joining (e.g., where side-by-side tables are present within a single subpage), single tables may be split where the table meets some or all (preferably all) of the following criteria: (1) having at least a predetermined minimum number of columns (e.g., at least four columns); (2) at least two adjacent columns are separated by at least a minimum, predetermined horizontal distance (which may be considered/designated a "candidate split point" and in some approaches may be determined by a threshold separation equal to at least about 20% of a currently defined table width); (3) no horizontal line(s) cross the gap between horizontally adjacent columns corresponding to a candidate split point; and (4) at least one vertical line resides within the gap between horizontally adjacent columns corresponding to a candidate split point.

Refine Top Edge

Top edge refinement as described herein facilitates accurately identifying the top of tables, since the column headers frequently have different alignment characteristics from the data portion of the table. Again, as with row titles, the alignment is frequently "fuzzier" in this region and thereby requires specialized analysis.

Find Column Headers; Expand Table Vertically; Validate Headers

The presently described inventive concepts may also include one or more steps configured for handling variable alignment and/or arrangement of elements of the header region, such as finding column headers, expanding tables vertically, and/or validating headers.

The header region analysis addresses problems introduced when column headers do not in general follow the same alignment patterns as in the data region. Using the logic to find the "core" (which is somewhat targeted at the data region) of a table such as described herein with respect to table detection, especially non-grid detection, finding of column seeds and subsequent growth of column seeds to the outer boundary of the table, sometimes the column headers are found completely (e.g., where the columns headers are substantially aligned with data values and/or each other, especially where aligned with both), sometimes not found at all (e.g., where lacking alignment with data values and/or each other, especially where lacking both), and sometimes only found partially (e.g., where headers for some columns align and some do not, with the data values, each other, or both).

Accordingly, the presently described inventive concepts are specially adapted/configured to accurately include the complete header region within the detected table boundary, as described herein immediately below with respect to splitting off headers, validating headers, and/or updating table boundaries based on delineating lines. In addition, several important pieces of information are determined and recorded for use during table extraction.

Split Off Headers

In various approaches, text lines above the top of the leftmost column of a table and which depict a language oriented horizontally, preferably in a left-to-right progression, are considered candidates for being included as a header. Skilled artisans will appreciate that for other orientations, a corresponding arrangement may be sought/required, e.g., text lines above a top of the topmost row of a table depicting a right-to-left oriented language (such as Arabic, Hebrew, Sindhi, Persian, etc.). Skilled artisans reading the present disclosure will appreciate that the particular location(s) considered as candidate column/row headers depends on the orientation of text within the table, and the structure/layout of the table/tabular data arrangement.

For existing columns with elements above this line, a separate "mini" column is preferably created (e.g., within the table data structure), and designated as header, and the new "header column" is associated (again, preferably within the table data structure) with the remaining/modified "data column." In addition, the "column top" value across all columns (i.e., presumed top of the data region) is updated (yet again, preferably within the table data structure), to reflect the new top of the (data) column.

Find Headers

For one or more, preferably all (at least all data) columns, it is appropriate to determine whether to extend the header upwards, e.g., by accounting for whether the data column currently has a header or not (if not, in some approaches, the presently described inventive concepts may include assigning a header column with no occupying value, i.e., an "empty" header column). For each column Start TLX and/or a Stop TLX (preferably both) are established as the vertical boundaries within which, and the column header, if any, will be considered to potentially reside, in preferred approaches. In this context "TLX" is understood to be an abbreviation for and synonymous with Text Line Index, where text line indices increase in the downward direction (e.g., text line 3 is the text line immediately below text line 2).

For columns that already have an associated header (as per the methodology described herein above), the Start TLX is taken to be the TLX immediately above the top of the column header. Otherwise the Start TLX is taken to be the TLX immediately above the top of the data column. If an excluded region exists above the column, the Stop TLX is taken to be the TLX immediately below the lowest such excluded region. Otherwise the Stop TLX is taken to be zero (i.e., corresponding to the topmost text line on the subpage in question).

In more embodiments, moving iteratively upward from Start TLX to Stop TLX, the indicated text lines and the elements contained therein are inspected for potential inclusion within the column header. If the text line in question is more than a maximum allowable vertical distance from the uppermost element currently within the column, header extension preferably terminates for this column, where the maximum allowable distance is taken to be either: (a) 2.5 times the height of the tallest element currently within the column, or (b) 3 times the height of the tallest element currently within the column if the candidate element to be added is underlined by a delineating line.

If the text line in question is within the maximum allowable vertical distance, for every element on the text line: add the element to one and only one header column (i.e., corresponding to one and only one data column) in response to determining one or more, preferably all, of the following conditions are met: (1) the element is not in an excluded region; (2) if a header is already associated with the column, the element is not separated from the elements below (i.e., in the existing header) by any horizontal graphical line(s); and (3) at least one of the following two conditions is met: (a) the element rectangle is fully contained within the horizontal extent of the column in question; and/or the element overlaps the column in question but does not overlap any other column(s).

Validate Headers

In an illustrative embodiment, non-grid detection also includes validating detected headers, which preferably includes evaluating the following criteria and performing the corresponding actions.

If: (1) the table includes many columns (preferably more than three) but only one header; (2) the sole header has only one element; and (3) the sole header is not underlined, then either: (a) move the sole header to the data column (if it fits the column alignment, effectively creating a column descriptor), or (b) discard the element.

Additionally, for each column: ensure the header (if any) does not intersect other elements. For instance, consider the elements in the header text lines that are not in the header for any column. If any such element significantly intersects the header rectangle for any column, clear the header.

Update the Table Boundary Based on Delineating Lines

This logic further refines the top boundary of the table. In the process, the left and right boundary of the table can also be adjusted outward. The situation is that in finding the table so far, we have usually included at least part of the header. In doing so, there are often delineating lines within and/or in close proximity above the currently detected table boundary, where such delineating lines serve to separate the header from the data, and/or to separate column headers from column descriptors.

In still more approaches of non-grid detection, it can also be the case that the currently detected header does not extend upward far enough, and there is a delineating line(s) (e.g., for a column descriptor(s)) immediately above the existing header. If so (and it can be determined that this is actually a/the meaningful delineating line(s) associated with a column descriptor) then it is preferable to grow the table upwards. Column descriptors are typically not identified in previous steps (and hence were not included within the table boundary) because they typically do not align with any specific column but rather span multiple columns.

The criteria used to determine whether a delineating line above the current table boundary should be used to grow the table upward, according to one exemplary embodiment, include: (1) the candidate graphical line is not adjacent to, and preferably not immediately below, one or more predefined data types commonly included in the data portion of tables (., currency amounts, percentages, etc.), (2) the candidate line is within a predefined maximum vertical distance from the currently defined top of the table (e.g., within 1-2 times, preferably about 1.5 times, the average text height in vertical distance from the currently defined top of the table), (3) the candidate line does not lie in an excluded region or within a different presently detected table, and (4) the table and candidate line do not lie within different boxes, i.e., both lie within the same box or no box. If a first such delineating line is found above the current top boundary of the table, it is particularly advantageous to search for the presence of a second delineating line above the first, according to substantially similar criteria, but using a reduced maximum vertical distance as measured from the first delineating line (e.g., the second delineating line must lie no more than 4 times the average text height in vertical distance above the first delineating line).

Further still, for any delineating lines within the table region (e.g., either the previous region or the presently grown region in cases where a delineating line(s) exists immediately above), use the horizontal extent of the delineating line(s) to extend the table's left and/or right boundaries so as to include the entire delineating line(s). For example, according to one embodiment, table 1400 as shown in FIGS. 14A-14C is detected according to a non-grid approach as described herein.

Table 1400 includes a data portion 1402 and a header portion 1404. However, as shown in FIG. 14A, both the data portion 1402 and header portion 1404 were not completely captured using conventional image processing techniques. The header portion 1404 erroneously excludes column descriptor 1408, while the data portion 1402 erroneously excludes column 1410. Even the aforementioned non-grid-based detection techniques may fail to capture the entire table/tabular data arrangement. Accordingly, in one embodiment it is advantageous to detect and leverage delineating lines to facilitate table/tabular data detection. For instance, with continuing reference to FIG. 14A, table 1400 also includes a delineating line 1406a separating the lower section of header portion 1404 from column descriptor 1408. In addition, the originally defined table 1400 excludes the final column 1410, including header 1404z.

In various approaches, it is advantageous to reevaluate the table definition using heuristics to determine whether delineating line 1406a is in fact a meaningful delineating line for a column descriptor. For example, such heuristics may include any one or more of the following considerations: ((1) the delineating line is not a single horizontal line that spans greater than 80% of the table width, (2) a text line exists immediately above the delineating line within a maximum vertical distance of one average text height, and (3) each element (i.e., each candidate column descriptor) within the text line immediately above the delineating line resides above, and is centered about, a distinct subline within the delineating line.

In response to determining the delineating line 1406a is a meaningful delineating line for a column descriptor in table 1400 (i.e., column descriptor 1408 according to the exemplary embodiment shown in FIGS. 14A-14C), expand the top of the table to include the column descriptor(s), as shown in FIG. 14B. (Note that table 1400, and header portion 1404 in particular, is extended vertically to include column descriptor 1408.)

Further, since the delineating line 1406b 1406b also extends beyond the horizontal extent of header portion 1404, 1408 to the right, it is preferable to determine the table also extends farther to the right. In some embodiments, this rightmost column might not have been previously detected/included in the table definition, e.g., if the data within that column is very sparse (or even empty), such as shown in FIGS. 14A-14B. However, even in the absence of such data, the rightmost column may be included as part of the table based on the presence, and horizontal extent of, a second delineating line 1406b appearing under the various header labels, as well as under the column header 1404z, as shown in FIG. 14C. Note that by performing the above rule-based, non-grid detection approach, the presently disclosed inventive techniques advantageously detect/capture all of the headers of the table 1400, as well as corresponding portions of the data, despite the lack of conventional cues to indicate inclusion thereof in the overall table/tabular data arrangement.

Join (Stacked) Tables

Referring still to non-grid table detection, in some embodiments a single table may exhibit significant vertical gap(s), which may cause the table to be mistakenly identified as two "stacked" tables. Also, it can sometimes happen that the header of a table is mistakenly identified as a separate table, e.g., due to the often-different alignment characteristics of the header region vs. the data region.

The presently described inventive concepts, in some embodiments, it is preferable to join such "stacked" tables if one or more (preferably all) of the following criteria are satisfied: (1) both tables have at least two columns; (2) neither table is defined by a box or was detected as a grid; (3) the top table was assigned a header in the "find headers" and/or "update table boundary" processing described above, while the bottom table does not; (4) the tables are characterized by a horizontal overlap greater than about 50% of the width of the narrower table; (5) No "excluded" regions exist/are located between the tables; (6) there are no other tables located between the two tables; and/or (7) at most one column in either table does not significantly overlap horizontally with one and only one column in the other table.

If it is determined from the above criteria that the tables should be joined, it is advantageous to do so by computing a new (joint) rectangle for the table, and re-performing some, or all, of the previous operations on the joint table, including but not limited to: computing new columns, finding column headers, and/or updating the table boundary based on delineating lines.

Evaluating Table/Tabular Data Arrangement Relevancy

While table detection as described hereinabove primarily includes identifying the position and structure/layout of tables, in preferred approaches table detection further includes a relevancy determination component. Determining relevance of tables/tabular data is preferably based on user input, specifically a user identifies from among a set of tables detected within a training dataset (which may include a relatively small number of representative documents, corresponding to a test dataset including one or more documents, and hundreds or thousands of pages), those tables that are "relevant" to one or more downstream applications/analyses.

Thus, an initial relevancy determination is based on user input regarding the training dataset, while subsequent analysis of the full test dataset is based on the user-defined relevancy as determined from training. Preferably, relevancy determination for the test dataset employs machine learning to be able to find the interesting tables/columns in new (e.g., test) documents.

Notably, the relevancy determination does not rely on predefined terms specified by a user, but rather learns relevancy based on the content of a training set, which includes user-selected tables/columns from the test dataset. While a term-based relevancy determination (e.g., term-frequency/inverse document frequency (tf-idf), or any known term-based relevancy determination technique) may be employed in certain approaches, it is not a necessary component of the presently described inventive table detection techniques.

In preferred approaches, the output of the detection process is a list, or more preferably a graphical representation and corresponding list, of tables detected within the respective dataset. For training, preferably the output of the detection process includes all detected tables, from among which the user may designate a relevant subset. For test datasets, the output of the detection process preferably includes at least all detected tables that are relevant to the user's intended downstream application/processing. Optionally, the detection output for test datasets may display/include one or more additional tables not determined to be relevant by the trained detection model, but that are nonetheless available for user review (and potentially including manual designation with respect to relevancy in order to further improve the detection model).

Whether provided as a list, a graphical representation, a combination thereof, or some other equivalent mechanism that would be understood by a skilled artisan reading the present descriptions (e.g., storing the detection results in an appropriate data structure such as an array, hash, etc. and/or storing the detection results to memory for subsequent retrieval/review), the output of detection facilitates user review and/or designation of relevant tables from among the set of tables detected using the trained detection model.

In some embodiments, users may select relevant detected tables using a custom user-interface listing and/or displaying (i.e., as graphical representations) all tables detected from the training dataset and facilitating simple point-and-click selection of relevant tables, and/or relevant columns within tables. In more embodiments, additional information may be provided via the custom UI, preferably in some summary form. For instance, in one embodiment the custom UI may display the title of the table and page number where the table was detected within the dataset. In another embodiment, the summary display may rank detected tables by relevancy.

For instance, in one approach a user may navigate to the detected tables without flipping through pages, e.g., for a 1000-page document, containing 300 tables, of which only 5 tables are relevant. By viewing the summary display, the user may easily navigate to those 5 tables that are relevant, and may also annotate the 'uninteresting' ones e.g., with a probability/likelihood that they are relevant. The user may ultimately review any number of tables/examples regardless of relevancy, e.g., choosing to review the top-10 non-relevant tables according to the determined likelihood of relevancy.

Figure 15A:
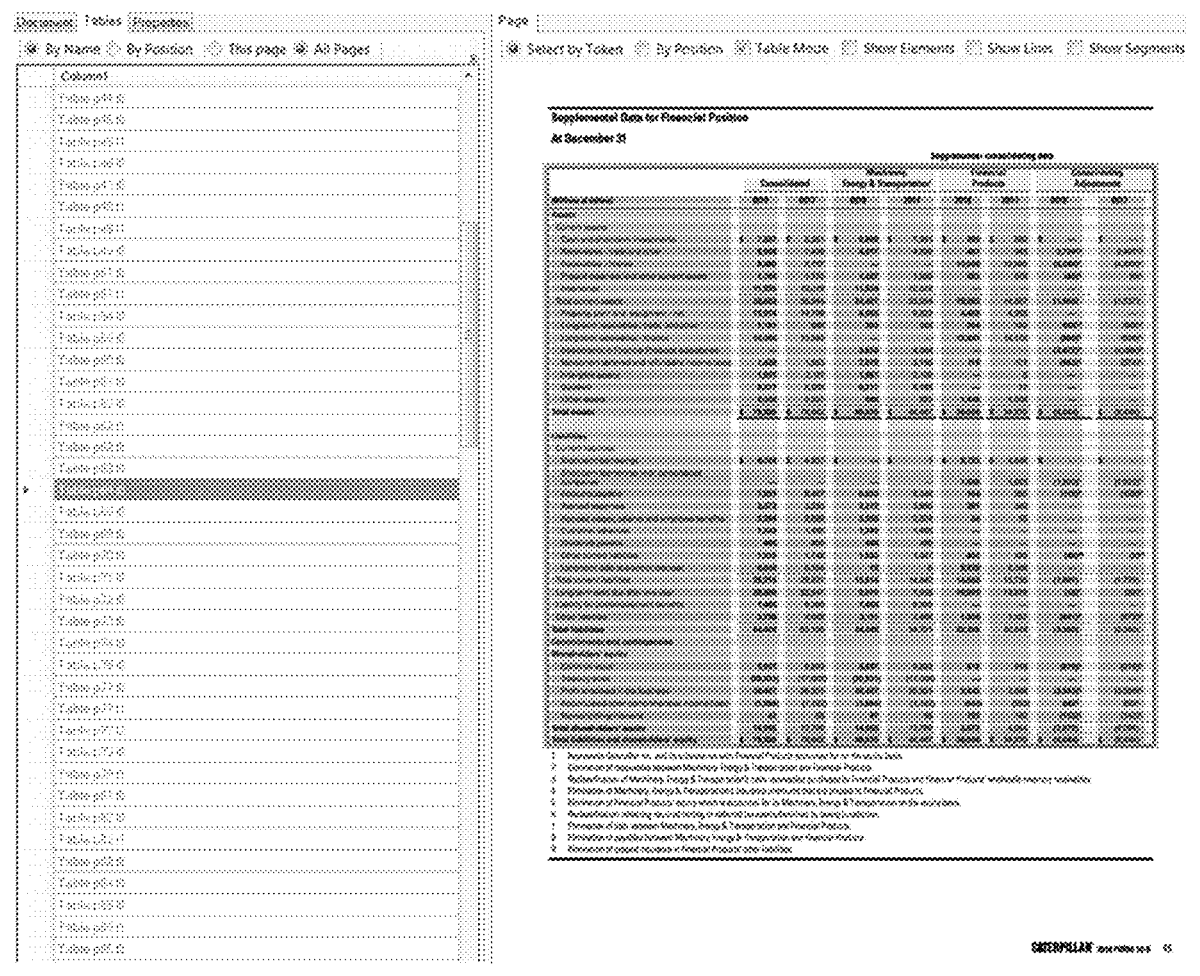
Figure 15B:
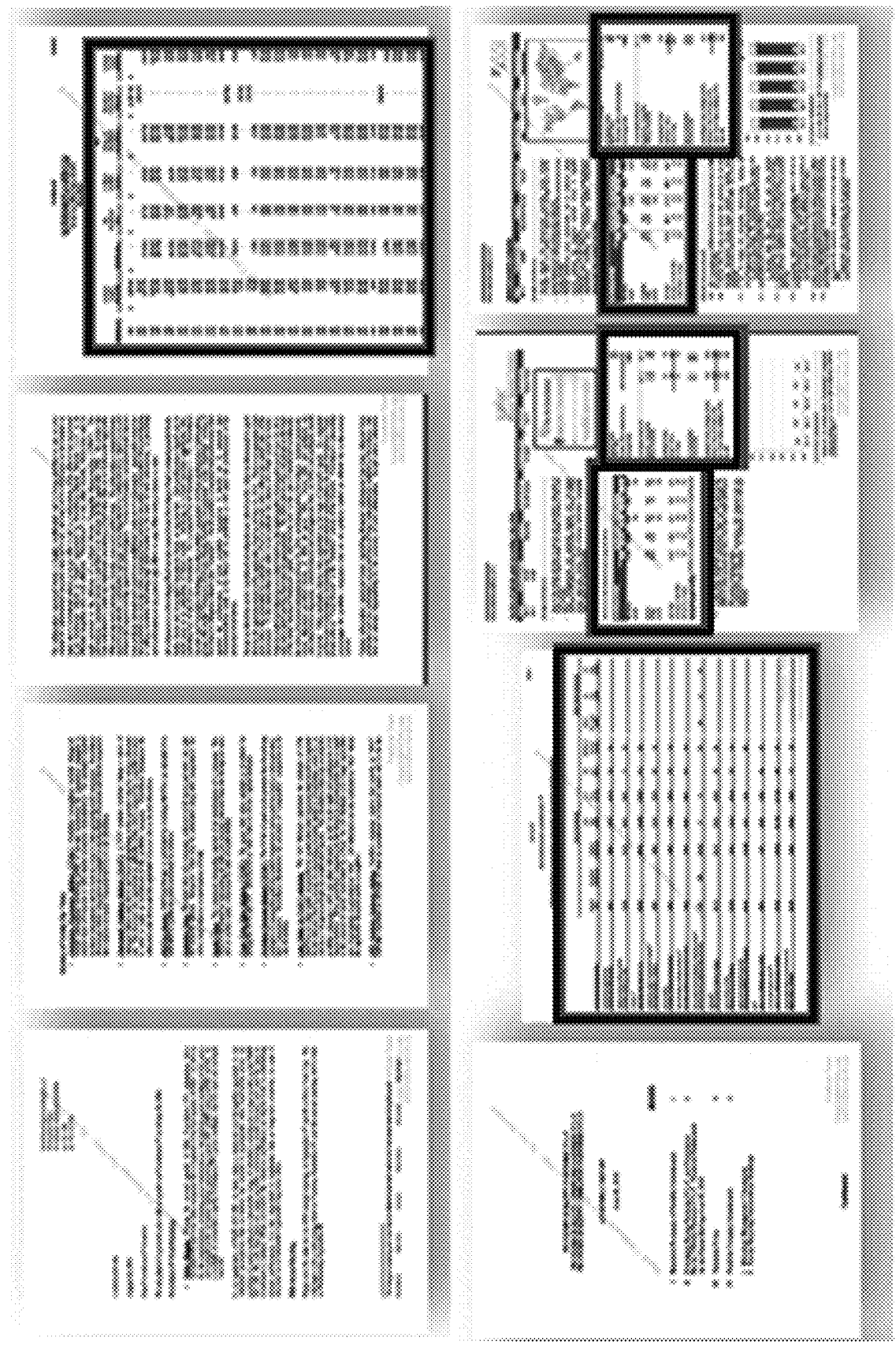
FIG. 15B shows graphical representations of several pages of a dataset and corresponding tables identified therein, according to one embodiment.

An exemplary embodiment of such a custom UI including a listing of detected tables and corresponding graphical representations is shown in FIG. 15A, with tables listed by page and table number (i.e., where multiple tables are found within a given page, the tables are associated with an identifier, here a sequential number), while FIG. 15B shows graphical representations of several pages of a dataset and corresponding tables identified therein (as indicated by broad black bounding boxes). Note the detection model advantageously identifies true tables, while not designating similar elements such as graphs, charts, etc. in the various pages of the test dataset. In addition, in some approaches a user may utilize the output shown in FIG. 15B to identify and/or designate additional tables, remove erroneously designated tables, etc. from the set output by the detection process.

According to more embodiments, the output of the table detection process may include a listing and/or graphical representation of columns within one or more of the detected tables. In a manner similar to that described above, this additional output facilitates designation of individual regions of a table as being relevant, where the regions are preferably columns, but also including any other portion of a table in various approaches. In this manner, the detection model may be trained not only to detect relevant tables, but also to detect relevant portions of individual tables, e.g., as shown below according to one exemplary embodiment in FIG. 15C, where the column 1522 ("Fourth Quarter 2018") is designated as a relevant portion/portion of interest, as indicated by the pop-up window 1524 displaying details regarding the location, content, and label of column 1522.

Figures 15C, 15D:
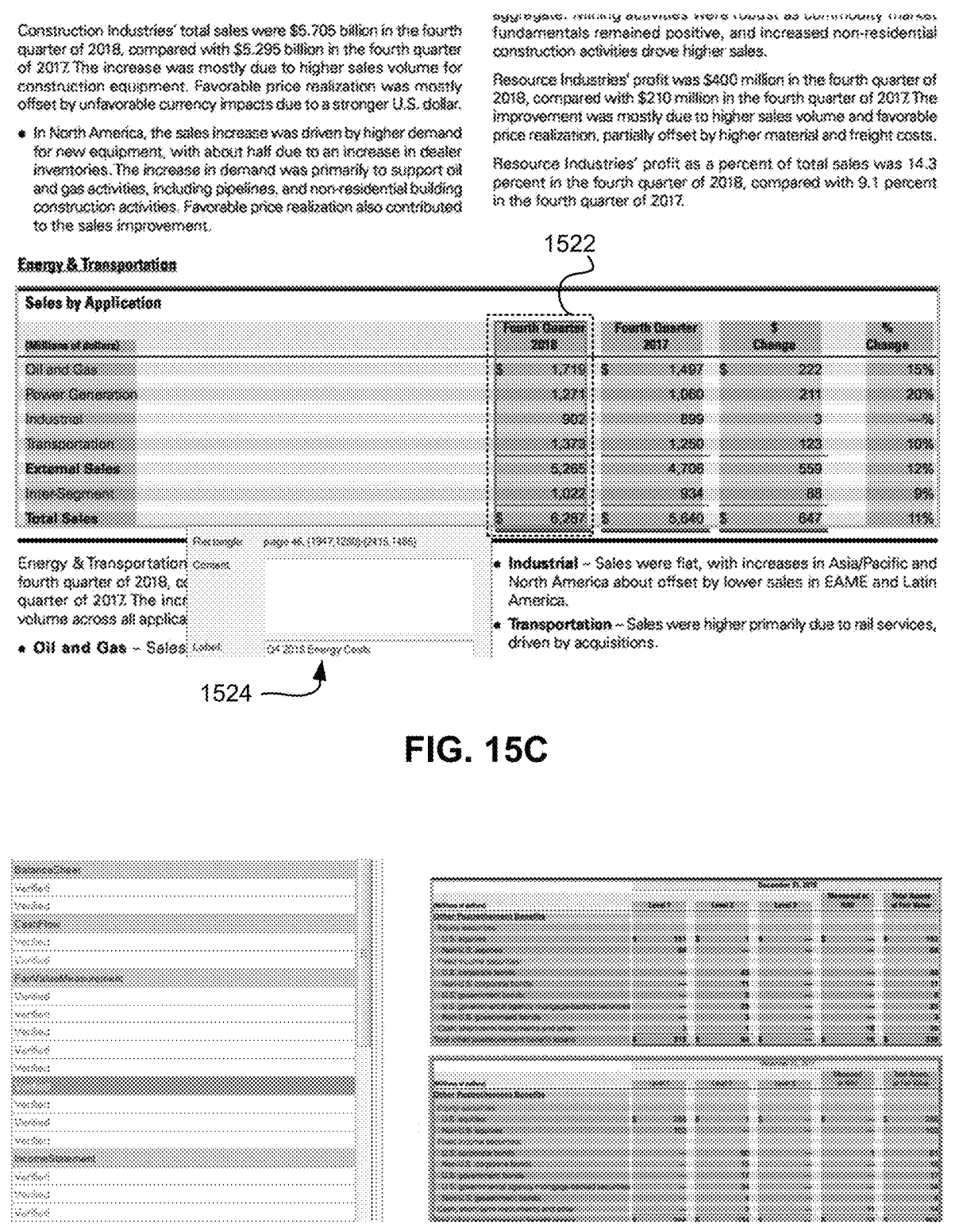

Further, FIG. 15C depicts an exemplary embodiment of details regarding the detected table and/or portions thereof that may be displayed in a window, e.g., including information such as the page where the table was detected, location on the page (e.g., coordinates) and/or identifier (e.g., a label) of the table or portions thereof that the user may designate as being "of interest" or "relevant" (interchangeably). It shall be understood that, as utilized herein, the term "relevance" or "interest" (and derivatives thereof) may refer to a binary classification, i.e., relevant vs. not relevant, of interest vs. not of interest, etc. However, "relevance" may also refer to a multi-state classification, e.g., according to degree of relevance/interest, without departing from the scope of the presently described inventive embodiments.

While the foregoing embodiment refers to supervised learning, unsupervised learning (e.g., via clustering of tables/columns) may also be employed without departing from the scope of the presently disclosed inventive concepts.

In practice, clustering is often less accurate than classification, but in principle (and also in practice), it remains feasible to cluster tables and present clusters to users in groups. For instance, in one approach an exemplary "table of tables" could have another level of structure that would indicate groups. In fact, the presently described user interface may provide this additional layer of structure, e.g., after classification.

In accordance with the FIG. 15D, the term "Verified" shall be understood as indicating there is only one possible value for a label that describes the table in question (e.g., as identified by page number, table number, etc. according to various embodiments).

When using supervised learning for classification (as above), the class name is a ground truth (e.g., "Cash Flow") since it was assigned by a user during labeling for training. For unsupervised learning, e.g., based in whole or in part on clustering, assigning a name to each cluster is less straightforward, but serves the same purpose as supervised classification (i.e., labeling/identifying groups of tables).

In further embodiments, a "bootstrapped" learning approach may be employed, e.g., where the learning is interactive. For example, in one embodiment, a first clustering operation/iteration may be performed automatically, with no user input. This aids the user in browsing/navigating tables in a large document, and provides opportunities/ prompts to label the table(s) of interest (i.e., without further characterization). As the user has assigned one or more labels, the system automatically trains, incorporates this information, and updates the dataset to display other tables similar to those previously designated as "of interest."

Similarly, bootstrapped unsupervised learning may additionally or alternatively employ negative examples/exemplars/labels.

Whether being based on positive and/or negative examples, the learning process may be repeated iteratively until achieving convergence with respect to the tables in the data set (e.g., all remaining tables exhibit at least a minimum degree of similarity with respect to structure, content, etc.), and/or until a user manually terminates the process (e.g., via indicating satisfaction with tables remaining in the dataset).

Regardless of the type of learning employed, and again referring to labels, the UI preferably includes a window facilitating the user's input of a description of the identified portions, of various tables in the dataset, e.g., describing the content depicted therein, and/or any other contextually appropriate information (such as units, formatting, structure, etc. of the portion and/or data depicted therein). In some embodiments, table detection may extract the header of detected tables, and/or headers of columns/rows therein, to be displayed in the window.

Normalization

As will be appreciated by skilled artisans upon reading the present disclosure, in some approaches the data depicted within a table may include structural/formatting artifacts that frustrate the detection process. For example, as shown in FIG. 15C, column 1522 includes a unit identifier ($) that is left-justified, and corresponding values that are right-justified, within each cell.

This layout is good for human eyes, but presents serious challenges for automated systems/techniques to align recognized text elements (e.g., using OCR), i.e., where the $ and the number are different elements. In order to address such recognition errors, the symbol (here, "$") and corresponding value are joined as a single string to facilitate alignment. This is one example of common recognition errors/artifacts the presently disclosed table detection techniques are configured to overcome.

With continuing reference to FIG. 15C, the symbol "$" does not appear on every line of the table/column, but it is understood all values in the column are expressed in the same unit, and so all values in the selected portion may be associated with the corresponding symbol. This association of symbols/units/etc. with values in a table, despite such values not expressly including/being expressed in accordance with the symbols/units, is one form of normalization that may be performed to improve the recall of table detection.

In further embodiments, normalization may be applied to other information. E.g., in some accounting practices parentheses "(735)" means negative "−735" which may require conversion/normalization, e.g., to add numbers to form a total.

Of course, in various approaches, normalization may take any suitable form and be configured to address any recognized source(s) of potential error throughout the detection process, especially recognition errors, such as OCR errors. Accordingly, in various embodiments detection may include and/or be accompanied by a normalization process, wherein errors/ambiguities such as OCR errors, formatting conventions, etc. may be corrected/accounted for, e.g., as described in U.S. Pat. No. 8,345,981, to Schmidtler, et al., issued Jan. 1, 2013, and entitled "SYSTEMS, METHODS, AND COMPUTER PROGRAM PRODUCTS FOR DETERMINING DOCUMENT VALIDITY," herein incorporated by reference.

Accordingly, the presently disclosed inventive table detection techniques advantageously facilitate detection of tables, and/or portions thereof, that may include similar information, despite having different size, layout, formatting, structure, organization, terminology, etc. with respect to the arrangement of the table (e.g., rows, columns, headers, identifiers, etc.) and/or content (e.g., different units, text format, patterns, terms, etc.). This allows the user to browse tables/portions at configuration time and select which are relevant from among a training set, train a machine learning model, and use the trained machine learning model to detect and identify relevant tables/portions within a much larger test dataset. It should also be noted that, according to preferred embodiments, negative examples (tables/portions not of interest) need not be labeled; it is understood that all unlabeled data points are considered irrelevant and/or uninteresting to the user.

Of course, in various embodiments determining relevancy and/or normalizing data values are optional, but advantageous, ways to bootstrap quality of results and usefulness for a particular application. However, skilled artisans reading the present disclosure will understand that table detection may be performed without any such relevancy and/or normalization processes, and may take the form of displaying all detected tables for user inspection/review.

Figure 26:
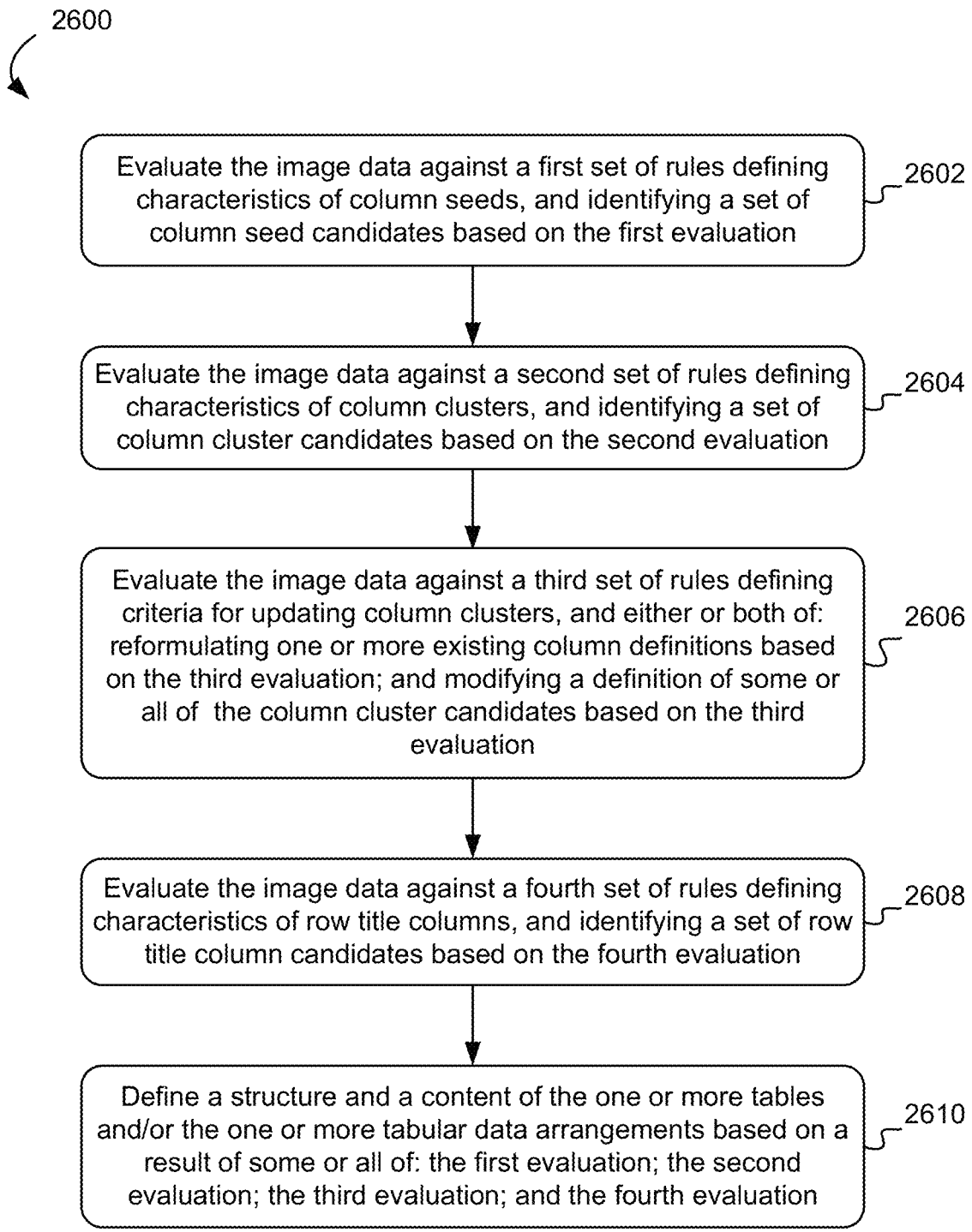
FIG. 26 is a simplified flowchart of a computer-implemented method for detecting one or more non-grid-like tables and/or one or more non-grid-like tabular data arrangements depicted in image data, according to one embodiment.

Referring now to FIG. 26, a simplified flowchart of a computer-implemented method 2600 for detecting one or more non-grid-like tables and/or one or more non-grid-like tabular data arrangements depicted in image data is shown, according to one embodiment. The method 2600 may be performed in accordance with the present invention in any of the environments depicted in FIGS. 1-22, among others, in various embodiments. Of course, more or less operations than those specifically described in FIG. 26 may be included in method 2600, as would be understood by one of skill in the art upon reading the present descriptions.

Each of the steps of the method 2600 may be performed by any suitable component of the operating environment. For example, in various embodiments, the method 2600 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 2600. Illustrative processors include, but are not limited to, a central processing unit (CPU), an application specific integrated circuit (ASIC), a field programmable gate array (FPGA), etc., combinations thereof, or any other suitable computing device known in the art.

Moreover, it shall be understood that non-grid-based detection as performed in accordance with method 2600 may include/involve any selection, combination, or permutation of operations, features, evaluations, considerations, etc. described herein with respect to "Non-Grid Detection" without departing from the scope of the inventive concepts presented herein.

Referring again to FIG. 26, method 2600 includes operation 2602, in which the image data are evaluated against a first set of rules defining characteristics of column seeds. Based on the result of this evaluation, a set of column seed candidates are identified. The characteristics of column seeds may include any combination of characteristics as described herein regarding non-grid detection.

In operation 2604, method 2600 involves evaluating the image data (and/or the column seed candidates) against a second set of rules that define characteristics of column clusters. Based on this second evaluation, a set of column cluster candidates are identified. As for operation 2602, the characteristics of column clusters may include any combination of characteristics described herein regarding non-grid detection.

With continuing reference to FIG. 26, method 2600 includes evaluating the image data (and potentially also the set(s) of column seeds and/or column clusters) against a third set of rules defining criteria for updating column clusters in operation 2606. Based on this third evaluation, the definition of existing column(s) may be reformulated, and/or the definition of one or more column cluster candidates may be modified.

In operation 2608, method 2600 involves evaluating the image data (and, again, optionally the updated/modified column clusters and/or column cluster candidates) against a fourth set of rules defining characteristics of row title columns. Based on this fourth evaluation, a set of row title candidates are identified.

Referring still to FIG. 26, in operation 2610, the structure and content of table(s) depicted in the image data are defined based on the result of the foregoing evaluations in operations 2602, 2604, 2606, and 2608.

Table Extraction

Once tables have been detected within a dataset, either using a trained detection model as described above, or some other technique, the presently disclosed inventive concepts include extracting information, preferably information of interest, from the detected, relevant tables. More preferably, table extraction includes identification of one or more descriptors of tables/tabular data, such as table title(s), table header(s), column descriptor(s) and/or row descriptor(s).

Moreover, in one approach, table extraction takes as input a list of tables and respective locations (e.g., pixel coordinates) as detected among a dataset, e.g., using a table detection process as described herein, although skilled artisans will appreciate the presently disclosed extraction principles may be equally applied to results of other detection processes, so long as tables and respective locations within source data (preferably image data) are available.

According to preferred embodiments, table extraction includes extraction from "grids" and extraction from "non-grids" (again, as defined hereinabove with respect to table detection). Notably, the extraction process is preferably applied to all regions of each page in the dataset that are/were designated by the detection algorithm as comprising a table. In other words, preferably table extraction is performed on all regions within table boundaries, according to the inventive concepts presented herein.

Extraction from Grids

Extraction from grids proceeds and/or utilizes operations substantially as described hereinabove regarding Table Creation (under Grid Detection). With the table fully defined by the corresponding grid, information may be extracted from each cell (whether virtual or physical) using known techniques. In various approaches, however, grid-based extraction may employ or include processes, techniques, operations, etc. as described hereinbelow regarding non-grid extraction, particularly with regard to outputting the result of extraction techniques.

Extraction from Non-Grids

Extraction from non-grid tables, on the other hand, is a more involved process, and takes as input location information regarding the detected non-grid, e.g., page/image number and containing rectangle coordinates, and computes the internal structure of the table, i.e., in a preferred embodiment computes at least rows, columns, row descriptors, and column descriptors. The result is a set of fields, where each field corresponds to a cell of the table and is defined by a rectangle (i.e., a spatial definition), a textual value (even if such value is "null"), and/or a label (preferably as metadata), preferably all three. The label for cells in the header region preferably includes either a column header or column descriptor, while labels for cells in the data region preferably include the value of the corresponding column header, and/or a fully qualified description, e.g., as provided by the column header and corresponding column descriptor(s), if any.

With reference to extraction from non-grids, all units discussed regarding the y-direction are expressed in terms of "text-line indices" (TLXs). This is a suitable form of expression for vertical location, because within a given non-grid like table/tabular data arrangement, a given row will always fully contain one or more text lines (i.e., a row boundary never occurs within a text line), while the units in the x-direction are actual values of x (pixels).

In practice, regions in a table are defined vertically by one or more TLXs, so TLXs serve as useful delimiters or indicators of boundaries between the regions of the table. For instance, within a table including a header region and a data region (as is typical), a top TLX of the header region, a bottom TLX of the header region, a top TLX of the data region, and a bottom TLX of the data region are all pertinent for extraction. Extraction from non-grids preferably occurs within the context of a subpage, as described hereinabove, and the TLXs and text lines to which they refer shall be understood to similarly be restricted to the context of the subpage in question.

Moreover, since a table may occupy only part of a subpage, as referred to hereinbelow, a "text line" refers to the elements that reside on a single line of text as well as the corresponding minimal bounding rectangle. By contrast, a "row" refers to a rectangle spanning the width of a table/tabular data arrangement. As will be appreciated by skilled artisans upon reading the present description in light of the corresponding Figures, the horizontal extent of a "row" may include a "text line" in its entirety, or may include only a portion of a text line.

Figure 16:
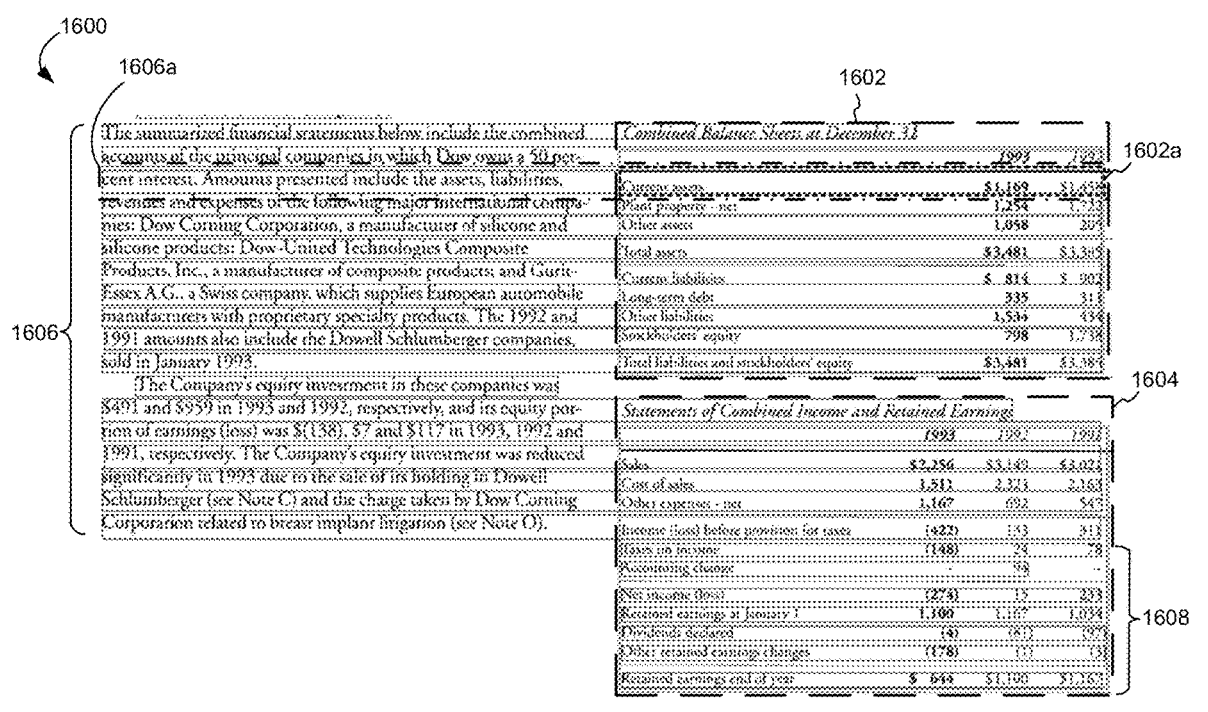

For example, consider exemplary tables 1602 and 1604 of FIG. 16, which should be considered to depict a single subpage (e.g., as would be the case if other, not depicted, text and/or tables, figures, etc. existed below the depicted area and spanned the entire width of the depicted area). Specifically, all rows in table 1602 include within their horizontal extent only portions of text lines, as is similarly the case for the upper portion of table 1604. As shown in FIG. 16, all rows of tables 1602 and some of the rows of table 1604 exclude the text on the left, even though the text lines on the left are substantially vertically aligned with the rows in table 1602, and with at least some of the rows of table 1604. For example, text line 1606a corresponds to (and indeed, encompasses) row 1602a of table 1600. However, while text line 1606a is defined so as to initiate (horizontally, or along the x-axis) with the text "cent interest" and terminate with "$1,458", corresponding row 1602a is defined so as to initiate with the text "Current assets" and terminate with "$1,458" according to the embodiment depicted in FIG. 16. Notably, table 1604 also includes a plurality of rows in region 1608 that include within their horizontal extent text lines in their entirety.

The steps in accordance with an exemplary embodiment of an inventive non-grid extraction workflow generally include: (1) initialization; (2) determining headers and/or data boundaries; (3) locating the upper boundary of the data section of the table (also known as the "Data Top TLX"); (4) finding actual vertical lines in the header region and/or excluding text lines from the data region; (5) finding implied vertical lines in the header region, and/or excluding text lines from the data region; (6) finding columns in the data region; (7) building headers upward; (8) adjusting the header if defined by boxes; (9) adding rows; (10) determining row clusters; (11) determining whether row(s) are data or row descriptors; and (12) computing final columns, as described in greater detail below. Those having ordinary skill in the art reading the present disclosure will understand the foregoing sub-operations of non-grid extraction may be performed in any suitable order, and further that non-grid extraction may include more or less operations than those listed above, without departing from the scope of the inventive concepts presented herein.

Initialization

In preferred approaches, non-grid extraction includes initialization, in which the boundary of a table is determined/identified based on the Header Top TLX and the Data Bottom TLX (indicating upper and lower bounds for the table as a whole). Preferably, the boundaries are found based on inspecting text lines falling within the table boundaries.

In addition, properties for text lines, including the presence/absence of an ellipsis and/or whether elements on the line are of known type (e.g., currency, date, etc.) are computed as part of initialization, preferably based on text recognition (e.g., OCR) results, and optionally but preferably based on error fixing and analysis (e.g., using regular expression(s)). Moreover, in some approaches initialization includes computing the average height of all text lines within the table (which may serve as a distance measure) in contrast to the average text height on the page as a whole, which is less relevant for the purposes of information extraction from the table in question.

Determine Header/Data Boundary

Additionally, table extraction preferably includes identifying one or more boundaries between column headers in a table and the respective data section.

In more embodiments, extraction from non-grids involves finding the Header and/or Data Boundary, which is preferably based on the Header Bottom TLX and taken to be the lowest TLX among the bottom of all header columns created during table detection. This Header Bottom TLX may be adjusted upwards if it exhibits the characteristics of a row descriptor, (e.g., including same/similar data pattern and/or values, and/or may be defined by a delineating line above the row descriptor). For example, in FIG. 17 "Construction Industries" is a row descriptor that can be confused with the first line of the header.

Preferably, the presently disclosed inventive concepts allow for multiple such upward adjustments where the text line in question appears to be a row descriptor.

Figure 17:
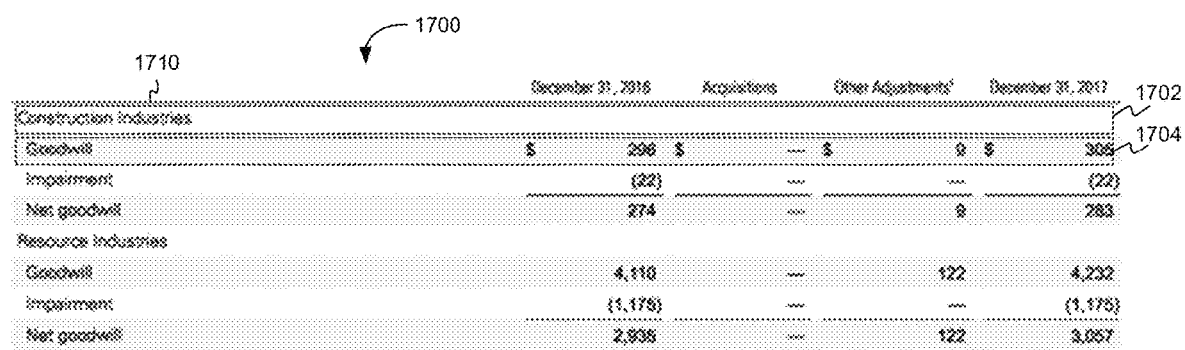
FIG. 17 shows a simplified table including multiple text line indices (TLXs) according to one exemplary embodiment.

More preferably, TLXs may be determined to be row descriptors where there is a delineating line above the TLX, such as delineating line 1710, and only a single element exists on the TLX, as is the case for TLX 1702 (including the header "Construction Industries") as shown in table 1700 of FIG. 17.

Find the Top of the Data Section (Data Top TLX)

Further still, extraction from non-grids involves determining whether the data top TLX is immediately below the header bottom, as is indicative of being the "first row" or "top" of the data section. However, if row descriptor(s) exist immediately below the header (as in FIG. 17) then the TLX immediately below the row descriptor(s), e.g., TLX 1704, is designated as the "Data Top TLX." For instance, with continuing reference to FIG. 17, and using zero-based indices, the table headers/boundaries may be characterized as shown below in Table 3.

TABLE 3

Characterization of Table Headers and/or Boundaries

| Class/Type | Value (if any) |
|---|---|
| Table Top TLX = 0 | [Dec. 31, 2016 . . . ] |
| Header Bottom TLX = 0 | [Dec. 31, 2016 . . . ] |
| (row descriptor) = 1 | [Construction Industries . . . ] |
| Data Top TLX = 2 | [Goodwill . . . ] |

Finding Actual Vertical Lines in the Header Region and/or Excluding Text Lines from the Data Region Table extraction further includes identifying vertical lines that start in or near the column header region of the table.

Notably, in the context of the present disclosure columns preferably do not extend horizontally across the boundaries defined by vertical lines in or near the column header region. Moreover, text lines crossing/intersecting such identified boundaries are excluded from the detected table.

Having defined the bottom of the header region, it is advantageous in various approaches to find vertical lines that intersect the header region. When present, these vertical lines are useful indicators of column boundaries. More precisely, they indicate that columns cannot cross these boundaries (i.e., there may be multiple columns between adjacent vertical lines).

In particularly preferred approaches, vertical lines in the header region meet the explicit requirement that at least part of the line is positioned in the header, which advantageously prevents extraneous vertical lines (e.g., scanning artifacts) from enforcing column boundaries. Additionally, or alternatively, the lines preferably meet a minimum length requirement (for the same reason). In preferred approaches, the minimum length required is a length at least about 1.5 times as long as an average height of text characters depicted on the page/image in question.

After finding such vertical lines (defined by a set of x-values, one for each vertical line), one embodiment of non-grid extraction includes inspecting all text lines within the data section of the table (optionally, but preferably, including the Data Top TLX and line(s) below the Data Top TLX) in order to exclude from further consideration any text line that intersects, more preferably significantly intersects, the x-value of one or more of these vertical lines. In this operation, the vertical lines need not extend the entire height of the table and may reside only in the header region of the table.

In accordance with some embodiments, tables may include a large volume of text inside the table boundary that is properly considered not "part of" the table, e.g., annotations, notes, and/or any other forms of extraneous information. Removing such extraneous information substantially and advantageously reduces "noise" text and excludes such text from consideration when trying to extract the tabular data. For example, between rows there might be text of the sort that reads "please note that with regard to the following charges we will reimburse only a portion thereof due to . . . ."

Preferably, in order to be excluded, the text line in question must "significantly" intersect a known column boundary (due to the presence of a vertical line), in order to prevent small overlaps of valid data cells from being construed as not part of the table.

Specifically, according to a particularly preferred embodiment, on the left side of an element, "significant" intersections are considered to occur when more than 20% of the element height intersects and protrudes to the left of the x-value of a vertical line (corresponding visually to being substantially left-aligned with respect to the vertical line). With continuing reference to the particularly preferred embodiment, more flexibility may be tolerated to the right of an element, e.g., allowing a tolerance within the meaning of "significant" intersections of up to about twice (2×) the element height to overlap the x-value of a vertical line before being excluded.

Moreover, when computing columns (e.g., as described elsewhere herein) it is advantageous to enforce a criterion that columns cannot cross these boundaries as there can be one or many columns between adjacent vertical lines in various embodiments. Again, the vertical lines need not extend the entire height of the table in accordance with all embodiments of the inventive concepts presented herein. For instance, such vertical lines are commonly present only in the header region.

Finding Implied Vertical Lines in the Header Region, and/or Excluding Text Lines from the Data Region Table extraction, according to several exemplary embodiments, also includes identifying any "implied" vertical lines based at least in part on aligned endpoints of horizontal lines within the table. In this sense, the term "aligned" indicates that horizontal distance between the left endpoints of horizontal lines is less than one standard unit of tolerance, and similarly with respect to the right endpoints of horizontal lines. Preferably, at least one such horizontal line is present in the header of the table, and text lines significantly intersecting the implied vertical lines are excluded from the detected table.

Finding implied vertical lines may be performed in a manner very similar to finding actual vertical lines as described hereinabove, with the exception that the implied vertical lines are not present on the image. Instead, preferably such lines are implied by the alignment of the endpoints of horizontal delineating (sub) lines. Preferred embodiments of delineating sublines are described further herein, with respect to line delineation.

In preferred approaches, care is taken when aligning the endpoints of delineating (sub) lines, ensuring that at least one of the delineating lines is present in the header section. This criterion is important because such lines are often drawn with the intended purpose of defining the column boundaries—specifically, the horizontal extent of these lines explicitly defines the width of the column (e.g., as if the horizontal line comprised the top or bottom side of a rectangle).

Figure 18:
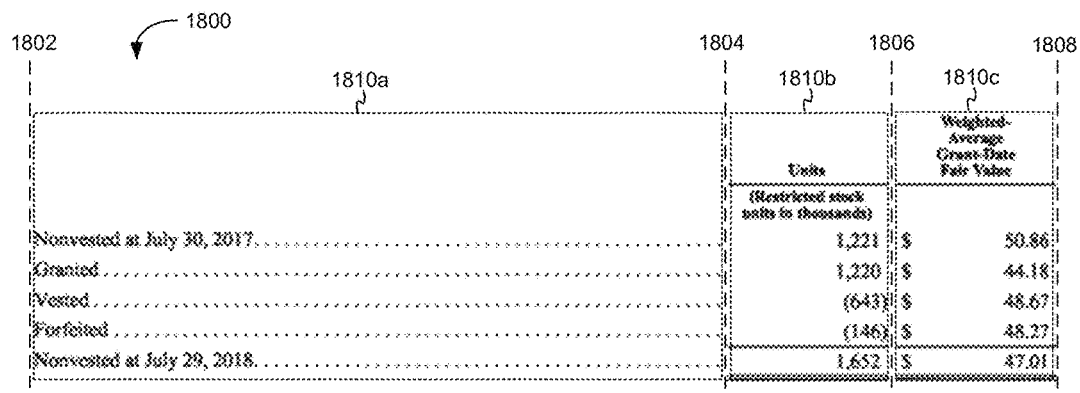
FIG. 18 illustrates an exemplary embodiment of a table including implied vertical lines.

For example, in accordance with the exemplary embodiment shown in FIG. 18, table 1800 includes 343 implied vertical lines 1804, 1806, and 1808. Implied vertical line 1804 defines the right side of an imaginary rectangle 1810*a* encompassing the row labels and ellipses. The "Units" column has two implied vertical lines 1804, 1806 that correspond to the left and right sides of an imaginary rectangle 1810*b*. Similarly, there are two implied vertical lines 1806, 1808 corresponding to the "Weighted Average . . . " column and imaginary rectangle 1810*c*.

Again, it is preferable to exclude rows and/or text lines in the data section (i.e., rows and/or text lines including and/or below the Data Top TLX), but such exclusion is not strictly necessary according to any embodiment of the presently described inventive concepts. Instead, according to the above example, implied vertical lines are used to exclude from consideration text lines that significantly intersect at least one x-value of an implied vertical line, and optionally where such intersection is more significant than would be for an otherwise corresponding actual vertical line.

In various embodiments of finding implied vertical lines, an overlap tolerance within the meaning of "significant intersections" includes about twice (2×) the element height (with respect to the x-value of the implied vertical line) being permitted on either or both sides of an element.

Finding Columns in the Data Region

With undesirable elements (such as columns/text lines intersecting one or more table boundaries) removed from the set of detected tables, table extraction proceeds by identifying all columns within given data region(s) (i.e., the region defined by TLXs below and including Data Top TLX). Preferably, the columns are detected/identified based on alignment of text. For instance, in various approaches columns may be identified/defined between any two identified vertical lines in a table, whether actual or implied.

As mentioned above, one particularly useful criterion for finding data region columns is that no such column crosses a boundary defined by an actual or implied vertical line originating in the header region. To evaluate this criterion, columns are preferably computed within adjacent data column boundaries. In one embodiment, the left and right sides of the table always create a boundary (so, e.g., if there are no actual or implied vertical lines, all columns within the table left-right boundary are identified).

Figure 19:
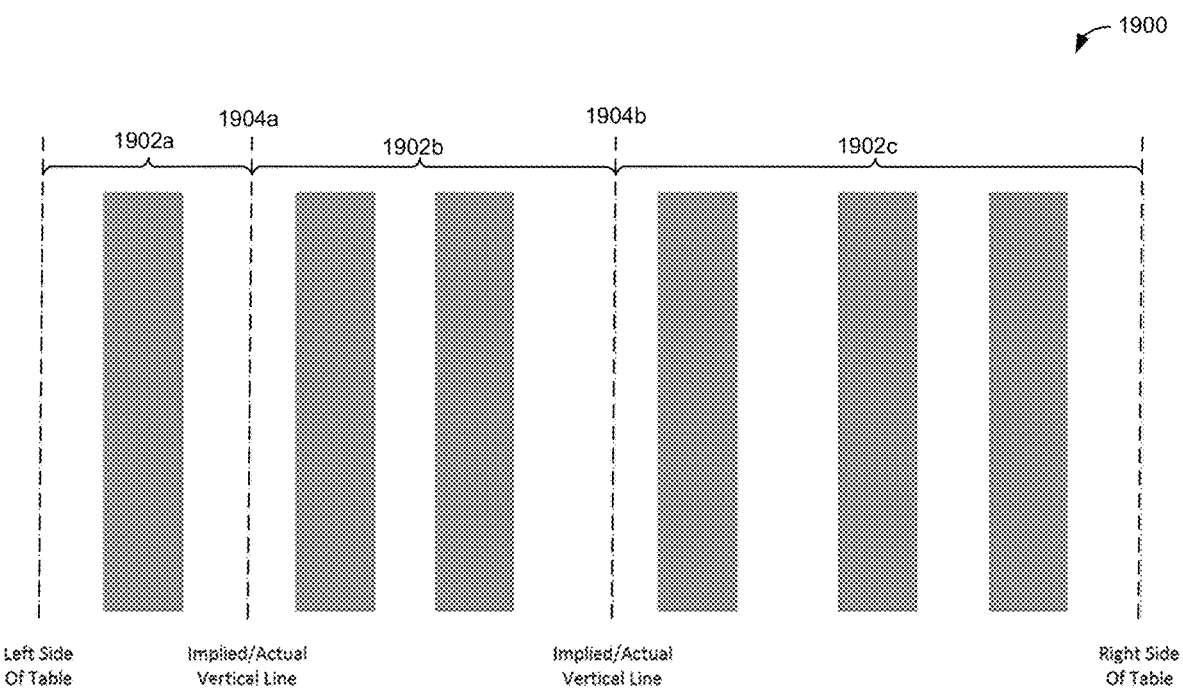
FIG. 19 is a simplified schematic of a document including implied and/or actual vertical lines, according to one embodiment.

For example, and with reference to FIG. 19, table 1900 includes three regions 1902a, 1902b, and 1902c respectively defined by two vertical lines 1904a and 1904b. Within each of these regions a search is performed on columns separately. Hence, it shall be understood that in the context of the presently described inventive embodiments, columns cannot cross the boundaries of a given region of a table, but there can be multiple columns within each region, such as for regions 1902b and 1902c shown in FIG. 19.

Within any given left-right region under consideration, columns are preferably identified substantially as follows: (1) gather all elements within the target region (allowing a small, predefined overlap tolerance); (2) exclude any elements that were identified for exclusion previously; (3) exclude any elements that are deemed invalid, which according to preferred embodiments include elements that overlap one another, and/or elements that overlap another element so as to have a combined width greater than a product of the number of overlapping elements times the average character/element width; (4) define columns by finding sets of elements that are "connected" vertically, because they overlap horizontally (preferably using, or based at least in part on, a "connected components" approach as described hereinabove, with reference to Finding Column Seeds from Stacks.

Defining columns in the foregoing manner is appropriate, because all "noise" text has been removed from consideration, such that the only remaining values are from and correspond to actual data cells, which in turn are well aligned.

As with joining columns, preferably the "overlap" property is transitive, e.g., according to FIG. 11, all three elements 1102, 1104, and 1106 are "connected" via partial horizontal overlap, and are therefore considered part of the same column. It should be noted that FIG. 11 depicts "horizontally connected" elements within an image. "Vertically connected" elements exhibit a similar arrangement, except transposed relative to the arrangement shown in FIG. 11, such that the "vertically connected components" share at least one common (x) coordinate value, and accordingly may be considered part of the same column.

In particularly preferred approaches, an additional "noise removal" step may be performed wherein each of the extracted columns is inspected separately to determine whether ancillary text within the column has caused the extracted column to in fact include more than one actual column. In particular, all elements within the column that are of a predefined type commonly present in tables (e.g., currency amounts, percentages, etc.) may be collected, and the column finding process described hereinabove may be repeated with respect to those elements only, thereby producing a temporary result that is useful for analysis. If this temporary result is comprised on more than one column, it is advantageous to identify text lines within the table that contain one or more elements that intersect one or more boundaries of the columns in the temporary result, conclude that such text lines contain ancillary information that is not properly part of the table, and to exclude such text lines for further consideration during table extraction. If any additional such text lines were identified and excluded after performing this additional noise removal step, then the entire column finding process should be repeated.

Build Headers Upward

With continuing reference to table extraction, according to one embodiment the process includes extracting a header region, and/or text from a header region, of the table. In particular, starting from the lowest text line in the header region and moving vertically upward, adding elements that also align with the columns that were found in the data region.

In the context of table extraction, "vertical alignment" shall be understood as referring to elements that map to one and only one column. As described herein, "vertical alignment" further requires an absence of large vertical gaps between the element and the previously found header for the column in question. "Vertically aligned" elements as described herein preferably do not map to multiple columns, and similarly multiple elements within the same text line preferably do not map to any single column of the table subject to extraction. However, each column need not have an element mapped to it; empty column headers are allowed (though not preferred).

Preferably, building headers upward initiates with/at the Header Bottom TLX, and considering text lines in succession moving upwards, attempts to attach all elements in the same/corresponding text line to a data column. If successful, the columns areisare extended (grown) vertically, and may optionally be extended horizontally. Whenever an element is "added" to a column, the rectangle of the column expands as necessary to include the rectangle of the element. So the column can grow in height and width, depending on the rectangle of the element being added. Thereafter, the process preferably proceeds to the next TLX (vertically, i.e., the TLX above the TLX in question) and repeats iteratively until encountering/exhibiting a failure to attach all elements in the TLX in question to the columns, or until a horizontal line that extends the full width of the table is encountered, i.e., corresponding to the top line present in many tables.

It is important to note that deciding whether a given text line in question is part of the header (i.e., whether all elements can be assigned to an existing column) or whether the building process has reached the top of the header (and thus ideally should stop) is a rather complex process. In summary, this decision hinges on criteria including, but not limited to: (1) each element maps to one and only one column; (2) no two or more elements map to the same column; (3) no element maps to multiple columns (though notably, it is not required that each column has an element mapped thereto); and (4) if an element otherwise maps to a particular column according to the previous criteria, by adding such element to the column header no "vertical gap" would be created in the header in the sense that the header does not contain any elements from the TLX below (i.e., it is not required that a header be assigned an element from every TLX moving upward, but if no element is assigned to a column for a particular TLX, then no additional element(s) can be assigned to the column header for TLXs above, and if any element in an above TLX otherwise maps to the column then the header is complete).

Referring again to column descriptors, a special logic applies to identifying these table elements. For instance, in one approach where no alignment exists, the algorithm seeks for any delineating lines located between the current top of the header and the bottom of the candidate TLX in question. If a delineating line (or lines) is found, coordinates in the image are redefined based on the delineating lines, rather than the detected columns.

On the other hand, where no such delineating line(s) are found, the headers are considered "complete" and building headers upwards terminates. Similarly, in embodiments where no initial alignment is found, building headers upwards terminates (and all headers are considered "found" and "complete," i.e., "fully qualified.")

For instance, with reference to table 2000 as shown in FIG. 20A, and in accordance with one embodiment, building headers upwards includes: (1) adding TLX 2002 ("Millions of Dollars)" to the header (since all elements can be assigned to a column); (2) adding TLX 2004 ("Fourth Quarter") to the header (again, because all elements can be assigned to a column) and (3) evaluating TLX 2006 ("Profit (Loss) by Segment") and determining TLX 2006 is not part of the header, because the single element in question otherwise maps to the first column but would create a gap in the header of the first column because no element from TLX 2004 was added to the header of the first column. Thus, in accordance with the presently described inventive approach, TLX 2006 is not included in the header, the header is considered complete.

According to preferred embodiments, special logic accommodates column descriptors, although these descriptors will generally fail the mapping because they overlap multiple columns (by design). For example, consider table 2010 as shown in FIG. 20B, with column descriptors 2012 ("Three Months Ended December 31") and 2014 ("Twelve Months Ended December 31.")

Preferably, TLX 2016 ("2018 . . . ") is the first TLX under consideration and is included in the header region, since all of its elements can be assigned to a single column (again note that not all columns must be assigned an element, as in the first column here, rather all elements must be assigned a column). However, TLX 2012*a* and 2014*a* (i.e., "December 31 . . . ") do not meet the inclusion criteria, because each of the two "December 31" elements maps to more than one column.

If delineating sublines 2020*a* and 2020*b* (which have the same y value, and thus are considered part of, and grouped together into, a single delineating line, e.g., as described hereinabove regarding line delineation) were not present in table 2010, in one embodiment the upward header building process would stop and conclude that the headers are complete. However, because of the presence of delineating sublines 2020*a* and 2020*b*, other embodiments may include performing additional processing to determine whether this is the beginning of a column descriptor, preferably using additional, more specialized criteria.

For instance, such "specialized" criteria may include redefining the width of the "column" to which header(s) may be attached to be/match the width of the delineating line(s)/ subline(s) that resides between the last (uppermost) header TLX and the TLX under consideration for being added/ attached.

Moreover, and again with respect to the example figure, the inclusion criteria may be redefined in a specialized way such that there are only two "trunks" to which the process may attach header elements (e.g., replacing the previous approach using four columns underneath the delineating lines, in which case the first column is preferably retained), and each such new "trunk" is assigned a width matching or corresponding to the width of the corresponding delineating subline.

With these new criteria established, the process again determines whether the TLX in question (e.g., TLX 2012*a*-2014*a*) fits the existing (redefined) "columns." If so, the TLX is added/joined to the header region, and the upward header building proceeds as described elsewhere herein.

In some approaches, a similar process involving applying more specialized inclusion criteria, and subsequent/resultant joining is performed for the next TLX above (e.g., TLX 2012-2014). According to the exemplary embodiment depicted in FIG. 20B, this "next TLXs above" 2012-2014 is also added to the header region. With continuing reference to the illustrative example, no further TLXs exist above the most recently added TLX 2012-2014, and so the header growing process is complete (also a horizontal line that spans the entire width of the table has been encountered, indicated the table top line).

Notably, according to preferred embodiments of the above process, columns need not be and preferably are not actually "redefined" per se. For instance, instead it is possible according to one particularly preferred approach to redefine the "tree structure" to which header elements may be attached. Further still, where this redefinition of the tree structure is successful, it follows that the elements attached are not in fact column headers, but rather, such elements are "column descriptors," again which serve to "fully qualify" the underlying column headers.

The foregoing exemplary "redefinition" process may occur/be invoked many times throughout header definition in accordance with various embodiments of the presently described inventive concepts, e.g., once for each of many levels present in column descriptors, depending on the complexity and structure of the table.

Adjust Header if Defined by Boxes

Some tables have the header region completely enclosed in boxes. For example, consider table 2100 as shown in FIG. 21.

Detecting such headers (as defined by boxes) preferably involves ensuring that all elements in each box are included as part of the header. This is helpful because often the boxes facilitate identifying the column (and header that applies to the column). Accordingly, in some approaches, attached header elements may be further evaluated to determine whether the header elements are (individually or collectively) enclosed in a box/boxes. If so, all elements in the box(es) are included as part of the header. Further, this technique often overcomes problems caused by text misalignment, whether due to scanning of the intentional printing of misaligned text. For example, in the image above, please note that "OC" and "ANSI Code" are misaligned in the sense that "OC" intersects both "ANSI" and "Code". Regardless, the appropriate text is included in each column header since it is defined by an enclosing box.

In another example of the benefit of this technique, in the image above the first TLX ("Care Adjust") would be included because it clearly overlaps (horizontally) the following data column ".00". However, considering the next TLX above, the column header "Paid" does not overlap with any data column (e.g., preferably as defined by the data elements and/or corresponding OCR rectangles), and accordingly would not be added to the header.

In this step, since the header is comprised of boxes, it is advantageous to assign all elements in each box to a header—regardless of whether each element overlaps with existing data columns, since the box overlaps with the data column, indicating the constituent value describes the underlying data column.

Add Rows

Identifying and adding data rows, in various approaches, preferably involves clustering non-excluded text lines, e.g., based on any present, usable horizontal lines, but if none are available then based on heuristics. Moreover, in embodiments where, e.g., based on previously the determined data region (including but not limited to Data Top TLX, and/or Data Bottom TLX), identified columns and associated headers, it is advantageous to continue building the table by adding rows.

Determine Row Clusters

In one approach, adding rows preferably includes determining "row clusters" within the data region of the table. As will be appreciated by skilled artisans upon reading the instant disclosure, determining row clusters effectively defines a mapping of text lines in the document to rows in a/the corresponding table. Notably, some rows consist of a single text line, while others comprise multiple text lines. In this sense, a "row cluster" is preferably considered a set of one or more TLXs that comprise a row splitting text lines.

In various embodiments, determining row clusters preferably includes/involves/utilizes row descriptors (which may be/include data rows, in some embodiments), and/or data rows per se, each as defined/described in greater detail hereinbelow.

A principal task, according to one exemplary approach to determining row clusters, includes forming a set of TLX pairs (e.g., start, stop), each of which defines a row. In this process, it is preferable to exclude from consideration any TLX that has been previously excluded (e.g., because it intersects a vertical line, or for any other reason described herein according to various embodiments and approaches)) such that clusters occur only between excluded text lines and never cross them.

In various approaches, determining row clusters may employ, singly or in combination, different methods depending on whether or not rows of the table being processed are indicated by horizontal graphical line(s).

Regardless of the specific method, in preferred approaches all horizontal lines in the data region, and which span the width of the table, are identified and optionally grouped, associated (with each other and/or a label, etc.), etc. according to various embodiments. Moreover, the width spanning criterion may be evaluated with a predetermined tolerance for variation (e.g., within one standard unit of tolerance), e.g., so that horizontal lines extending slightly beyond the data region and/or not quite extending the full width of the data region may still be included in the identified set of horizontal lines, in accordance with some aspects of the presently described row adding procedures.

The grouped/associated horizontal lines spanning the width of the data region are preferably evaluated to determine "usability" for purposes of defining/building rows of the table. For instance, in preferred approaches, a set of lines is "usable" in this context where data values exist between every adjacent set of horizontal lines, and/or where at least one element on one of the text lines in question is of a known data type (e.g., currency, percentage, etc.). For instance, in FIG. 22, the graphical lines corresponding to the top and bottom of each "bar" constitute usable horizontal lines, for purposes of forming/defining rows.

Advantageously, where one or more of the horizontal lines is/are usable for forming rows, rows are defined in accordance therewith, and preferably text line(s) located between adjacent horizontal lines are assigned to the same row cluster.

Otherwise, more complex heuristics may be employed, according to additional embodiments of identifying and/or adding rows, especially data rows. Preferably, a first set of heuristics is employed based on the normalized vertical distance between text lines within the table, the clustering result from the first set of heuristics is evaluated for validity, and if the result is deemed to be invalid then the first result is replaced by employing a second set of heuristics.

The first set of heuristics makes use of a normalized measure of distance between adjacent text lines, which is based on an adjusted value for the top and bottom of each text line. For a given text line, the adjusted top is computed such that the "stems" of characters that protrude above the primary mass of foreground pixels within the text line are omitted. For example, for the word "expected" the adjusted top would correspond to the top of characters ("e", "x", "p", "e", "c" and "e") i.e., the adjusted top would omit and be lower than the top of characters "d" and/or "t". The adjusted top value may be computed by finding the highest value of y within the element rectangle where the percentage of foreground pixels is greater than a predetermined percentage of the rectangle width (e.g., greater than 30% of pixels within the element rectangle at a particular value of y are foreground pixels). Using a similar methodology, the adjusted bottom is computed such that the "stems" of characters that protrude below the primary mass of foreground pixels are omitted. With continuing reference to the example "expected" the adjusted bottom would correspond to the bottom or characters ("e", "x", "e", "c", "t" and "e") i.e., the adjusted bottom would omit and be higher than the bottom of character "p".

Using the adjusted top and bottom to compute vertical distances between text lines serves to reduce dependence on the particular values of words present in the text line and leads to a more reliable and stable distance measure for the purpose of determining row clusters. Specifically, the normalized vertical distance between adjacent text lines is taken to be the adjusted top of the text line below minus the adjusted bottom of the text line above. The first set of heuristics uses this measure to formulate row clusters by: (1) computing the normalized distance between all sets of adjacent text lines within the table, (2) sorted these distances in ascending order, (3) analyzing the sorted list and identifying a grouping threshold as the smallest value in the list such that the next larger value in the list is 20% or more larger, (4) traversing the table starting at Data Top TLX and ending at the bottom of the table and grouping into the same row those TLXs where the distance to the previous TLX above is less than or equal to the grouping threshold.

In preferred embodiments, the resulting set of rows is inspected for validity. Specifically, since multi-line rows typically correspond to the situation where one or perhaps at most two cells in the row have content that will not fit onto a single text line, if any row in the first clustering result contains multiple text lines that each have elements in more than two columns, the clustering result from the first set of heuristics is deemed to be invalid and is discarded in favor of a second set of heuristics, as described hereinbelow.

The second set of heuristics utilizes the presence of "expected" or "known" data types that are commonly present singly within a table cell, e.g., values having a recognized/known unit of measure, formatting, label, etc. such as currency, numerals, alphabetic characters, etc. as would be understood by a person having ordinary skill in the art upon reading the present disclosure. Additionally, the presence of text lines including ellipses (e.g., as indicative that a cell includes more data than can be displayed, and/or exemplified by exemplary use in "attaching" (or otherwise associating) the row headers to the row data visually, such that the human eye can easily identify the row and distinguish it from other rows, for example as is common in a table of contents) is particularly useful in identifying/distinguishing rows within a table, and may be used as a heuristic.

Where the second set of heuristics are employed, detecting data rows (equivalently, row clusters within the data region) preferably includes establishing the first row cluster starting at Data Top TLX and moving downward, and including additional TLXs in the cluster until various criteria are met indicating that the current cluster should be terminated and a new cluster started.

Within this process, a row cluster may be terminated in response to any of the following conditions: (1) a text line is followed by an immediately subsequent text line that starts to the "left" of the immediately previous text line (i.e., the next line is "less indented" than the previous line(s)), which often indicates the end of a multi-line row; (2) after any text line ending in any symbol indicating a row descriptor, e.g., a colon, double colon, etc. in various approaches, along with equivalent expressions that may be understood by a person having ordinary skill in the art upon reading the present disclosure; (3) after any text line that includes the presence of an ellipsis indicating the bottom or the row cluster has been reached, or (4) any other pair of adjacent text lines that does not meet one or more of the termination exceptions described herein below.

The termination exceptions that indicate that the text line should remain part of the same row cluster include any of the following: (a) the text line above ends in a "continuation character," i.e., any character or marking indicative that text continues onto a next line, such as "&", a comma, a semicolon, a dash, etc. as would be understood by a person having ordinary skill in the art, (b) the text line below is enclosed in parenthesis, indicating a continuation of an explanation, (c) the text line above contains an unmatched open parenthesis, indicating the an associated close parenthesis is to follow on a text line below, and/or (d) neither text line contains "expected" or "known" data types that are commonly present singly within of a table cell (as described hereinabove) and the text lines are separated by a distance that is smaller than the observed vertical separation between "expected" or "known" data types within the table under consideration.

Determine if Row is Data or Row Descriptor

Following text line splitting, table extraction preferably includes creating a row for each identified text line cluster. The rows are preferably designated as row descriptors (RD) if the corresponding cluster is a single phrase contained entirely in the first column of the table. Similarly, a first data line may be designated where a single phrase is contained in any column of the table.

For instance, in one approach, a given row (i.e., one or more text lines) is determined to be a row descriptor if: (1) there is only a single element in the cluster; (2) the single element is wholly contained in a single column (i.e., doesn't span multiple columns); and/or (3) the element is not in the first data row, but the containing column is the first (leftmost) column in the table.

In more approaches, if a row does not fit the foregoing data descriptor definition, it is preferably considered a proper "data row" in the table.

Compute Final Columns

Table extraction further includes computing final columns for the table. This is performed in a manner similar to that described above regarding calculating columns for the data region of the table (excluding additional text lines designated as row descriptors). We know all excluded areas, whether from crossing the x-value of a literal or implied vertical line, from rows determined to be row descriptors, or (now) the header.

Computing the final columns, for the whole table, and validating the table are also preferably performed as part of the table extraction process. Validation includes rejecting tables that include one or more indicia of invalidity, such as too few rows and/or columns, insufficient data within cells, and/or an abundance of Key/Value pairs (which is likely indicative of a list, rather than a table).

In various approaches, the threshold number of rows/columns, cells, and/or Key/Value pairs considered "enough," "sufficient," and/or "abundant" may be determined experimentally based on the particular application and/or nature of the tables to be detected, extracted, etc. For cells, the threshold may be measured in terms of a percentage, ratio, fraction, etc. of all cells in the table.

Figure 27:
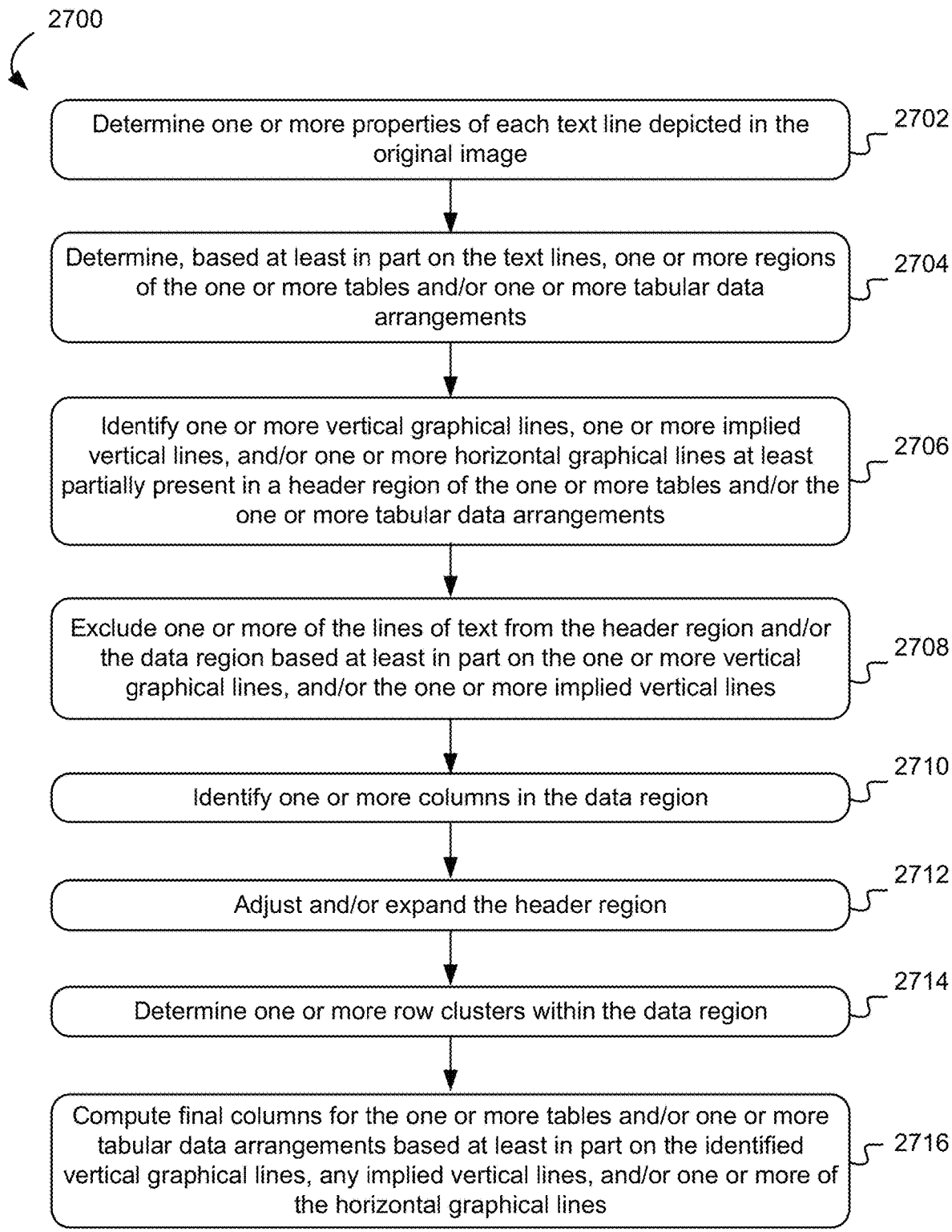
FIG. 27 is a simplified flowchart of a computer-implemented method for extracting information from one or more non-grid-like tables and/or one or more non-grid-like tabular data arrangements depicted in image data, according to one embodiment.

Referring now to FIG. 27, a simplified flowchart of a computer-implemented method 2700 for extracting information from one or more non-grid-like tables and/or one or more non-grid-like tabular data arrangements depicted in image data is shown, according to one embodiment. The method 2700 may be performed in accordance with the present invention in any of the environments depicted in FIGS. 1-22, among others, in various embodiments. Of course, more or less operations than those specifically described in FIG. 27 may be included in method 2700, as would be understood by one of skill in the art upon reading the present descriptions.

Each of the steps of the method 2700 may be performed by any suitable component of the operating environment. For example, in various embodiments, the method 2700 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 2700. Illustrative processors include, but are not limited to, a central processing unit (CPU), an application specific integrated circuit (ASIC), a field programmable gate array (FPGA), etc., combinations thereof, or any other suitable computing device known in the art.

Moreover, it shall be understood that non-grid-based extraction as performed in accordance with method 2700 may include/involve any selection, combination, or permutation of operations, features, evaluations, considerations, etc. described herein with respect to "Extraction from Non-Grids" without departing from the scope of the inventive concepts presented herein.

As shown in FIG. 27, method 2700 includes operation 2702, in which properties of each text line depicted in the original image are determined.

In operation 2704 of method 2700, based at least in part on the text lines, one or more regions of the one or more tables and/or one or more tabular data arrangements are determined.

Operation 2706 of method 2700 includes identifying one or more vertical graphical lines, one or more implied vertical lines, and/or one or more horizontal graphical lines at least partially present in a header region of the one or more tables and/or the one or more tabular data arrangements.

With continuing reference to FIG. 27, method 2700 involves excluding one or more of the lines of text from the header region and/or the data region based at least in part on the one or more vertical graphical lines, and/or the one or more implied vertical lines as part of operation 2708.

Moreover, method 2700 includes operation 2710, which includes identifying one or more columns in the data region.

Moreover still, method 2700 as shown in FIG. 27 includes adjusting and/or expanding the header region in operation 2712.

In operation 2714, method 2700 includes determining one or more row clusters within the data region.

Concluding with operation 2716, method 2700 involves computing final columns for the one or more tables and/or one or more tabular data arrangements based at least in part on the identified vertical graphical lines, any implied vertical lines, and/or one or more of the horizontal graphical lines.

Table and Column Classification

With tables detected, and (relevant or all) information included therein extracted, the presently disclosed inventive concepts preferably employ a classification approach to facilitate determining whether, and if so which, of the extracted data are relevant to a given downstream workflow/application Further, the classification approach is preferably multi-class in nature, i.e., there may be many different kinds/classes of tables and/or tabular data arrangements, each of which are relevant to given downstream workflow/application, and the inventive classification approach described herein preferably answers both the binary question (is a given example relevant or not relevant) and also the multi-class question (if a given example is relevant, which kind/class of relevance does the example represent).

Generally, both table classification and column classification preferably employ a learn-by-example (LBE) approach, including a training phase, wherein a user selects table(s) and/or portions thereof (preferably column(s)) of interest among a set of exemplary training documents representing multiple different classes of tables and/or tabular data arrangements, and a machine learning algorithm utilizes the training dataset to learn criteria indicative of relevance of said tables and/or tabular data arrangements. The output of the classification training process is preferably a classification model most suitable for classifying multiple tables and/or tabular data arrangements of a same or similar type as those included in the training dataset.

The relevancy criteria learned during training are subsequently applied to a test dataset, potentially including many documents of diverse origin, layout, content, etc., to identify relevant tables and/or portions thereof within the test dataset. In preferred approaches, the test dataset comprises a multitude (e.g., up to hundreds) of documents and/or pages of documents (e.g., up to thousands). Most preferably, the test dataset documents are all similar in nature (e.g., all of a same/similar type, such as financial reports, explanation of benefits documents, medical charts, etc. as would be understood by a person having ordinary skill in the art upon reading the instant disclosure). However, a diverse set of test dataset documents may also be analyzed, and relevant information determined therefrom using techniques in accordance with the presently disclosed inventive concepts.

When similar documents are analyzed as a dataset, the machine learning algorithm exhibits optimum performance, with high accuracy and recall regarding identification/retrieval of relevant tables and/or data from the dataset. However, the inventive approaches described herein are also applicable to test datasets comprising diverse document and/or data types.

Table Classification

Moreover, tables provided as input to the classification engine preferably have explicit boundary definitions (i.e., are separately identified as individual tables), and may have a label assigned by a user associated therewith. Tables without labels are automatically assigned a generic label, e.g., "unknown" and are preferably treated as negative examples for all table classes. This concept applies equally to classifying tables per se, as well as classifying portions (e.g., columns) of the table. Moreover, in various approaches not all portions/columns need to be explicitly labeled as being of interest, and unlabeled portions/columns may be (e.g., implicitly) treated as not being of interest.

In particularly preferred approaches, the classification model is a support vector machine (SVM) classifier, trained using a Primal method with a linear kernel, or an equivalent discriminative classifier. Features employed for classification may include term frequency, term frequency/inverse document frequency, etc., where the terms in question correspond to OCR elements that reside within the table boundary (e.g., as defined by a rectangle on a particular page for single-page tables, or equivalently by multiple rectangles on multiple pages if the table in question spans more than one page), as would be understood by a person having ordinary skill in the art upon reading the present disclosure. Preferably, terms include individual words and associated word N-grams of various lengths to capture sequence information (e.g., identify sequences/patterns within documents/tables/tabular data) as well as terms with known meaning. Preferably, terms with known meaning appearing in the test and/or train dataset are replaced with the known meaning (e.g., units, character type, currency, date, integer value, decimal value, etc.). In additional embodiments, other text classification techniques may additionally or alternatively be employed, such as removal of "stop words", feature normalization and/or conversion to a single (preferably lower) case.

Preferably, features for classification also take into account the structure sub-region of the table within which the OCR element(s) in question reside. For example, OCR elements that reside within the column header sub-region of the table may be given additional weight vs. elements that occur in the data sub-region of the table. Similarly, for example, if the left-most column is textual in nature while the core of the table contains numerical information, OCR elements within this left-most "row header" column may be given increased weight. This approach advantageously takes advantage of the structured information describing the table as determined during/through table detection and/or extraction described hereinabove.

One approach taking advantage of structured information includes capturing context, particularly sequence information, represented in natural language. For instance, in one embodiment using the order of words as defined within a field/cell (according to the appropriate orientation of said language, i.e., left-to-right, right-to-left, top-to-bottom, bottom-to-top, etc.) allows text (and/or corresponding N-gram(s), i.e., combinations of words within a sequence that are treated as a single feature) within that field/cell to "wrap," as is appropriate for multi-line column/row headers, in various embodiments.

In particularly preferred approaches, the training process includes parameter optimization, wherein the classification engine uses explicit hyper-parameters (e.g., score thresholds) to assign labels to documents, tables, and/or tabular data within a dataset. More preferably, the parameters are optimized according to maximum F-score, are generated using available training data, and employ a Leave-One-Out processing technique. Of course, other parameter optimization approaches may be used without departing from the scope of the inventive concepts described herein, such as K-fold cross validation, in embodiments with particularly large training datasets, e.g., having twenty or more exemplars.

Preferably, regarding optimizing score thresholds, only the highest score for each class (and satisfying any associated class threshold) designates the class label/type, and score thresholds are optimized and applied separately for each class. For example, an optimal score threshold is preferably determined for each class, and applied to corresponding portion(s) of a table/tabular data arrangement. For instance, the classifier output for any given example preferably includes a score for each class under consideration, and absent any score threshold, the class associated with the highest such score would be selected as the class assigned to the example. Use of optimized score thresholds, particularly as a set of class-specific score thresholds, significantly improves the precision and overall accuracy of the classification result.

For a given training set comprised of examples spanning multiple classes, potentially including a "purely negative" class, e.g., as for tables and/or tabular arrangements that are not of interest, as described hereinabove, optimized score thresholds are preferably established as described hereinbelow. Without departing from the scope of the inventive concepts described herein, consider a training set comprised of only ten examples that correspond to only three classes (A, B and X), where classes A and B are of interest and class X represents all other tables not of interest.

First, a score matrix may be generated wherein each row (or equivalently column) of the matrix is a score vector that identifies the scoring result for a single example in the training set, and where the scoring result for an example identifies a score for each class of interest (i.e., one score for class A and one score for class B). Such a score matrix may be created using a Leave-One-Out methodology, e.g., the first score vector may be constructed by leaving out the first example and training on the remaining nine examples, the second score vector may be constructed by leaving out the second example and training on the remaining nine examples, etc., as would be understood by one having ordinary skill in the art upon reading the present disclosure.

Given that a score matrix has been established, it should also be noted that the true label (i.e., A, B or X) is known for each example in the training set, and that such label can therefore be associated with each score vector in the score matrix. Subsequently, in preferred embodiments, it is advantageous to establish score thresholds for each class of interest (i.e., classes A and B, in this example) separately, as described herein below.

For a given class, one may identify the maximum and minimum score values within the score matrix, and further, one may sort the score values and identify unique score values within the score matrix. Further still one may identify as candidate score thresholds the midpoint between adjacent unique sorted scores. For example, if the scores for class A were (0, 0.1, −0.4, 0.1, 0, −0.4, 0.3, 0.3, −0.2, 0.1) then the associated list of sorted unique scores would be (−0.4, −0.2, 0, 0.1, 0.3) and candidate score thresholds would be (−0.3, −0.1, 0.05, 0.2). Subsequently, one may evaluate a binary F-Score for class A (i.e., for the binary classification of class A vs. not class A) for each candidate score threshold, where a given score vector would be considered to constitute a positive result for class A if the score for class A is greater than the candidate score threshold under consideration. Accordingly, for each score threshold, counts can be established for true positives, false positives and false negatives, and thereby an associated F-Score can be obtained for each candidate score threshold, as would be appreciated by one with ordinary skill in the art. Subsequently, one may select as the optimal score threshold the candidate score threshold with the highest associated F-Score. Preferably, his methodology is separately performed for all classes of interest (i.e., for class B in this example), resulting in a set of optimal score thresholds, one for each class of interest.

Having established optimal score thresholds for each class of interest, the decision for classifying an unknown example would preferably proceed as follows: execute the model obtained from the training set, (2) obtain a score vector for the example in question, (3) identify the highest score in the score vector and the associated class, (4) select the score threshold for the class in question, and (5) return a positive result for the class in question only if the score is above the selected score threshold, otherwise return a negative result.

Notably, the parameter optimization concepts described hereinabove are equally applicable to other parameters/methods, e.g., via "costs" for embodiments employing support vector machines.

Regardless of the particular parameter optimization approach employed, optimized parameters are preferably stored for subsequent use with an appropriate test dataset, i.e., to be applied to unknown examples. However, as a final step in the training process, a user may adjust parameters manually to accomplish a desired outcome (e.g., optimized recall, optimized precision, etc.) as would be understood by a skilled artisan upon reading the present disclosure.

For example, in one illustrative embodiment, the optimized thresholds automatically determined from the training data may are employed as "default" values, which a user can adjust (e.g., according to preference for precision vs. recall). This functionality can be rendered on a UI in many ways, and in one approach may be implemented as a set of "sliders", one for each class, e.g., as is commonly used for a graphic equalizer. According to this example, the slider for each class is preferably set to the optimized value that is automatically determined as described above, then the user can adjust these thresholds separately for each class. Preferably, the effect of moving a slider is immediately displayed (more preferably in terms of both an accuracy metric(s) and visually showing the tables and the associated classification outcome and including indications of true positive, false positive, false negative, etc.) which is practical to accomplish in real time since training need not be repeated because the score matrix generated during automated threshold optimization remains valid and need not be recreated (i.e., training need not be repeated).

At runtime, table classification takes as input a document or set of documents having tables and/or tabular data and associated explicit boundary definitions. Some of the tables may have associated therewith user-assigned labels, though this need not be the case in all implementations. The trained classification model is applied to the test document dataset and generates labels for each table (e.g., classification according to one of a plurality of predefined classes of interest, or "unknown" for tables not sufficiently matching one of the predefined classes of interest).

Preferably, document(s) and/or table(s) receiving an "unknown" label are removed from the dataset and may be subjected to subsequent processing, either to improve identification and/or extraction of tables and/or tabular data within the document(s)/table(s), in various embodiments.

For instance, in one approach, such post-processing may include "online learning," in which user(s) will review the results and perhaps correct any classification mistakes (either false positives or false negatives) and these examples with corrected labels will be fed back into the training set for subsequent rounds of training—both with respect to table classification and column classification.

Preferably, such training occurs "silently" in the background, without any need for a user to explicitly initiate improvement of a model. As such, training may be an iterative, ongoing process improving the representative nature of the training examples with respect to positive and negative results. This "online learning" is particularly useful for documents that yield poor confidence results using purely automated approaches, and users may be actively recruited to curate/annotate for tables/columns with low confidence.

Figure 28:
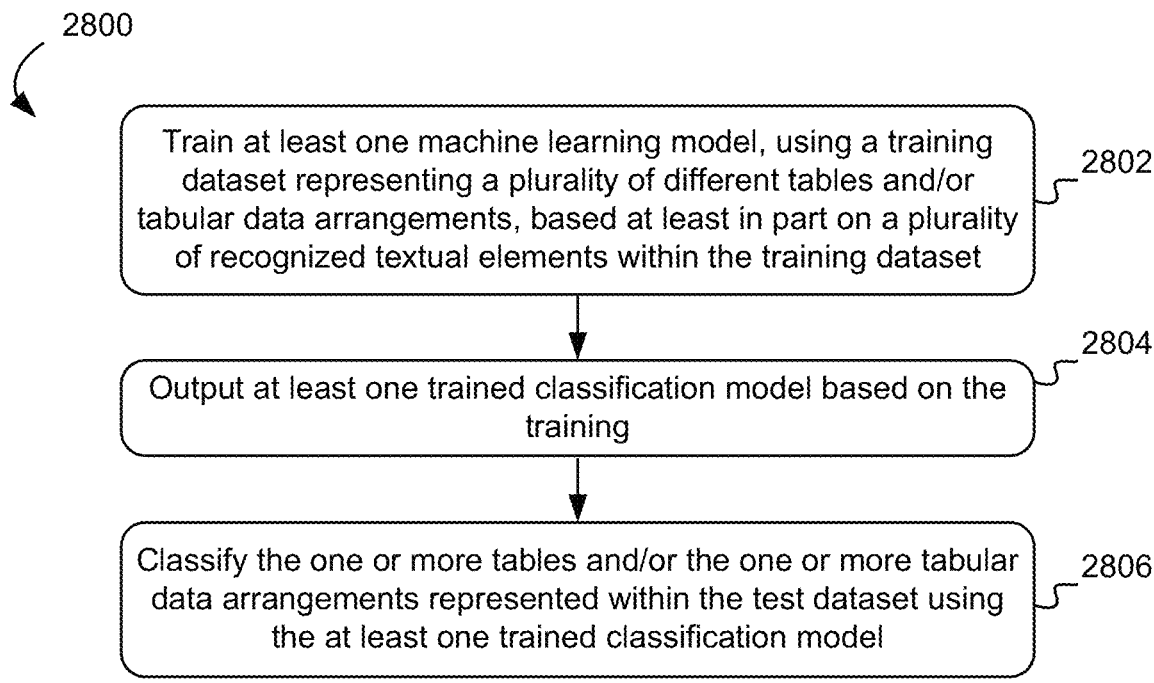
FIG. 28 is a simplified flowchart of a computer-implemented method for classifying one or more tables and/or one or more tabular data arrangements depicted in image data, according to one embodiment.

Referring now to FIG. 28, a simplified flowchart of a computer-implemented method 2800 for classifying one or more tables and/or one or more tabular data arrangements depicted in image data is shown, according to one embodiment. The method 2800 may be performed in accordance with the present invention in any of the environments depicted in FIGS. 1-22, among others, in various embodiments. Of course, more or less operations than those specifically described in FIG. 28 may be included in method 2800, as would be understood by one of skill in the art upon reading the present descriptions.

Each of the steps of the method 2800 may be performed by any suitable component of the operating environment. For example, in various embodiments, the method 2800 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 2800. Illustrative processors include, but are not limited to, a central processing unit (CPU), an application specific integrated circuit (ASIC), a field programmable gate array (FPGA), etc., combinations thereof, or any other suitable computing device known in the art.

Moreover, it shall be understood that table classification as performed in accordance with method 2800 may include/involve any selection, combination, or permutation of operations, features, evaluations, considerations, etc. described herein with respect to "Table Classification" without departing from the scope of the inventive concepts presented herein.

As shown in FIG. 28, method 2800 includes operation 2802, in which at least one machine learning model is trained, using a training dataset representing a plurality of different tables and/or tabular data arrangements, and based at least in part on a plurality of recognized textual elements within the training dataset.

In operation 2804 of method 2800, at least one trained classification model is output. The trained classification model(s) is/are based on the training of operation 2702, and the at least one trained classification model is configured to classify one or more tables and/or one or more tabular data arrangements represented within a test dataset according to: one or more table classifications; one or more tabular data arrangement classifications; and/or one or more column classifications.

Method 2800 also includes operation 2806, which involves classifying the one or more tables and/or the one or more tabular data arrangements represented within the test dataset using the at least one trained classification model.

Column Classification

Turning now to column classification, in general column classification follows similar principles as described above regarding table classification, including using a machine-learning approach to train using an input set of documents with explicitly defined table boundaries, and optional user-assigned labels associated with some of the tables and/or "unknown" labels associated with tables of unknown type. Notably, in column classification, one or more columns of some or all of the table(s) in the document may also be labeled, e.g., indicating which columns are of interest for extraction, and further, among relevant columns, which specific kind/class of relevance applies to each column (e.g., among relevant column types A, B, C, etc.). Columns without labels are assigned an "unknown" label/designation.

The output of column classification training is a classification model, preferably one model for each category of table included in the training set. Preferably, during training each document type/table category is processed separately.

To train the system in a supervised manner, according to one approach a user first creates a training set by labeling columns of interest. For a given column, this may be accomplished by selecting the column in question (e.g., by clicking on the header of the column) and assigning the column a class name. During this process, a user need not label all columns. Columns that are not explicitly labeled by the user will be understood by the technology to be implicitly labeled as "uninteresting" and treated as negative examples for all column classes.

For each column in the training set (whether labeled explicitly or implicitly) the location of the column (e.g., as defined by a rectangle on the page in which the table is located, or equivalently by multiple rectangles on multiple pages if the table in question spans multiple pages) and the corresponding textual and graphical elements contained therein is understood by the training mechanism to correspond to that region(s) of the page(s) and table that was previously identified for the column according, for example, to the Table Extraction methodology disclosed previously herein in one approach, or by any other analogous mechanism that would be appreciated as equivalent by a person having ordinary skill in the art upon reading the present disclosure.

Furthermore, the Table Extraction methodology (or analogous mechanism) has also identified sub-regions for each column: one sub-region corresponding for the column data and a separate sub-region corresponding to the column header. In addition, any column descriptors that apply to the column in question are known, based on the location of the column descriptor(s) relative to the location of the column in question. Specifically, column descriptors with a horizontal extent that overlaps the horizontal extent of the column in question are known to apply to and thereby describe the column in question, serving to "fully qualify" the value of the column header as described previously herein.

To accomplish the training, a feature-based approach may be employed, wherein a feature vector is created for each column, and a label is associated with each feature vector, as would be appreciated by one familiar with the art upon reading the current disclosure. Most preferably, the feature vector is created according to the sub-regions for the column header and column data, and any column descriptors that apply to the column, as described below.

Preferably, OCR elements that reside within the column boundary are normalized such that: (1) the values of elements of known type are replaced by the label defining that type (e.g., date, currency, etc.); and/or (preferably and) (2) other text processing techniques that serve to normalize the textual values (stemming, stop word removal, conversion to lower case, and any equivalent thereof that would be appreciated by a skilled artisan upon reading this disclosure) may additionally or alternatively be employed, according to various embodiments.

Moreover, again according to preferred approaches, three separate sets of information (e.g., according to a bag of words model, in one embodiment) are constructed, one set for each of: (a) the column header sub-region; (b) corresponding column descriptors (if any); and (c) the column data sub-region.

Furthermore, in particularly preferred approaches, one or more "synonym sets" may be identified based on the OCR element values present in column headers of the training data, according to the following methodology: (1) consider all columns in the training set where the column header is comprised of a single OCR element (i.e., a single word or equivalently a single phrase), (2) if any set of two or more such columns have the same label but different header values, and if the columns in question reside in different tables, then the header values are determined to have the same meaning and thereby constitute a synonym set. If one or more synonym sets are identified, during the training and classification processes described hereinbelow each OCR element value within a given synonym set will be considered as equivalent and will accordingly be identified with the same (single) feature value.

In addition to a feature vector for each column in the training set, in preferred embodiments the following pieces of information, singly or in any suitable combination/permutation, are also collected and stored within the classification model based on analysis of the labeled columns within the training set.

Important Single Values: the value of an OCR element is "important" and preferably assigned a relatively higher/more significant weighted value, if it satisfies two conditions: a) all columns where it occurs in the header belong to the same class; b) it occurs in the headers of at least 3 columns in the training set. Important values are considered good indicators of the column class.

Important Column Descriptor Single Values: the value of an OCR element is "important" and preferably assigned a relatively higher/more significant weighted value, if it satisfies two conditions: a) all column descriptors where it occurs correspond to a consistent set of column labels, i.e., the columns described by a column descriptor containing this value (i.e., as indicated by the horizontal extent of the column descriptor) are always equal in both number and label, and b) it occurs in the column descriptors of at least 3 distinct tables in the training set. Important column descriptor single values are considered good indicators of the column class.

Important Value Pairs: A pair of OCR element values is "important," and preferably assigned a relatively higher/more significant weighted value, if it satisfies two conditions: a) all columns where both values occur in the header belong to the same class; b) there are at least 3 columns in the training set where both values occur in the header. Important value pairs are considered good indicators of the column class.

Important Column Descriptor Value Pairs: A pair of OCR element values is "important" and preferably assigned a relatively higher/more significant weighted value, if it satisfies two conditions: a) all column descriptors where both values occur correspond to a consistent set of column labels, i.e., the columns described by a column descriptor containing both values (i.e., as indicated by the horizontal extent of the column descriptor) are always equal in both number and label, and b) both values occur in the column descriptors of at least 3 distinct tables in the training set. Important column descriptor value pairs are considered good indicators of the column class.

Half-Important Value Pairs: A pair of OCR element values is "half-important," and preferably assigned a relatively higher/more significant weighted value, if it satisfies two conditions: a) all columns where both values occur in the either the header or the column descriptor belong to the same class; b) there are at least 3 columns in the training set where both values occur in either the header or the column descriptor. Half-important value pairs are considered good indicators of the column class.

Important Value Triplets: A set of three OCR element values is "important," and preferably assigned a relatively higher/more significant weighted value, if it satisfies two conditions: a) all columns where all three values occur in the header belong to the same class; b) there are at least 3 columns in the training set where all three values occur in the header. Important value triplets are considered good indicators of the column class Column Sequence Information: For each class in the training set, the following information is recorded and subsequently used to facilitate classification of unknown columns: a) a list of all column labels, if any, that occur to the left of the column in question at least once in the training data, and (2) a list of all column labels, if any, that occur to the right of the column in question at least once in the training data.

At runtime, column classification proceeds in a manner similar to table classification as described above. In preferred embodiments, the trained classification model receives as input a plurality of documents, preferably with table labels assigned therewith, and explicitly defined boundaries, both for tables (e.g., as output from table detection) and for columns (e.g., as output from table extraction). The learn by example (LBE) column classification engine preferably applies an appropriate classification model based on the label assigned to the table and generates as output appropriate column labels for each column within tables under consideration. Columns not capable of being classified are preferably assigned a label "unknown" and considered uninteresting for subsequent applications.

In preferred embodiments, the input of this step is a table corresponding to the table type(s) for which the column classifier was trained. For example, such tables may have been automatically classified by the Table Classification methodology described previously herein, or by any other equivalent mechanism. Furthermore, the table(s) for which columns are to be classified contain the structural information as described for the column training phase (column region, data sub-region, header sub-region, column descriptors). This structural information can be generated according to the Table Extraction methodology described previously herein, or by any other method.

To classify a given column, a feature vector is generated for the column in question, according to the same methodology described for training. A set of similarity scores is then computed, where each such score is computed by comparing the test feature vector in question to the feature vectors of all training examples. In this respect, the classification scheme is similar to that of a nearest neighbor approach.

The similarity score for a pair of feature vectors is computed as a function of the number of OCR element values that are common between the training and test examples, in combination with the total number of such values whether common or not, as considered individually within each section (column header, column descriptor, column data, etc. according to various approaches) of the feature vectors in question. Further, the score may be, and preferably is, computed according to the following lexicographic ordering of the feature vector sections: column header first, column descriptors second, column data last. In addition, this score is preferably adjusted according to the presence one or more class indicators in the test feature vector, with respect to the class of the training example in question, including any or all of: (1) Important Single Values, (2) Important Column Descriptor Single Values, (3) Important Value Pairs, (4) Important Column Descriptor Value Pairs, (5) Half-Important Value Pairs, and/or (6) Important Value Triplets. When present in the test example, these indicators will cause a significant adjustment to the score in the direction of more similarity with regard to the training class in question. The score is also preferably adjusted according to the predicted column sequence vs. the column sequence information compiled from the training data.

Lastly, having computed the final adjusted scores for the test example with respect to all training examples, the training example with the highest degree of similarity is inspected, and if the similarity score is greater than a configurable threshold, the class of the training example is assigned to the test example.

Optionally, user-assigned labels based on a user definition in the training set may be applied following classification, which further allows columns of the same class to be mapped to a corresponding and unified output column index (e.g., as in a database table, EXCEL spreadsheet, etc.), which serves to normalize table formatting with respect to the table formatting/organization/layout that was used on the potentially many disparate images on which the tabular information was originally printed, while removing columns not of interest.

Figure 29:
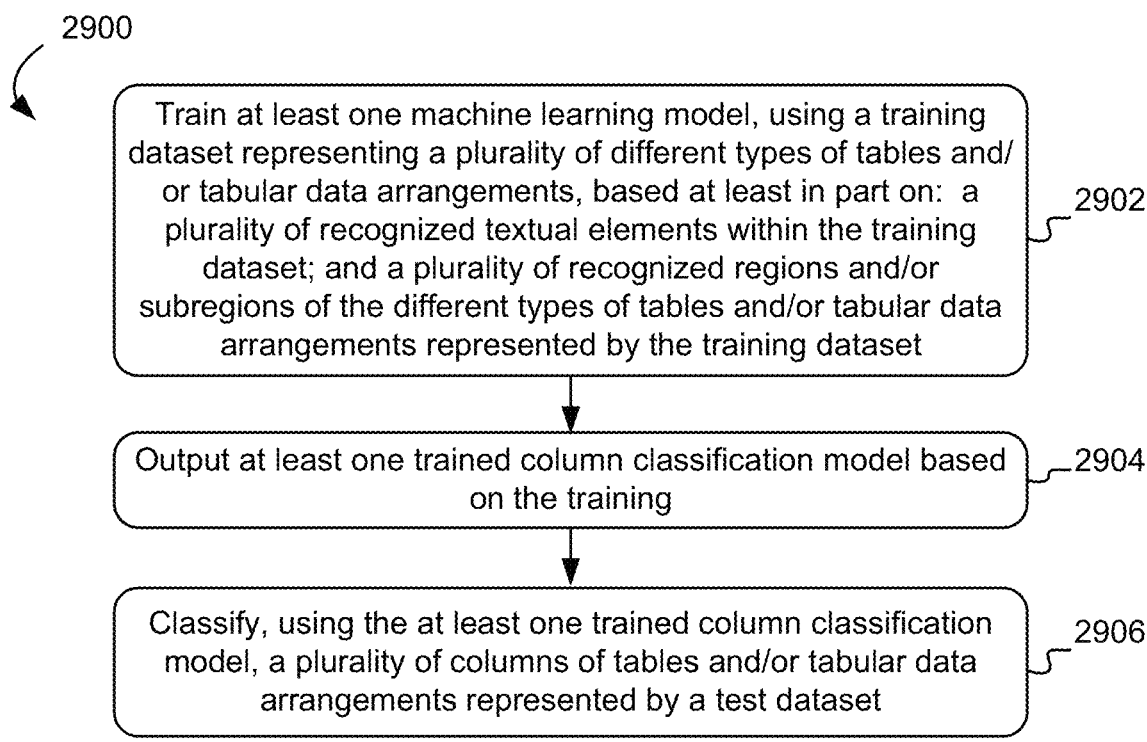
FIG. 29 is a simplified flowchart of a computer-implemented method for classifying columns of one or more tables and/or one or more tabular data arrangements depicted in image data, according to one embodiment.

Referring now to FIG. 29, a simplified flowchart of a computer-implemented method 2900 for classifying columns of one or more tables and/or one or more tabular data arrangements depicted in image data is shown, according to one embodiment. The method 2900 may be performed in accordance with the present invention in any of the environments depicted in FIGS. 1-22, among others, in various embodiments. Of course, more or less operations than those specifically described in FIG. 29 may be included in method 2900, as would be understood by one of skill in the art upon reading the present descriptions.

Each of the steps of the method 2900 may be performed by any suitable component of the operating environment. For example, in various embodiments, the method 2900 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 2900. Illustrative processors include, but are not limited to, a central processing unit (CPU), an application specific integrated circuit (ASIC), a field programmable gate array (FPGA), etc., combinations thereof, or any other suitable computing device known in the art.

Moreover, it shall be understood that column classification as performed in accordance with method 2900 may include/involve any selection, combination, or permutation of operations, features, evaluations, considerations, etc. described herein with respect to "Column Classification" without departing from the scope of the inventive concepts presented herein.

As shown in FIG. 29, method 2900 includes operation 2902, which involves training at least one machine learning model, using a training dataset representing a plurality of different types of tables and/or tabular data arrangements, based at least in part on: a plurality of recognized textual elements within the training dataset; and a plurality of recognized regions and/or subregions of the different types of tables and/or tabular data arrangements represented by the training dataset.

Moreover, in operation 2904 of method 2900, at least one trained column classification model based on the training is output. Each trained column classification model is configured to classify columns of a particular type of table or a particular type of tabular data arrangement represented within the training dataset.

With continuing reference to FIG. 29, operation 2906 of method 2900 includes classifying, using the at least one trained column classification model, a plurality of columns of tables and/or tabular data arrangements represented by a test dataset.

Exemplary Inventive Concepts

In accordance with the foregoing descriptions, and corresponding Figures, the presently described invention shall be understood as expressly including the following exemplary inventive concepts.

According to one embodiment, a computer-implemented method for pre-processing an original image depicting one or more tables and/or one or more tabular data arrangements includes: image processing, character recognition, and layout analysis. The image processing comprises: detecting graphical lines depicted in the original image; detecting boxes depicted in the original image; detecting bars and/or stacks depicted in the original image; determining effective rectangles for textual characters depicted in the original image; and/or identifying delineating lines depicted in the original image. The character recognition comprises: statistically analyzing one or more geometric characteristics of the textual characters depicted in the original image; detecting and/or correcting recognition errors corresponding to the textual characters depicted in the original image; filtering the textual characters depicted in the original image; grouping some or all of the textual characters depicted in the original image; and/or characterizing a context and/or a value of some or all of the textual characters depicted in the original image. The layout analysis comprises identifying one or more excluded zones within the original image, wherein the excluded zones do not encompass any of the one or more tables and/or any of the one or more tabular data arrangements.

According to another embodiment, a computer-implemented method for detecting one or more grid-like tables and/or one or more grid-like tabular data arrangements depicted in image data includes: evaluating the image data against a first set of rules defining characteristics of grid-like tables and/or grid-like tabular data arrangements, and defining a structure of the one or more grid-like tables and/or one or more grid-like tabular data arrangements based on the evaluation; evaluating the image data against a second set of rules defining characteristics of cells, and identifying one or more cells of the one or more grid-like tables and/or the one or more grid-like tabular data arrangements based on the evaluation; generating, based on a result of the first evaluation and a result of the second evaluation, a set of grid-like table candidates, and/or a set of grid-like tabular data arrangement candidates; and defining, from the set of grid-like table candidates, and/or the set of grid-like tabular data arrangement candidates, the one or more grid-like tables and/or the one or more grid-like tabular data arrangements.

The exemplary methods for detecting grid-like tables and/or tabular data arrangements may optionally further include, in one approach: defining, within the image data, one or more excluded zones each independently corresponding to one of the grid-like tables or one of the grid-like tabular data arrangements; analyzing one or more non-excluded zones of the image data; and detecting, based on the analysis, one or more non-grid-like tables and/or one or more non-grid-like tabular data arrangements within the non-excluded zones of the image data.

According to still another inventive concept, a computer-implemented method for detecting non-grid-like tables and/or tabular data arrangements includes: evaluating the image data against a first set of rules defining characteristics of column seeds, and identifying a set of column seed candidates based on the first evaluation; evaluating the image data against a second set of rules defining characteristics of column clusters, and identifying a set of column cluster candidates based on the second evaluation; evaluating the image data against a third set of rules defining criteria for updating column clusters, and either or both of: reformulating one or more existing column definitions based on the third evaluation; and modifying a definition of some or all of the column cluster candidates based on the third evaluation; evaluating the image data against a fourth set of rules defining characteristics of row title columns, and identifying a set of row title column candidates based on the fourth evaluation; defining a structure and a content of the one or more tables and/or the one or more tabular data arrangements based on a result of some or all of: the first evaluation; the second evaluation; the third evaluation; and the fourth evaluation.

According to one embodiment, reformulating the one or more existing column cluster definitions comprises expanding one or more boundaries of some or all of the existing columns.

According to another embodiment, detecting non-grid-like tables and/or tabular data arrangements may optionally further include performing the second evaluation, the third evaluation, and the fourth evaluation iteratively until a convergence criterion is satisfied.

According to yet another embodiment, detecting non-grid-like tables and/or tabular data arrangements further includes: evaluating the image data against a fifth set of rules defining criteria of single tables and/or tabular data arrangements that appear as vertically stacked tables or tabular data arrangements; and joining the vertically stacked tables and/or tabular data arrangements that in fact constitute a single table or tabular data arrangement in response to determining, based on the fifth evaluation, that the vertically stacked tables and/or tabular data arrangements satisfy one or more of the criteria of single tables and/or tabular data arrangements that appear as vertically stacked tables or tabular data arrangements; and wherein the structure and the content of the one or more tables and/or the one or more tabular data arrangements is further based on the fifth evaluation.

In accordance with another inventive concept described herein, a computer-implemented method for extracting information from one or more non-grid-like tables and/or one or more non-grid-like tabular data arrangements depicted in image data. The method includes: determining one or more properties of each text line depicted in the original image; determining, based at least in part on the text lines, one or more regions of the one or more tables and/or one or more tabular data arrangements; identifying one or more vertical graphical lines, one or more implied vertical lines, and/or one or more horizontal graphical lines at least partially present in a header region of the one or more tables and/or the one or more tabular data arrangements; excluding one or more of the lines of text from the header region and/or the data region based at least in part on the one or more vertical graphical lines, and/or the one or more implied vertical lines; identifying one or more columns in the data region; adjusting and/or expanding the header region; determining one or more row clusters within the data region; and computing final columns for the one or more tables and/or one or more tabular data arrangements based at least in part on the identified vertical graphical lines, any implied vertical lines, and/or one or more of the horizontal graphical lines.

A computer-implemented method, according to one exemplary inventive concept, for classifying one or more tables and/or one or more tabular data arrangements depicted in image data includes: training a machine learning model, using a training dataset representing a plurality of different tables and/or tabular data arrangements, based at least in part on a plurality of recognized textual elements within the training dataset; and outputting a trained classification model based on the training, wherein the trained classification model is configured to classify one or more tables and/or one or more tabular data arrangements represented within a test dataset according to: one or more table classifications; one or more tabular data arrangement classifications; and/or one or more column classifications; and classifying the one or more tables and/or the one or more tabular data arrangements represented within the test dataset using the trained classification model.

Optionally, methods for classifying one or more tables and/or one or more tabular data arrangements depicted in image data may utilize training that is further based at least in part on a structure of the one or more tables and/or the one or more tabular data arrangements.

Still further inventive concepts presented herein comprise computer-implemented methods for classifying columns of one or more tables and/or one or more tabular data arrangements depicted in image data. These exemplary methods include: training at least one machine learning model, using a training dataset representing a plurality of different types of tables and/or tabular data arrangements, based at least in part on: a plurality of recognized textual elements within the training dataset; a plurality of recognized regions and/or subregions of the different types of tables and/or tabular data arrangements represented by the training set; outputting at least one trained column classification model based on the training, wherein each trained column classification model is configured to classify columns of a particular type of table or a particular type of tabular data arrangement represented within the training dataset; and classifying, using the at least one trained column classification model, a plurality of columns of tables and/or tabular data arrangements represented by a test dataset.

In accordance with further inventive concepts described herein, according to one approach a computer-implemented method for detecting and classifying tables and/or tabular data arrangements within an original image includes: pre-processing the original image to generate processed image data; detecting one or more tables and/or one or more tabular data arrangements within the processed image data; extracting the one or more tables and/or the one or more tabular data arrangements from the processed image data; and classifying either: the one or more extracted tables; the one or more extracted tabular data arrangements; or a combination of the one or more extracted tables and the one or more extracted tabular data arrangements.

According to various aspects of the inventive computer-implemented methods for detecting and classifying tables and/or tabular data arrangements within an original image, pre-processing the original image comprises image processing, character recognition, and layout analysis. The image processing preferably includes: detecting graphical lines depicted in the original image; detecting boxes depicted in the original image; detecting bars and/or stacks depicted in the original image; determining effective rectangles for textual characters depicted in the original image; and/or identifying delineating lines depicted in the original image. The character recognition preferably comprises: statistically analyzing one or more geometric characteristics of the textual characters depicted in the original image; detecting and/or correcting recognition errors corresponding to the textual characters depicted in the original image; filtering the textual characters depicted in the original image; grouping some or all of the textual characters depicted in the original image; and/or characterizing a context and or a value of some or all of the textual characters depicted in the original image. The layout analysis preferably comprises identifying one or more excluded zones within the original image. Optionally, the one or more excluded zones are selected from: enumerated lists, bulleted lists, key-value lists, subpages, page headers, page footers, page numbers, and textual zones.

Additional features of inventive concepts regarding pre-processing the original image may include generating a first representation of the original image, where the first representation excludes textual characters represented in the original image, and wherein generating the first representation preferably but optionally does not create any graphical lines that are not represented in the original image.

Further still, according to certain concepts, generating the first representation may include determining whether one or more portions of a graphical line present in the original image was discarded as a result of excluding one or more of the textual characters represented in the original image, where determining whether the one or more portions of the graphical line present in the original image was discarded as the result of excluding the one or more of the textual characters represented in the original image in turn comprises: generating a binary representation of one or more rectangular areas of the original image, wherein each rectangular area independently corresponds to one of the one or more textual characters; identifying, within a bottom third of the binary representation, one or more rows of pixels characterized by: spanning an entire width of the binary representation; and exhibiting a same color as a foreground color of a binarized version of the original image, wherein the binarized version of the original image was generated using a same binarization threshold value as used to generate the binary representation; and adjusting a lower boundary of the one or more rectangular areas corresponding to the binary representation to be positioned above an uppermost one of the one or more rows of pixels that span the entire width of the binary representation and exhibit the same color as the foreground color of the binarized version of the original image.

According to still further aspects of pre-processing, generating the first representation may involve painting over textual characters represented in the original image. Preferably, painting over the textual characters comprises calculating an average color of four projections for each textual character to be painted over, and wherein each projection extends to one corner of a rectangle bounding the textual character to be painted over.

According to additional inventive concepts, pre-processing the image data comprises: identifying one or more gaps in one or more horizontal graphical lines and/or one or more vertical graphical lines of the first representation, wherein the one or more gaps are formed by painting over one or more portions of one or more textual characters that intersect with the one or more horizontal graphical lines and/or the one or more vertical graphical lines in the original image; and restoring the one or more horizontal graphical lines and/or the one or more vertical graphical lines by filling in the one or more gaps.

Additional concepts within the scope of pre-processing, according to embodiments of the present invention, include: detecting graphical lines depicted in the first representation; and generating a second representation. Preferably, the second representation omits: all graphical lines depicted in the original image; and all of the graphical lines depicted in the first representation; and the second representation depicts all textual characters depicted in the original image.

Pre-processing the original image, according to still further inventive concepts presented herein, comprises detecting boxes depicted in the original image. Moreover, detecting the boxes comprises: computing intersections between horizontal graphical lines depicted in the original image, and vertical graphical lines depicted in the original image, wherein each of the intersections corresponds to a vertex of a graph, wherein a first set of vertices of the graph are connected by edges of the graph, and wherein the first set of vertices correspond to intersections of the horizontal graphical lines depicted in the original image and the vertical graphical lines depicted in the original image; and defining an outermost rectangle based at least in part on the intersections.

Optionally, according to one approach detecting the boxes also includes: identifying, based at least in part on the intersections, connected components depicted in the original image; obtaining a first set of rules that define criteria of boxes; evaluating the connected components against the first set of rules; and generating a set of box candidates based on the evaluation. Preferably, one or more of the set of box candidates is characterized by not being fully defined by graphical lines in the original image; and/or one or more of the set of box candidates is characterized by one or more vertices having a non-right angle of intersection. According to such approaches, detecting the boxes further comprises transforming the one or more vertices having the non-right angle of intersection into vertices having right angle intersections.

In accordance with still more inventive concepts presented herein, pre-processing the original image may include detecting bars and/or stacks depicted in the original image, where detecting the bars and/or stacks comprises: obtaining a second set of rules that define criteria of bars and/or criteria of stacks; evaluating the original image against the second set of rules; and generating a set of bar candidates and/or a set of stack candidates based on the evaluation. Preferably, the criteria of bars include, but are not limited to: satisfying the definition of a box; having a longitudinal axis oriented along one major axis of the original image; having an aspect ratio of about 0.2 or less; and having an interior characterized by a color profile differing from a background color profile of the original image; and wherein the criteria of stacks comprise: including a group of commonly-oriented bars positioned either vertically adjacent or horizontally adjacent one another; and exhibiting an alternating shading pattern.

Pre-processing may additionally or alternatively include defining one or more effective rectangles, wherein each effective rectangle corresponds to a textual element depicted in the original image, and wherein each effective rectangle is characterized by a width corresponding to a graphical line depicted in the original image and positioned either directly above or directly below the corresponding textual element.

In other compatible embodiments, pre-processing the original image may involve identifying one or more delineating lines depicted in the original image. Preferably, identifying the one or more delineating lines comprises: obtaining a third set of rules defining criteria of delineating lines, wherein the criteria of delineating lines comprise: having a width greater than or equal to a width of a smallest of one or more elements depicted in the original image; having a location that: does not overlap in whole or in part with any excluded region(s) of the original image; is not included in the definition of any boxes depicted in the original image and/or any grids depicted in the original image; and is immediately adjacent (preferably, vertically adjacent) to at least one of the one or more elements depicted in the original image; and evaluating the original image against the third set of rules; and generating a set of delineating line candidates based on the evaluation.

With continuing reference to pre-processing image data, according to certain embodiments pre-processing the original image comprises performing character recognition on the original image, where the character recognition involves: statistically analyzing one or more geometric characteristics of textual elements depicted in the original image; detecting and/or correcting one or more errors depicted in the original image; wherein the one or more errors comprise: invalid rectangles depicted in the original image; rectangles having one or more boundaries extending beyond: a boundary of a page depicted in the original image; and/or a boundary of the original image; over-joined words depicted in the original image; over-split words depicted in the original image; undetected dashes depicted in the original image; undetected ellipses depicted in the original image; and/or ellipses depicted in the original image and improperly joined with one or more of the textual elements depicted in the original image; filtering the textual elements depicted in the original image; grouping at least some of the textual elements depicted in the original image, wherein the grouping comprises: grouping characters into words; grouping words into text lines; and/or grouping words into phrases; and/or characterizing a contextual meaning and/or a value of at least some of the textual elements depicted in the original image, wherein characterizing the contextual meaning and/or the value of at least some of the textual elements depicted in the original image comprises: identifying a type of information corresponding to at least some of the textual elements; identifying formatting corresponding to at least some of the textual elements; and/or identifying one or more patterns represented in at least some of the textual elements.

In particularly preferred approaches, character recognition includes grouping textual elements (preferably characters, or groups of characters) to identify boundaries between logical groups (e.g., words, phrases) and/or group textual elements meeting certain criteria. For instance, in one approach character recognition includes: obtaining a set of rules defining criteria of boundaries between phrases; evaluating the original image against the set of rules; and grouping textual elements to form one or more phrases based on the evaluation. Preferably, the criteria for grouping textual elements include: (1) a vertical graphical line being present in a gap between textual elements, (2) a first element, positioned to one side of the gap, is or ends with an ellipsis (as determined by the presence of two or more consecutive dots) while a second element, positioned on an opposite side of the gap, neither is nor includes an ellipsis; (3) either or both of the first element and the second element correspond to known types of elements that occur singly in columns of a table (e.g., currencies, percentages, numerical amounts, etc. as would be appreciated by a skilled artisan); (4) the gap in question is located within an "unclosed" parentheses or bracket, (where, preferably, an "open" parentheses or bracket lies to the one side, most preferably the left side, of the location without a corresponding "close" parentheses or bracket that is also to the left of the location in question; and (5) the textual elements to either side of the gap exhibit a difference in height that is greater than 50% of a total height of the smaller of the textual elements (indicating a significant change in font size).

Moreover still, pre-processing may include: performing layout analysis on the original image, wherein the layout analysis comprises identifying one or more excluded zones within the original image, and wherein the one or more excluded zones are selected from: enumerated lists, bulleted lists, key-value lists, subpages, page headers, page footers, page numbers, and textual zones.

With continuing reference to layout analysis, in accordance with certain inventive concepts presented herein, detecting/identifying enumerated lists involves: identifying one or more lies of text depicted in the original image; determining which of the one or more lines of text initiate with an enumerating value; determining whether the lines of text initiating with enumerating values exhibit a sequential order with respect to the enumerating values; determining whether the lines of text initiating with enumerating values include multiple (preferably, at least three) phrases; determining whether a proportion of the lines of text initiating with enumerating values and including multiple phrases exceeds a threshold proportion of multi-phrase lines of text; designating an enumerating list in response to determining lines of text initiating with enumerating values exhibit the sequential order and do not exceed the threshold proportion of multi-phrase lines of text.

According to further concepts, detecting the enumerated lists optionally includes: obtaining a set of rules defining criteria of enumerated text lines, wherein the criteria of enumerated text lines comprise: (1) the height of the trailing text line(s) being consistent with the height of other text lines previously identified as included within the list (i.e., indicating the same font size), (2) the vertical distance to the trailing text line(s) must be consistent with single-spacing, i.e., with a vertical separation of no more than a given fraction (preferably half) the height of the text lines in question, and (3) the trailing text line(s) must be commonly (preferably left) aligned with other (un-enumerated) text lines, if any, that occur between the enumerated text lines.

As noted hereinabove, according to certain inventive concepts layout analysis may include detecting the key-value lists, which in turn preferably comprises: obtaining a set of rules defining criteria of key-value lists, wherein the criteria of textual zones comprise: including a plurality of text lines each comprising at least one key-value pair; the key-value pairs of the plurality of text lines exhibiting at least one common alignment characteristic; and/or the values of each key-value pair being separated by a vertical distance no greater than about 1.5 times an average height of the plurality of text lines evaluating the original image data against the set of rules; and identifying one or more key-value lists based on the evaluation.

With continuing reference to layout analysis, according to an exemplary inventive concept detecting the textual zones comprises: obtaining a set of rules defining criteria of textual zones, wherein the criteria of textual zones comprise a zone of the original image including one or more lines of text characterized by: a length at least 70 percent as long as a width of a subpage in which the one or more lines of text are located; excluding gaps, between adjacent phrases, that are characterized by a width larger than a predefined horizontal gap threshold; including no more than one textual element corresponding to a data type commonly included in tables and/or tabular data arrangements; and/or not intersecting any vertical graphical lines depicted in the original image; and evaluating the original image against the set of rules; and defining one or more textual zones within the original image based on the evaluation.

Moreover still, according to several embodiments of layout analysis, detecting the subpages comprises: obtaining a set of rules defining criteria of subpages, wherein the criteria of subpages comprise: the original image including a vertical graphical line that spans a vertical extent of a page of a document depicted in the original image; and the vertical graphical line having an x-coordinate value corresponding, within a predetermined threshold, to a central x-coordinate value of the page, wherein the predetermined threshold distance is about an average height of textual elements depicted in the original image; and evaluating the original image against the set of rules; and defining one or more subpages within the original image based on the evaluation.

In accordance with still further inventive concepts, particularly regarding detection, detecting the one or more tables and/or the one or more tabular data arrangements within the processed image data preferably includes performing grid-based detection on the processed image data; and/or performing non-grid-based detection on the processed image data.

In further approaches, table and/or tabular data arrangement detection may include performing the grid-based detection; denoting one or more areas within the original image that include a grid-like table and/or a grid-like tabular data arrangement as an excluded zone; and performing non-grid-based detection on portions of the original image that are not denoted as excluded zones.

With continuing reference to table and/or tabular data arrangement detection, in several approaches the grid-based detection may include: obtaining a fourth set of rules defining criteria of grid-like tables and/or grid-like tabular data arrangements; evaluating the original image against the fourth set of rules; and generating, based on the evaluation, a set of grid-like table candidates, and/or a set of grid-like tabular data arrangement candidates; wherein the criteria of grid-like tables and/or grid-like tabular data arrangements comprise: comprising a plurality of intersecting graphical lines that define a plurality of boxes; and including a header line, wherein the header line is characterized by: spanning an entire width of a rectangle containing the header line; including at least one dividing line extending in a direction perpendicular to the header line; comprising at least two cells, wherein at least one of the cells comprises one or more textual elements; and wherein no more than a threshold percentage of the at least two cells comprise more than one of the one or more textual elements; and defining, from the set of grid-like table candidates, and/or the set of grid-like tabular data arrangement candidates, the one or more tables and/or the one or more tabular data arrangements, wherein defining the one or more tables and/or the one or more tabular data arrangements comprises: defining a/the header line; and defining, based on intersections of horizontal graphical lines and vertical graphical lines depicted in the original image, a plurality of cells of the one or more tables and/or the one or more tabular data arrangements.

Similarly, in certain embodiments non-grid-based detection may include: obtaining a fifth set of rules defining criteria of column seeds; wherein the criteria of column seeds comprise: being an adjacent or nearly adjacent pair of text lines that are located in a region of the original image that is not an excluded zone; being an adjacent or nearly adjacent pair of text lines each comprising a same type of textual element, and not being separated by a different type of textual element; being an adjacent or nearly adjacent pair of text lines exhibiting a common alignment; being an adjacent or nearly adjacent pair of text lines that at least partially match a predefined pattern; being an adjacent or nearly adjacent pair of text lines located either: within a common box depicted in the original image, or not in any box depicted in the original image; being an adjacent or nearly adjacent pair of text lines each characterized by a width less than a predetermined fraction of a total column width corresponding to the pair of adjacent text lines; being a stack comprising vertically connected elements; and/or being an adjacent pair of parallel graphical lines depicted in the original image and characterized by: a substantially same length; an inter-line separation less than about 2.5 times a maximum height of a taller one of the adjacent pair of parallel graphical lines, and: bounding at least three elements each of a known data type; and/or having only one of the at least three elements located between any given pair of graphical lines appearing within a given text line; and evaluating the processed image data against the fifth set of rules; and identifying a set of column seed candidates based on the evaluation; wherein the column seeds are identified based at least in part on: pairs of adjacent text lines depicted in the original image; pairs of nearly adjacent text lines depicted in the original image; stacks depicted in the original image; and/or adjacent pairs of parallel graphical lines depicted in the original image.

Non-grid-based detection, in additional approaches, may alternatively or additionally include: obtaining a sixth set of rules defining criteria of column clusters; wherein the criteria of column clusters comprise: including two or more column candidates; and the two or more column candidates are each contained within a same box depicted in the original image, or that are not contained within any box depicted in the original image; the two or more column candidates belong to a same text column; and/or the two or more column candidates intersect along a width-wise axis of the column candidates; evaluating the processed image data against the sixth set of rules; and identifying a set of column cluster candidates based on the evaluation.

Optionally, according to certain concepts the non-grid-based detection may further comprise: obtaining a seventh set of rules defining criteria for updating column clusters; wherein the criteria for updating column clusters comprise criteria for expanding columns upward, criteria for expanding columns downward, and criteria for expanding columns inside; wherein the criteria for expanding columns upward comprise a first element, located between the top of a given column cluster and the top of a given column included in the given column cluster, being characterized by: neither being located in an excluded zone, nor causing the given column to extend into an excluded zone if the given column is expanded to include the first element; lacking underline formatting; intersecting only the given column; exhibiting a common alignment with other cells in the given column; and/or being either: located in a common box as the given column; or not located in any box depicted in the original image, and characterized by a distance between the first element and the given column less than about 2.5 times an average height of other elements included in the given column; wherein the criteria for expanding columns downward comprise a second element, located between the bottom of the given column cluster and the bottom of the given column included in the given column cluster, being characterized by: neither being located in an excluded zone, nor causing the given column to extend into an excluded zone if the given column is expanded to include the second element; lacking underline formatting; intersecting only the given column; exhibiting a common alignment with other cells in the given column; and/or being either: located in a common box as the given column; or not located in any box depicted in the original image, and characterized by a distance between the second element and the given column less than 2.5 times an average height of other elements included in the given column; and wherein the criteria for expanding columns inside comprise a third element being characterized by: being included in the given column; exhibiting a common alignment with at least two other elements included in the given column; and/or being either: located in a common box as the given column; or not located in any box depicted in the original image; evaluating the processed image data against the seventh set of rules; and either or both of: reformulating one or more existing column definitions based on the evaluation; and modifying a definition of some or all of the column cluster candidates based on the evaluation.

Non-grid-based detection may optionally further comprise, in accordance with particularly detailed approaches: refining bottom edge(s) of the one or more tables and/or the one or more tabular data arrangements, wherein refining the bottom edge(s) comprises: obtaining an eighth set of rules defining criteria for expanding the one or more tables and/or the one or more tabular data arrangements to include a jagged bottom row, wherein the criteria for expanding the one or more tables and/or the one or more tabular data arrangements to include a jagged bottom row comprise: the jagged bottom row includes at least one column cluster; the at least one column cluster comprises at least two columns; an element is present within a text line located immediately below a defined bottom of the at least one column cluster; a vertical distance between the text line and the bottom of the defined bottom of the at least one column cluster is less than twice an average height of a plurality of text lines depicted in a portion of the original image; the text line does not intersect another column cluster of the one or more tables and/or the one or more tabular data arrangements; the text line does not include any element that is located in multiple different boxes; the text line comprises at least two elements; each of the at least two elements in the text line horizontally overlaps one and only one column of the one or more tables and/or one or more tabular data arrangements; if any element in the text line corresponds to a predefined type of element, a bottommost element in a corresponding column of the one or more tables and/or the one or more tabular data arrangements also corresponds to the predefined type of element; evaluating the processed image data against the eighth set of rules; and refining bottom edge(s) of the one or more tables and/or the one or more tabular data arrangements based on the evaluation.

Additional or alternative approaches to non-grid-based detection preferably include: obtaining a ninth set of rules defining criteria of row title columns; evaluating the processed image data against the ninth set of rules wherein the evaluation comprises, for each column cluster, determining whether an adjacent column exhibits one or more of the criteria of row title columns; and identifying one or more row title columns based on the evaluation wherein the criteria of row title columns include the adjacent column comprising either: two or more elements, one of each being respectively present on two or more corresponding neighboring text lines, wherein the two or more neighboring text lines are located horizontally adjacent to the column cluster and are not located within an excluded zone; or two or more elements, one of each being respectively present on two or more corresponding nearly neighboring text lines, wherein the two or more elements exhibit a common alignment, and wherein the two or more nearly neighboring text lines are located horizontally adjacent to the column cluster and are not located within an excluded zone.

More preferably, but again optionally, non-grid-based detection is an iterative process, and wherein each iteration comprises an ordered sequence of operations comprising: expanding columns upward, then joining columns, then grouping columns, then expanding columns downward, then joining columns, then grouping columns, then expanding columns inside, then joining columns, then grouping columns.

In certain embodiments, non-grid-based detection may include splitting adjacent tables, and wherein splitting adjacent tables comprises: obtaining a tenth set of rules defining criteria of adjacent but separate tables; evaluating the processed image data against the tenth set of rules; and splitting the adjacent but separate tables based on the evaluation; wherein the criteria of adjacent but separate tables comprise: the adjacent but separate tables comprising at least four columns; at least two of the at least four columns are adjacent; the at least two adjacent columns are separated by a distance of at least about 20% of a currently defined table width; no horizontal graphical lines span a gap between the at least two adjacent columns; and/or at least one vertical line resides within the gap between the at least two adjacent columns.

Refining a top edge of the one or more tables and/or the one or more tabular data arrangements is yet another concept relevant to non-grid-based detection, and preferably refining the top edge comprises: assigning a text line index (TLX) to each line of text depicted in the original image, wherein an uppermost line of text depicted in the original image is assigned a lowest index value, wherein a bottommost line of text depicted in the original image is assigned a highest index value, and wherein the TLX index values increase incrementally from the uppermost line of text depicted in the original image to the bottommost line of text depicted in the original image; wherein each of the one or more tables and/or the one or more tabular data arrangements is assigned a Start TLX and a Stop TLX, wherein the Start TLX represents an upper boundary of the associated table or the associated tabular data arrangement, and wherein a Stop TLX represents a lower boundary of the associated table or the associated tabular data arrangement; identifying one or more column header candidates, wherein the at last one column header candidate is identified based at least in part on: an orientation of textual elements depicted in the one or more tables and/or the one or more tabular data arrangements; and/or a structure of the one or more tables and/or the one or more tabular data arrangements; associating, within a table data structure, each of the one or more column header candidates with a corresponding data column of the one or more tables and/or the one or more tabular data arrangements, wherein each of the one or more column header candidates associated with a corresponding data column is a new header column within the table data structure; evaluating at least one TLX above each of the one or more column header candidates associated with a corresponding data column to determine whether the at least one TLX above each respective one of the one or more column header candidates associated with a corresponding data column includes one or more textual elements; expanding at least one of the column header candidates to include the respective at least one TLX above the column header candidate in response to determining the at least one TLX above the column header candidate includes one or more textual elements; validating the column header candidates; wherein validating the column header candidates comprises, in response to determining: the corresponding table and/or tabular data arrangement comprises at least four columns; the corresponding table and/or tabular data arrangement includes a sole column header candidate; the sole column header candidate includes only one element; and the sole column header candidate is not positioned vertically adjacent to a leftmost column of the corresponding table and/or tabular data arrangement; either: discarding textual elements in some or all of the column header candidates; or moving textual elements in some or all of the column header candidates into a data portion of the corresponding table and/or tabular data arrangement; and/or updating, based at least in part on evaluating one or more delineating lines depicted in the original image, an upper boundary of some or all of the one or more tables and/or some or all of the one or more tabular data arrangements, wherein the updating comprises redefining an upper boundary of the one or more tables and/or the one or more tabular data arrangements in response to determining: at least one of the delineating lines depicted in the original image is positioned above a current upper boundary definition of a given one of the one or more tables and/or the one or more tabular data arrangements; the at least one of the delineating lines is not adjacent to one or more predefined data types; and/or the at least one of the delineating lines is positioned within a minimum distance of the current upper boundary definition of the given one of the one or more tables and/or the one or more tabular data arrangements, wherein the minimum distance is in a range from about an average height of characters depicted in the original image to about twice the average height of characters depicted in the original image.

Consistent with additional, optional features described herein, non-grid-based detection may involve joining vertically stacked tables and/or tabular data arrangements that in fact constitute a single table or tabular data arrangement. According to such approaches, joining the vertically stacked tables and/or tabular data arrangements comprises: obtaining an eleventh set of rules defining criteria of single tables and/or tabular data arrangements that appear as vertically stacked tables or tabular data arrangements, wherein the criteria of single tables and/or tabular data arrangements that appear as vertically stacked tables or tabular data arrangements comprise: the apparently vertically stacked tables or tabular data arrangements each comprise at least two columns; a rightmost column of each of the apparently vertically stacked tables or tabular data arrangements exhibit substantial alignment with respect to width; the apparently vertically stacked tables or tabular data arrangements exhibit substantial alignment along a horizontal direction; no excluded regions are positioned between the apparently vertically stacked tables or tabular data arrangements; no other tables or tabular data arrangements are positioned between the apparently vertically stacked tables or tabular data arrangements; neither of the apparently vertically stacked tables or tabular data arrangements are defined by a box depicted in the original image; an uppermost one of the apparently vertically stacked tables or tabular data arrangements includes a header, and no other of the apparently vertically stacked tables or tabular data arrangements includes a header; evaluating the processed image data against the eleventh set of rules; and joining the vertically stacked tables and/or tabular data arrangements that in fact constitute a single table or tabular data arrangement in response to determining, based on the evaluation, that the vertically stacked tables and/or tabular data arrangements satisfy one or more of the criteria of single tables and/or tabular data arrangements that appear as vertically stacked tables or tabular data arrangements.

Similar to certain table detection concepts described hereinabove, extracting the one or more tables and/or the one or more tabular data arrangements from the processed image data preferably includes: grid-based extraction; and/or non-grid-based extraction.

Moreover, the non-grid-based extraction preferably includes: assigning a text line index (TLX) to each line of text depicted in the original image, wherein an uppermost line of text depicted in the original image is assigned a lowest index value, wherein a bottommost line of text depicted in the original image is assigned a highest index value, and wherein the TLX index values increase incrementally from the uppermost line of text depicted in the original image to the bottommost line of text depicted in the original image; wherein each of the one or more tables and/or the one or more tabular data arrangements is associated with a Header Start TLX, a Header Stop TLX, a Data Start TLX, and/or a Data Stop TLX, wherein the Header Start TLX represents an upper boundary of the associated table or the associated tabular data arrangement, wherein the Header Stop TLX represents a lower boundary of a header region of the associated table or the associated tabular data arrangement, wherein the Data Start TLX represents an upper boundary of a data region of the associated table or the associated tabular data arrangement, and wherein the Data Stop TLX represents a lower boundary of the associated table or the associated tabular data arrangement; determining one or more properties of each TLX, wherein the one or more properties are selected from: whether or not any ellipses are included in the TLX, whether or not one or more known data types are included in the TLX, an average height of characters in the TLX; determining, based at least in part on the TLXs, an internal structure of the one or more tables and/or the one or more tabular data arrangements, wherein the internal structure comprises: a number of rows; a number of columns; a location of each of the rows; a location of each of the columns; a presence of one or more row descriptors; a location of the one or more row descriptors; a value of the one or more row descriptors; a presence of one or more column descriptors; a location of the one or more column descriptors; and/or a value of the one or more column descriptors, a location of a header region, a location of a data region, one or more boundaries of the header region, and/or one or more boundaries of the data region; determining, based at least in part on the internal structure of the one or more tables and/or one or more tabular data arrangements, a plurality of fields of the one or more tables and/or one or more tabular data arrangements, wherein each field comprises and/or is characterized by: a spatial definition, a textual value, and/or a label, wherein the spatial definition comprises a rectangular portion of the original image, and wherein the label is associated with the field as metadata; identifying any vertical graphical lines present in a header region of the one or more tables and/or the one or more tabular data arrangements; excluding one or more of the lines of text from the header region and/or the data region; identifying implied vertical lines within the header region; identifying columns within the data region; adjusting and/or expanding the header region, wherein adjusting and/or expanding the header region comprises building headers upward and/or adjusting one or more headers that are each defined by a box depicted in the original image; adjusting and/or expanding the data region, wherein adjusting and/or expanding the data region comprises adding one or more rows to the data region; determining one or more row clusters within the data region; identifying one or more row descriptors within the data region; determining one or more data values within the data region; and/or computing final columns for the one or more tables and/or one or more tabular data arrangements.

Further regarding non-grid-based extraction, determining the internal structure of the one or more tables and/or the one or more tabular data arrangements may involve: identifying the header region and the data region; and identifying a boundary between the header region and the data region, wherein identifying the boundary between the header region and the data region comprises identifying a Data Start TLX, determining whether the Data Start TLX is positioned immediately below a lowermost portion of the header region.

Preferably, in the context of non-grid-based extraction, identifying any of the vertical graphical lines present in the header region comprises: obtaining a twelfth set of rules defining criteria of vertical graphical lines present in header regions, wherein the criteria of vertical graphical lines present in header regions comprise: at least a portion of the vertical graphical line being present in the header region; the vertical graphical line having a predetermined minimum length of about 1.5 times as long as an average height of text characters depicted in the original image; and evaluating the processed image data against the twelfth set of rules; and designating the vertical graphical lines present in the header region based on the evaluation.

According to certain concepts within the scope of non-grid-based extraction, identifying the implied vertical lines within the header region may comprise: detecting one or more pairs of delineating sublines located within the header region; determining whether any of the one or more pairs of delineating sublines exhibit substantial alignment along a vertical direction; determining whether any lines of text in the header region substantially intersect one or more of the delineating sublines, wherein a line of text substantially intersects a delineating subline when one or more characters of the line of text are located within a predetermined horizontal distance of one of the delineating sublines, wherein the predetermined horizontal distance is about twice a height of the one of the delineating sublines; and in response to determining one of the pairs of delineating sublines exhibits substantial alignment along the vertical direction and is not substantially intersected by a line of text in the header region, defining a new, implied vertical line connecting the pair of delineating sublines within the header region.

With further reference to non-grid-based extraction concepts, in one approach excluding the one or more of the lines of text from the header region and/or the data region comprises: determining whether any of the one or more lines of text intersects one of the graphical vertical lines present in the header region, and in response to determining one or more of the lines of text intersects one of the graphical vertical lines present in the header region, excluding the one or more lines of text from the header region; and/or determining whether any of the one or more lines of text substantially intersects one or more known column boundaries within the data region, wherein a line of text is considered to substantially intersect a known column boundary when at least 20% of an average character height corresponding to the line of text intersects the known column boundary, and in response to determining one or more of the lines of text substantially intersects one or more of the known column boundaries, excluding the one or more lines of text from the data region.

With further reference to non-grid-based extraction concepts, in another approach defining the columns in the data region comprises: obtaining a thirteenth set of rules defining criteria of columns, wherein the criteria of columns comprise: one or more elements are present within at least a portion of the data region; the one or more elements are valid elements; the one or more elements are not indicated for exclusion based on other non-grid-based extraction techniques; and the one or more elements are vertically connected, wherein elements are considered vertically connected when the elements at least partially overlap along a horizontal direction, and wherein vertical connectedness is a transitive property; evaluating the processed image data against the thirteenth set of rules; and defining one or more columns in the data region based on the evaluation.

With further reference to non-grid-based extraction concepts, in yet another approach determining the one or more row clusters within the data region comprises: determining a plurality of TLX pairs corresponding to the data region, wherein each TLX pair comprises a Start TLX corresponding to an upper boundary of a given row in the data region, and a Stop TLX corresponding to a lower boundary of the given row; identifying all horizontal lines within the data region that span a width of the data region within a predetermined distance of about one unit of tolerance; grouping one or more pairs of the horizontal lines within the data region that span the width of the data region and have one or more data values located therebetween; and defining the one or more row clusters according to the grouped pairs of horizontal lines.

With further reference to non-grid-based extraction concepts, in still yet another approach determining the one or more row clusters within the data region further comprises: computing a plurality of normalized distances, each normalized distance corresponding to a pair of adjacent text lines depicted in the data region; wherein the normalized distance is based on a difference between an adjusted top of a first of the adjacent text lines and an adjusted bottom of a second of the adjacent text lines; wherein the adjusted top corresponds to a highest y-value position of a primary mass of textual elements appearing on the first of the adjacent text lines; wherein the adjusted bottom corresponds to a lowest y-value position of a primary mass of textual elements appearing on the second of the adjacent text lines; wherein the primary mass of textual elements appearing on the first of the adjacent text lines is characterized by at least 30 percent of pixels exhibiting a same color as a foreground color of the original image; wherein the primary mass of textual elements appearing on the second of the adjacent text lines is characterized by at least 30 percent of pixels exhibiting a same color as a foreground color of the original image; sorting the normalized distances in ascending order; identifying, within the sorted normalized distances, a threshold distance characterized by a value at least 20 percent smaller than a next largest one of the sorted normalized distances; defining a portion of the data region as one of the one or more row clusters in response to determining the portion of the data region comprises a plurality of proximate TLXs, wherein each adjacent pair of the plurality of proximate TLXs is characterized by an inter-TLX distance less than or equal to the threshold distance.

Optionally, according to certain embodiments determining the one or more row clusters within the data region further comprises: identifying a Data Top TLX among the assigned TLXs, wherein the Data Top TLX corresponds to an uppermost line of text in the data region; obtaining a set of rules defining criteria for terminating row clustering; evaluating subsequent TLXs in the data region against the set of rules; and either: adding one or more of the subsequent TLXs to a current row cluster in response to determining the one or more of the subsequent TLXs do not satisfy the criteria for terminating row clustering; or terminating the current row cluster, and defining a new row cluster, in response to determining a next one of the one or more subsequent TLXs satisfies some or all of the criteria for terminating row clustering; and wherein the criteria for terminating row clustering comprise: a TLX immediately subsequent to the next one of the one or more subsequent TLXs being characterized by lesser indentation than an indentation of the next one of the one or more subsequent TLXs; the next one of the one or more subsequent TLXs ends in a symbol corresponding to a row descriptor; the next one of the one or more subsequent TLXs comprises an ellipsis; and/or the next one of the one or more subsequent TLXs does not meet any of a plurality of row cluster termination exceptions; and wherein the plurality of row cluster termination exceptions comprise: a current one of the one or more subsequent TLXs comprising a continuation character; the current one of the one or more subsequent TLXs comprising an unmatched, open parenthesis; the next one of the one or more subsequent TLXs is enclosed in parenthesis; and the current one and the next one of the one or more subsequent TLXs each comprise data elements that: do not correspond to a known, combined data type, wherein at least 50 percent of the elements of the known, combined data type appear in a common cell of the one or more tables and/or the one or more data arrangements.

With continuing reference to non-grid-based extraction concepts, in another approach identifying the one or more row descriptors within the data region preferably includes: determining whether any lines of text depicted in the original image consist of a single phrase, wherein the single phrase is located in a left-most column of the one or more tables and/or one or more tabular data arrangements, and wherein the single phrase is not located in a row of the data region of the one or more tables and/or one or more tabular data arrangements.

According to still further inventive concepts presented herein, a computer-implemented method for classifying one or more tables and/or one or more tabular data arrangements depicted in image data preferably includes: training a machine learning model, using a training dataset representing a plurality of different tables and/or tabular data arrangements, to: recognize textual elements within the training dataset; and understand a structure of the different tables and/or tabular data arrangements; and outputting a trained classification model based on the training, wherein the trained classification model is configured to classify one or more tables and/or one or more tabular data arrangements represented within a test dataset according to: one or more table classifications; one or more tabular data arrangement classifications; and/or one or more column classifications; and classifying the one or more tables and/or the one or more tabular data arrangements represented within the test dataset using the trained classification model.

Optionally, but preferably, the one or more table classifications, the one or more tabular data arrangement classifications, and/or the one or more column classifications comprise classifications of interest, and at least one classification not of interest.

Moreover, the one or more table classifications, the one or more tabular data arrangement classifications, and the one or more column classifications may each be independently based on the different tables and/or the tabular data arrangements represented in the training dataset.

Moreover still, according to certain concepts the configuration to classify the one or more tables and/or the one or more tabular data arrangements may involve the trained classification model being adapted to recognize a plurality of relevancy criteria, wherein each relevancy criterion is independently indicative of a given one of the one or more tables and/or a given one of the one or more tabular data arrangements corresponding to either: one of the one or more table classifications; one of the one or more tabular data arrangement classifications; or one of the one or more column classifications. Optionally, the plurality of relevancy criteria comprise: a frequency of one or more terms represented in the one or more tables and/or the one or more tabular data arrangements; a term-frequency/inverse-document frequency (tf-idf) corresponding to the one or more terms and one or more documents representing the one or more tables and/or the one or more tabular data arrangements; a structure of a sub-region of the one or more tables and/or the one or more tabular data arrangements; and/or structured information describing some or all of the one or more tables and/or the one or more tabular data arrangements, wherein the structured information comprises natural language contextual information corresponding to textual elements represented in the one or more tables and/or one or more tabular data arrangements.

The training may include generating a score matrix comprising a plurality of score vectors that each independently comprise a plurality of scores for a single table or tabular data arrangement represented in the training dataset; and wherein each of the plurality of scores for each score vector independently corresponds to: a score of the single table or tabular data arrangement with respect to one of the table classifications; a score of the single table or tabular data arrangement with respect to one of the tabular data arrangement classifications; or a score of the single table or tabular data arrangement with respect to one of the column classifications.

Additionally or alternatively, generating the score matrix employs a Leave-One-Out methodology.

In some approaches, generating the score matrix may include: associating a known classification type with each score vector of the score matrix; defining a plurality of candidate score thresholds for each given score vector, wherein the plurality of candidate score thresholds each independently correspond to a mid-point values between a pair of adjacent, unique scores represented in the given score vector; and identifying an optimal score threshold for each classification type, wherein the optimal score threshold accounts for false positives, false negatives, and true positives, and wherein the optimal score threshold corresponds to one of the candidate score thresholds having a highest F-Score among all candidate score thresholds in the given score vector.

Classifying the one or more tables and/or the one or more tabular data arrangements represented within the test dataset using the trained classification model, in accordance with preferred aspects of the inventive concepts described herein may include: evaluating the test dataset using the trained classification model; determining at least one score vector based on the evaluation, wherein each score vector corresponds to one of the one or more tables and/or one of the one or more tabular data arrangements represented within the test dataset; identifying a highest score within the at least one score vector, wherein the highest score for each score vector corresponds to one of: the one or more table classifications; the one or more tabular data arrangement classifications; or the one or more column classifications; and determining whether the highest score for the at least one score vector is greater than a corresponding one of the plurality of candidate score thresholds; and in response to determining the highest score for the at least one score vector is greater than the corresponding one of the plurality of candidate score thresholds returning a positive result for the one of the corresponding one of the one or more table classifications, the one or more tabular data arrangement classifications, or the one or more column classifications.

Optionally, classification may include optimizing one or more labeling parameters of the trained classification model using one or more explicit hyper-parameters.

Moreover, the trained classification model may be or comprise a learn-by-example (LBE) model (in which cases the training preferably comprises LBE training, and/or a support vector machine (SVM), (in which cases the training preferably employs a Primal method with a linear kernel.)

As noted hereinabove, in certain approaches classification preferably includes column classification, which in turn involves classifying a plurality of columns of the one or more tables and/or the one or more tabular data arrangements. Classifying the plurality of columns may include: training at least one machine learning model, using a training dataset representing a plurality of different types of tables and/or tabular data arrangements, based at least in part on: a plurality of recognized textual elements within the training dataset; a plurality of recognized regions and/or subregions of the different types of tables and/or tabular data arrangements represented by the training set; and outputting at least one trained column classification model based on the training, wherein each trained column classification model is configured to classify columns of a particular type of table or a particular type of tabular data arrangement represented within the training dataset; and classifying, using the at least one trained column classification model, a plurality of columns of tables and/or tabular data arrangements represented by a test dataset.

Preferably, training comprises building a plurality of feature vectors based on the training dataset, wherein each feature vector: corresponds to a subregion of a unique column of one of the one or more tables and/or one of the one or more tabular data arrangements represented by the training dataset; and defines: coordinates defining a rectangular area of the corresponding subregion; one or more textual elements present in the corresponding subregion; and one or more graphical elements present in the corresponding subregion.

Moreover, the trained column classification models may each independently comprise: a plurality of the feature vectors; and an identification of some or all of the following: one or more important single values present within the training set; one or more important column descriptor values present within the training set; one or more important value pairs present within the training dataset; one or more column descriptor important value pairs present within the training set; one or more half-important value pairs present within the training set; one or more important value triplets present within the training set; and/or sequence information regarding an order and/or a position of adjacent columns of the tables and/or the tabular data arrangements represented by the training dataset.

According to particularly preferred embodiments, classifying columns comprises building, based on the test dataset, a plurality of feature vectors, wherein each feature vector: corresponds to a subregion of a unique column of one of the one or more tables and/or one of the one or more tabular data arrangements represented by the test dataset; and defines: coordinates defining a rectangular area of the corresponding subregion; one or more textual elements present in the corresponding subregion; and one or more graphical elements present in the corresponding subregion.

Optionally the column classification further comprises: comparing each of the feature vectors of the trained classification model to a plurality of feature vectors built based on the training dataset generating a pairwise similarity score based on each comparison; and adjusting at least some of the similarity scores using at least one weight defined by whether the corresponding subregion(s) comprise: one or more important single values present within the training set; one or more important column descriptor values present within the training set; one or more important value pairs present within the training dataset; one or more column descriptor important value pairs present within the training set; one or more half-important value pairs present within the training set; and/or one or more important value triplets present within the training set.

While the foregoing inventive concepts are presented above in the form of methods, it shall be understood said concepts are equally capable of being implemented in other forms, e.g., in the form of a computer program product including a computer readable storage medium having program instructions embodied therewith and configured to cause a computing device, upon execution thereof, to perform the foregoing method(s), portion(s) thereof, combination(s) thereof, and/or permutation(s) thereof. Similarly, the inventive concepts presented herein may be embodied as systems, e.g., systems including a processor and logic executable by the processor to cause the processor to perform the foregoing method(s), portion(s) thereof, combination(s) thereof, and/or permutation(s) thereof.

Moreover, the inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments but should be defined only in accordance with the claims and their equivalents.

What is claimed is:

1. A computer-implemented method for detecting and classifying tables and/or tabular data arrangements within an original image, comprising:
    pre-processing the original image to generate processed image data;
    detecting one or more tables and/or one or more tabular data arrangements within the processed image data;
    extracting the one or more tables and/or the one or more tabular data arrangements from the processed image data; and
    classifying either:
        the one or more extracted tables;
        portions of the one or more extracted tables;
        the one or more extracted tabular data arrangements;
        portions of the one or more extracted tabular data arrangements; or
        a combination of:
            the one or more extracted tables;
            the portions of the one or more extracted tables;
            the one or more extracted tabular data arrangements; and/or
            the portions of the one or more extracted tabular data arrangements; and
    wherein classifying the one or more extracted tables; the portions of the one or more extracted tables; the one or more extracted tabular data arrangements; and/or the portions of the one or more extracted tabular data arrangements comprises:
        evaluating a test dataset using a trained classification model;
        determining at least one score vector based on the evaluation;
        identifying a highest score within the at least one score vector;
        determining whether the highest score for the at least one score vector is greater than a corresponding one of a plurality of optimized score thresholds; and
        in response to determining the highest score for the at least one score vector is greater than the corresponding one of the plurality of optimized score thresholds, returning a positive result for the one of the corresponding classification of the one or more extracted tables; the portions of the one or more extracted tables; the one or more extracted tabular data arrangements; and/or the portions of the one or more extracted tabular data arrangements.

2. The method as recited in claim 1, wherein the one or more extracted tables, the portions of the one or more extracted tables, the one or more extracted tabular data arrangements, and/or the portions of the one or more extracted tabular data arrangements collectively comprise:
    one or more classifications of interest; and
    at least one classification not of interest.

3. The method as recited in claim 1, wherein the classification of: the one or more extracted tables; the portions of the one or more extracted tables; the one or more extracted tabular data arrangements; and/or the portions of the one or more extracted tabular data arrangements are each independently based on tables and/or tabular data arrangements represented in a training dataset.

4. The method as recited in claim 1, wherein the classifying includes training a machine learning model, wherein the training comprises training the machine learning model to recognize a plurality of relevancy criteria, and wherein each relevancy criterion is independently indicative of a given one of the one or more tables and/or a given one of the one or more tabular data arrangements corresponding to either:
    one of the one or more table classifications;
    one of the one or more tabular data arrangement classifications; or
    one of the one or more column classifications.

5. The method as recited in claim 4, wherein the plurality of relevancy criteria comprise:
    a frequency of one or more terms represented in the one or more tables and/or the one or more tabular data arrangements;
    a term-frequency/inverse-document frequency (tf-idf) corresponding to the one or more terms and one or more documents representing the one or more tables and/or the one or more tabular data arrangements;
    a structure of a sub-region of the one or more tables and/or the one or more tabular data arrangements; and/or
    structured information describing some or all of the one or more tables and/or the one or more tabular data arrangements.

6. The method as recited in claim 1, comprising training at least one machine learning model, using a training dataset representing a plurality of different types of tables and/or tabular data arrangements, based at least in part on:
    a plurality of recognized textual elements within the training dataset; and
    a plurality of recognized regions and/or subregions of the different types of tables and/or tabular data arrangements represented by the training set.

7. The method as recited in claim 6, wherein the training comprises generating a score matrix comprising a plurality of score vectors that each independently comprise a plurality of scores for a single table or tabular data arrangement represented in the training dataset; and wherein each of the plurality of scores for each score vector independently corresponds to a possible classification of the single table or tabular data arrangement represented in the training dataset.

8. The method as recited in claim 6, further comprising:
    associating a known classification type with each score vector of the score matrix; and
    identifying an optimal score threshold for each known classification type.

9. A computer-implemented method for classifying one or more tables and/or one or more tabular data arrangements represented within a test dataset, the method comprising:
    using a trained classification model to classify the one or more tables and/or one or more tabular data arrangements represented within a test dataset according to:
        one or more table classifications;
        one or more tabular data arrangement classifications; and/or
        one or more column classifications; and
    wherein classifying the one or more tables and/or the one or more tabular data arrangements comprises:
        evaluating the test dataset using the trained classification model;
        determining at least one score vector based on the evaluation;
        identifying a highest score within the at least one score vector;
        determining whether the highest score for the at least one score vector is greater than a corresponding one of a plurality of optimized score thresholds; and
    in response to determining the highest score for the at least one score vector is greater than the corresponding one of the plurality of optimized score thresholds, returning a positive result for the one of the corresponding classification of the one or more tables and/or the one or more extracted tabular data arrangements.

10. The method as recited in claim 9, comprising training a machine learning model, using a training dataset representing a plurality of different tables and/or tabular data arrangements, based at least in part on a plurality of recognized textual elements within the training dataset;
    wherein training the machine learning model comprises training the machine learning model to:
        recognize the textual elements within the training dataset; and
        understand a structure of the different tables and/or tabular data arrangements.

11. The method as recited in claim 10, wherein the training is further based at least in part on a structure of the one or more tables and/or the one or more tabular data arrangements.

12. The method as recited in claim 10, wherein the training is further based at least in part on a plurality of recognized regions and/or subregions of the different types of tables and/or tabular data arrangements represented by the training set.

13. The method as recited in claim 10, wherein the training comprises generating a score matrix comprising a plurality of score vectors that each independently comprise a plurality of scores for a single table or tabular data arrangement represented in the training dataset; and wherein each of the plurality of scores for each score vector independently corresponds to a possible classification of the single table or tabular data arrangement represented in the training dataset.

14. The method as recited in claim 13, further comprising:
    associating a known classification type with each score vector of the score matrix; and
    identifying an optimal score threshold for each classification type.

15. The method as recited in claim 9, wherein the one or more table classifications, the one or more tabular data arrangement classifications, and/or the one or more column classifications collectively comprise:
    one or more classifications of interest; and
    at least one classification not of interest.

16. The method as recited in claim 9, wherein the one or more table classifications, the one or more tabular data arrangement classifications, and the one or more column classifications are each independently based on the different tables and/or the tabular data arrangements represented in the training dataset.

17. The method as recited in claim 9, wherein the trained classification model is adapted to recognize a plurality of relevancy criteria, wherein each relevancy criterion is independently indicative of a given one of the one or more tables and/or a given one of the one or more tabular data arrangements corresponding to either:
    one of the one or more table classifications;
    one of the one or more tabular data arrangement classifications; or
    one of the one or more column classifications.

18. The method as recited in claim 17, wherein the plurality of relevancy criteria comprise:
    a frequency of one or more terms represented in the one or more tables and/or the one or more tabular data arrangements;
    a term-frequency/inverse-document frequency (tf-idf) corresponding to the one or more terms and one or more documents representing the one or more tables and/or the one or more tabular data arrangements;
    a structure of a sub-region of the one or more tables and/or the one or more tabular data arrangements; and/or
    structured information describing some or all of the one or more tables and/or the one or more tabular data arrangements.

* * * * *